(12) United States Patent
Ide et al.

(10) Patent No.: US 7,600,235 B2
(45) Date of Patent: Oct. 6, 2009

(54) OPTICAL DISK DEVICE

(75) Inventors: Noriyuki Ide, Tamana (JP); Kazuo Matsumoto, Kikuchi-gun (JP)

(73) Assignee: Panasonic Corporation, Osaka (JP)

( * ) Notice: Subject to any disclaimer, the term of this patent is extended or adjusted under 35 U.S.C. 154(b) by 1049 days.

(21) Appl. No.: 11/076,035

(22) Filed: Mar. 10, 2005

(65) Prior Publication Data

US 2005/0213438 A1 Sep. 29, 2005

Related U.S. Application Data

(63) Continuation-in-part of application No. 10/849,256, filed on May 20, 2004, now abandoned.

(30) Foreign Application Priority Data

| May 21, 2003 | (JP) | 2003-143029 |
| May 27, 2003 | (JP) | 2003-148737 |
| Jun. 23, 2003 | (JP) | 2003-177982 |
| Jun. 25, 2003 | (JP) | 2003-180833 |
| Mar. 12, 2004 | (JP) | 2004-070430 |

(51) Int. Cl.
G11B 17/04 (2006.01)

(52) U.S. Cl. .................................... 720/613

(58) Field of Classification Search ................. 720/601, 720/613
See application file for complete search history.

(56) References Cited

U.S. PATENT DOCUMENTS 5,497,366 A 3/1996 Fujisawa
5,862,116 A 1/1999 Watanabe
7,020,884 B2 * 3/2006 Choi et al. ................... 720/613
7,140,029 B2 * 11/2006 Chiou et al. ................. 720/613
7,308,691 B2 * 12/2007 Tamura ....................... 720/613
7,404,197 B2 * 7/2008 Bae ............................ 720/613

FOREIGN PATENT DOCUMENTS

| JP | 7201044 | 8/1995 |
| JP | 7235111 | 9/1995 |
| JP | 7-254263 | 10/1995 |
| JP | 8171786 | 7/1996 |
| JP | 9237454 | 9/1997 |
| JP | 2001266442 | 9/2001 |
| JP | 2003-085964 | 3/2003 |

OTHER PUBLICATIONS

Japanese Office Action dated Dec. 19, 2007 with English Translation thereof.

* cited by examiner

Primary Examiner—Angel A. Castro
(74) Attorney, Agent, or Firm—Dickinson Wright, PLLC

(57) ABSTRACT

According to the invention, case members each include a main surface and side surfaces provided at ends of the main surface. At a corner where a pair of side surfaces in at least one of the case members adjoin, an integral part having at least one pair of continuously integrated side surfaces is provided. Therefore, the corners of the case members can be prevented from bending or deforming, and the mechanical strength of the main surface can be improved. Therefore, the shock resistance can be improved, and the thickness of the case members can be reduced in order to reduce the size and weight of the device.

2 Claims, 42 Drawing Sheets

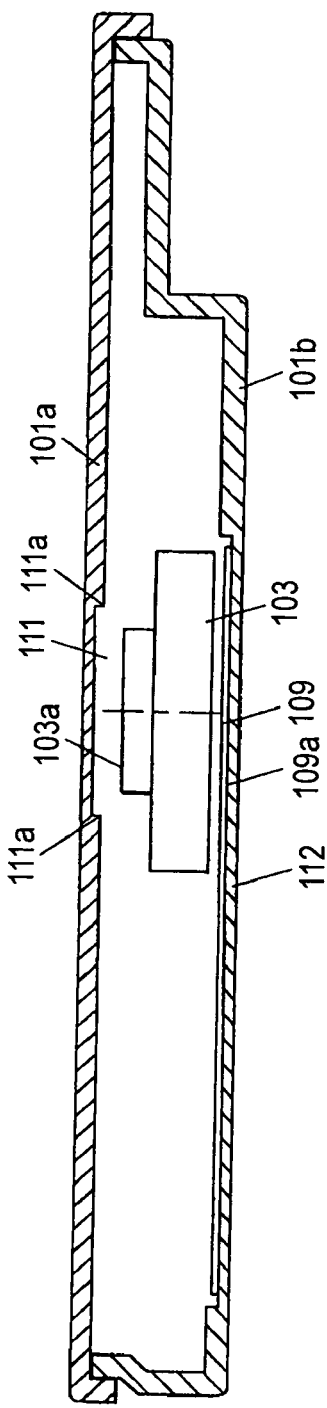
FIG. 17 (a)
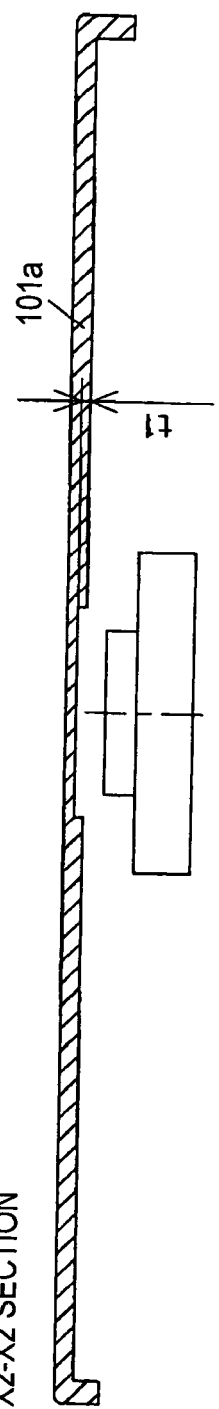
FIG. 17 (b) X2-X2 SECTION
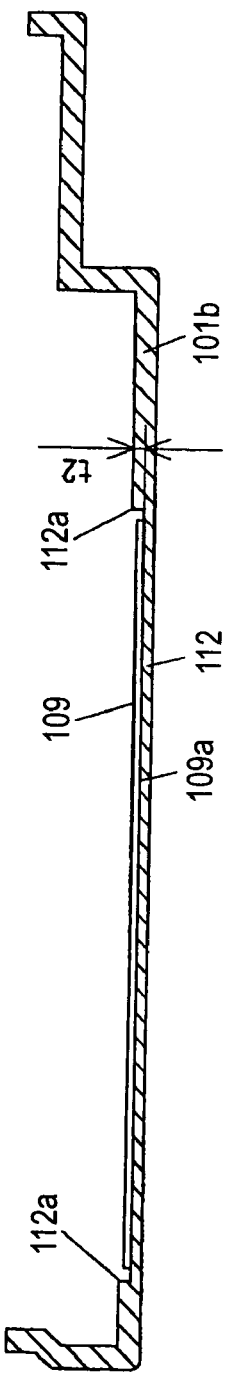
FIG. 17 (c) X4-X4 SECTION

A-A SECTION

B-B SECTION

A-A SECTION

FIG. 24 (a)
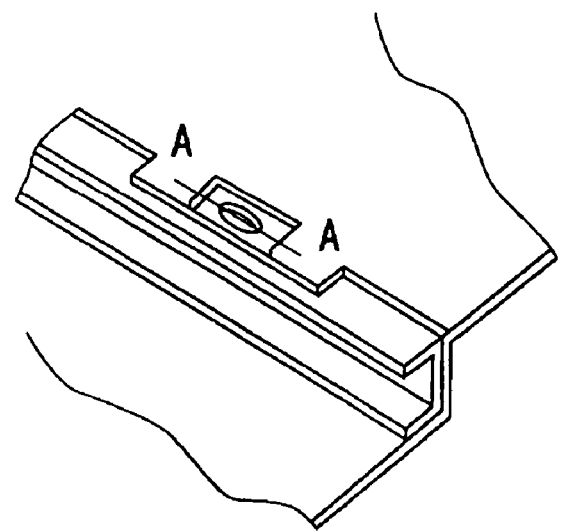
FIG. 24 (b)
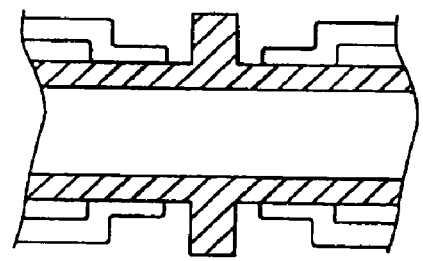
FIG. 24 (c)
A-A SECTION
FUSED
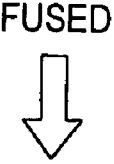
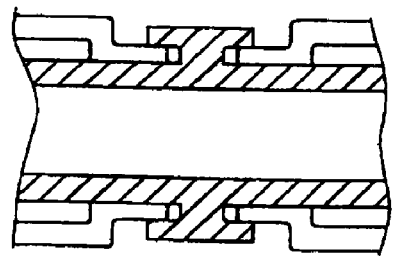

A-A SECTION

A-A SECTION

B-B SECTION

FIG. 27 (a)
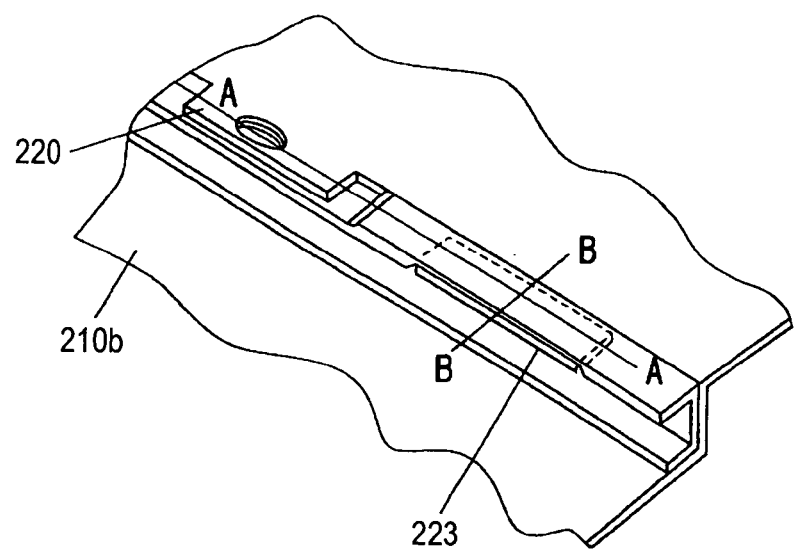
FIG. 27 (b) A-A SECTION
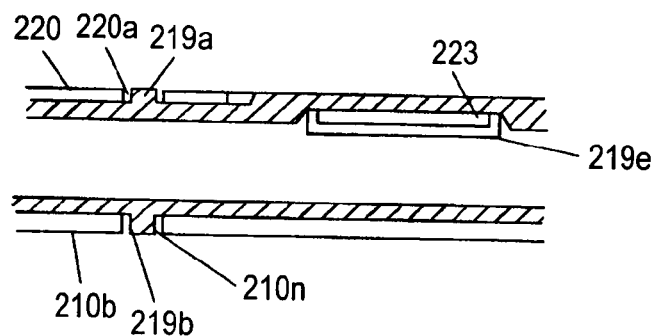
FIG. 27 (c) B-B SECTION
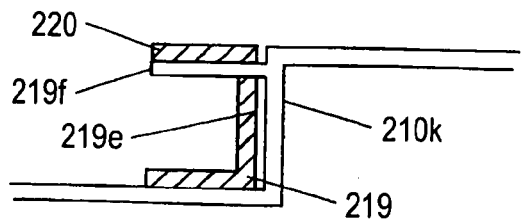

OPTICAL DISK DEVICE

This application is a continuation-in-part of U.S. application Ser. No. 10/849,256 filed May 20, 2004 now abandoned.

BACKGROUND OF THE INVENTION

Field of the Invention

The present invention relates to an optical disk device provided preferably in an electronic device such as a personal computer, more preferably in a mobile electronic device.

A typical conventional optical disk device provided in a computer main body is entirely stored in a case and then provided in a space in the computer main body. The case has an attachment part that is attached to the computer main body for attaching the device.

FIG. 8 is a perspective view of a conventional optical disk device. FIG. 8 shows an optical pickup 1, a main shaft 2, a sub shaft 3, a spindle motor 4, a base 5, an optical pickup module (PUM) 6, a tray X, a carriage 8, a rail 9, a case 10, an optical disk device 11, an attachment screw hole 12 on the optical disk device side, a circuit board 13 having a control device and the like thereon, and a frame 14.

FIG. 9 is a view showing how the conventional optical disk device is mounted to a mobile electronic device. FIG. 9 shows the mobile electronic device 15, an attachment 16 inserted for attachment, and an attachment hole 17 on the attachment side.

As described above, in the conventional disk device, the case 10 serves to position the tray 7 provided with the optical pickup module 6, the spindle motor 4 and the like thereon through the rail 9 and also fix an optical disk in the mobile electronic device 15. The structure has basically been unchanged even though the optical disk device has been reduced in thickness.

There has been an increasing demand for thinner and more lightweight optical disk devices in this conventional structure as there has been an increasing demand for thinner and more lightweight mobile electronic devices. The demand for more lightweight optical disk devices is particularly high but the above described structure makes it very difficult to reduce the weight.

SUMMARY OF THE INVENTION

The invention is directed to a solution to the above described problems associated with the conventional technique, and it is an object of the invention to provide an optical disk device having reduced thickness and reduced weight in particular.

The optical disk device according to the invention includes a case having first and second case members fixed with each other, driving means for rotating a medium around, an optical pickup module including optical elements, and a circuit portion forming a control portion. At least one of the first and second case members is provided with a main surface and side surfaces provided at ends of the main surface. At a corner where at least a pair of side surfaces in at least one of the first and second case members adjoin, an integral part where the pair of side surfaces are continuously integrated is provided.

BRIEF DESCRIPTION OF THE DRAWINGS

FIGS. 17(a) to 17(c) are sectional views of the optical disk device according to the embodiment;

FIGS. 23(a) and 23(b) and 24(a) to 24(c) show examples of an engagement part provided at the protrusion of the rail guide;

FIGS. 25(a) and 25(b), FIGS. 26(a) to 26(c), and FIGS. 27(a) to 27(c) show examples of how the rail guide is fixed to the lower cover;

FIG. 38(a) and FIG. 39(b) are external appearance views of a rail of the optical disk device in the embodiment of the invention;

FIG. 39(a) and FIG. 39(b) are external appearance views of a rail of the optical disk device in the embodiment of the invention;

DETAILED DESCRIPTION OF THE PREFERRED EMBODIMENTS

Figure 1:
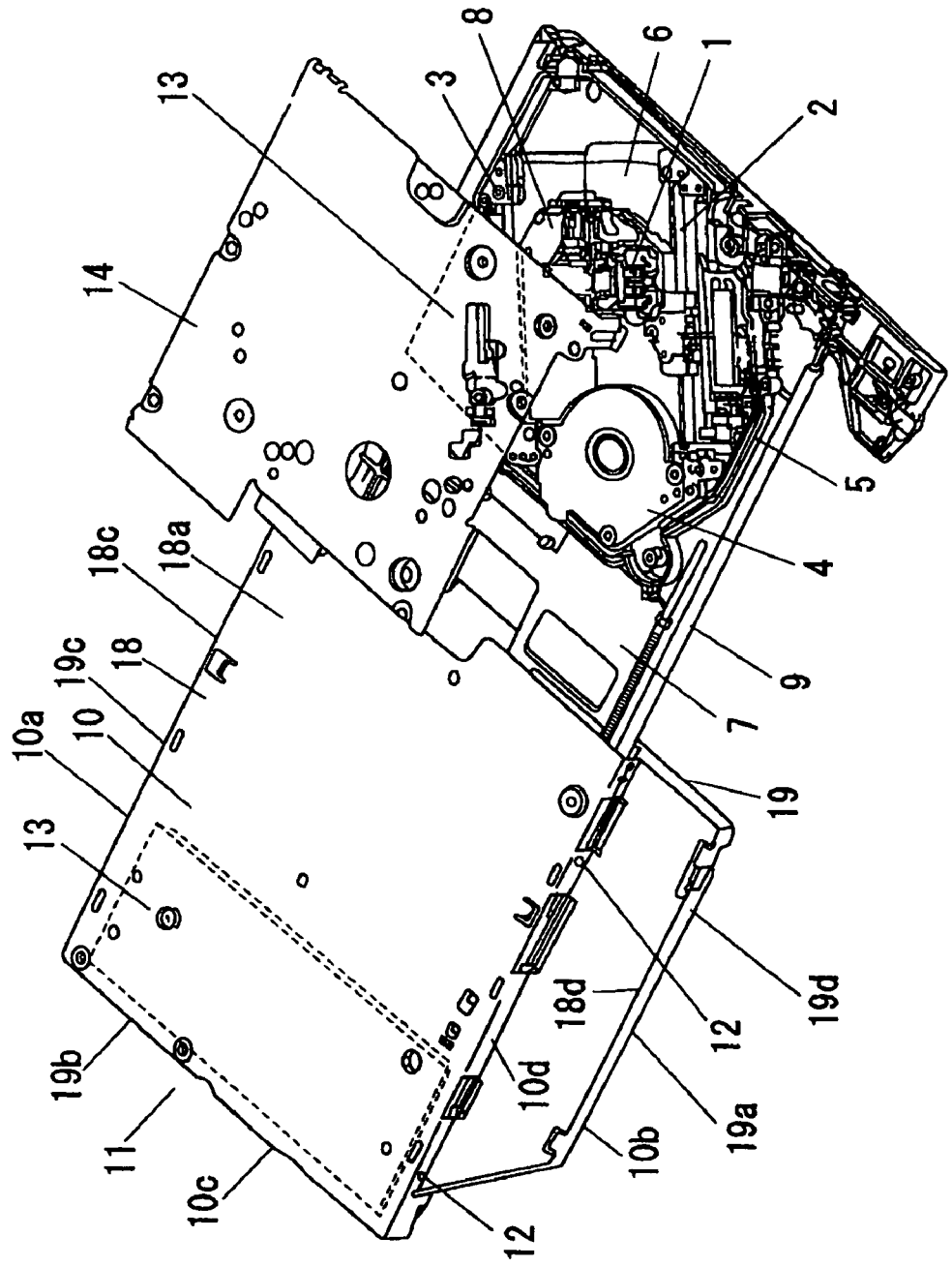
FIG. 1 is a perspective view of an optical disk device according to an embodiment of the invention.
Figure 2:
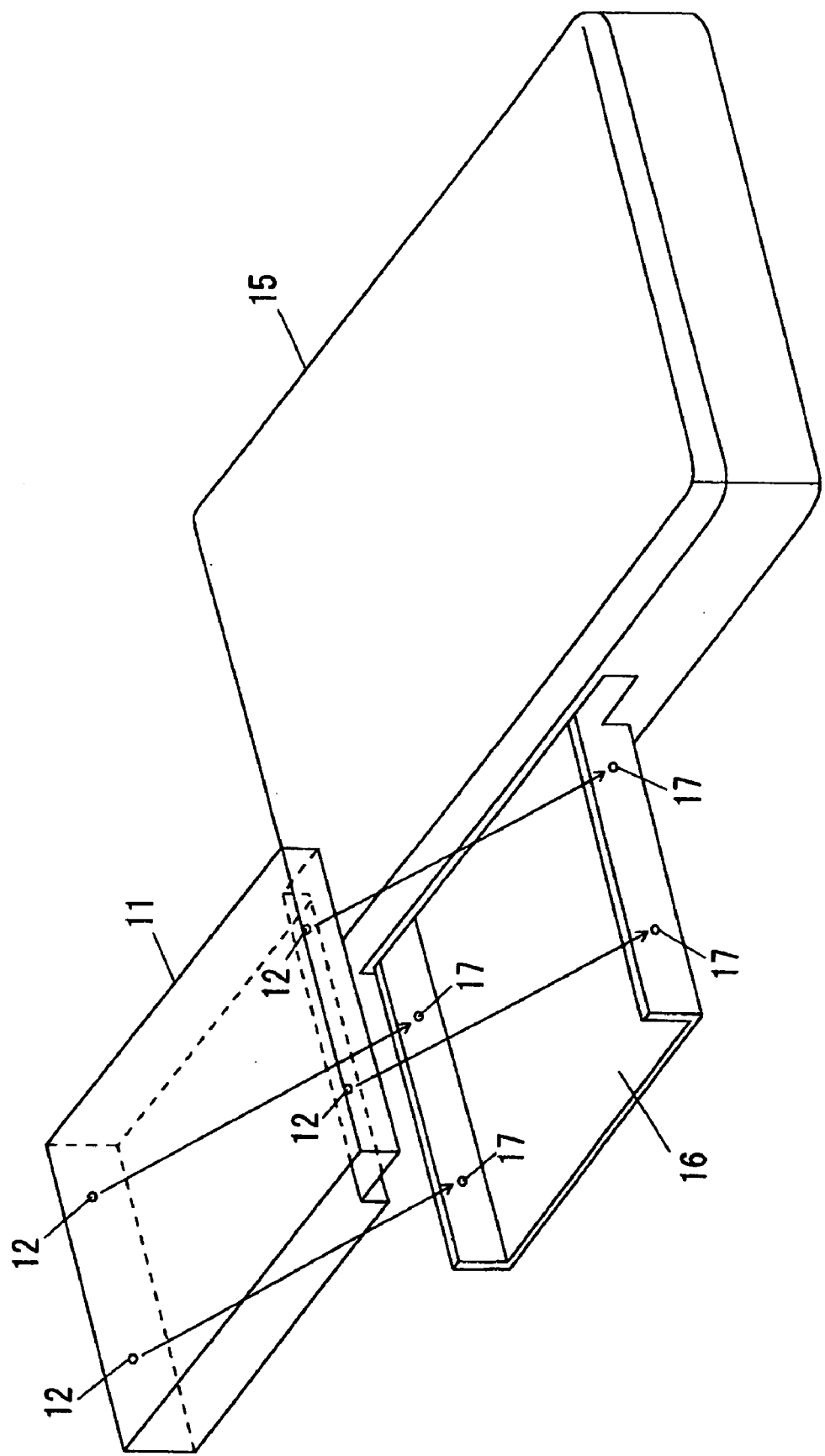
FIG. 2 is a view showing how the optical disk device according to the embodiment is mounted to a mobile electronic device.

FIG. 1 is a perspective view of an optical disk device according to an embodiment of the invention, and FIG. 2 is a view showing how the device is mounted to a mobile electronic device. In FIG. 1, an optical pickup 1 reads/writes data from/to a disk mounted to a spindle motor as it moves in the radial direction of the spindle motor 4 using a main shaft 2 and a sub shaft 3 as a guide. The main shaft 2 and the sub shaft 3 are attached to a base 5 and form an optical pickup module 6 as a whole. The optical pickup module 6 is fixed to a tray 7. The tray 7 slides relative to the case 10 by the rail 9. The tray 7 is drawn out from the case 10 when an optical disk is mounted/dismounted and stored in the case 10 during data reading/writing. A circuit board 13 for forming a control circuit and the like thereon is attached to at least one of the tray and the case. In this way, the optical disk device 11 stored as a whole in the mobile electronic device is formed.

In FIG. 2, the case 10 for the main body of the optical disk device 11 has attachment screw holes 12 for attachment to the computer main body. The mobile electronic device 15 has an attachment 16 through which the device is mounted. Attachment holes 17 on the attachment side and the attachment screw holes 12 on the optical disk device side are engaged by screws and the attachment 16 is mounted to the mobile electronic device 15, so that the optical disk device is securely mounted.

The case 10 includes case members 18 and 19 fitted together and provided with rectangular main surfaces 18a and 19a and side surfaces 18b to 18d and 19b to 19d, respectively. The main surfaces 18a and 19a oppose the tray 7 and the side surfaces 18b to 18d and 19b to 19d are provided upright in the same direction at the periphery of the main surfaces. The side surfaces 18b and 19b are placed on each other to form the back surface 10c of the case 10 and the side surfaces 18c and 19c are placed on each other to form one side surface 10a of the case 10. The side surfaces 18d and 19d are placed on each other to form the other side surface 10b.

A metal plate is for example bent to integrally form the main surfaces and side surfaces of each of the case members 18 and 19. The case members 18 and 19 are each integrally made of a metal material such as iron, an iron alloy, aluminum, an aluminum alloy, and a magnesium alloy. Note that the case members 18 and 19 may have their surfaces plated with a metal film in order to improve their corrosion resistance.

The case member 18 is provided with the circuit board 13 for the circuit that controls at least one of recording and reproducing signal systems and a rail attachment portion (not shown) that movably holds the rail 9 is fixed to the case member 18.

The case members 18 and 19 are fitted together to form the case 10 so that an opening through which the tray 7 protrudes/withdraws is formed. At the time, the case members 18 and 19 are fitted together so that the side surfaces 19b to 19d of the case member 19 are positioned on the outer side than the side surfaces 18b to 18d of the case member 18. The side surface 10b provided with a step 10d is narrower than the other part, and therefore the side surface 18d is almost entirely covered by the side surface 19d with almost no part being exposed in FIG. 1. At the side surface 10a, the upper end of the side surface 18c is covered by the side surface 19c, and therefore the side surface 10a is made of the side surface surfaces 18c and 19c. Similarly at the back surface 10c, the upper end of the side surface 18b is covered by the side surface 19c, and the side surface 10a is made of the side surfaces 18c and 19c.

At least one of the case members 18 and 19 is reduced in thickness so that the weight of the optical disk device 11 is reduced.

When the case members 18 and 19 are fitted together and secured, they are firmly fixed with each other using fixing means such as screws.

According to the embodiment, at least one of the case members 18 and 19 is produced by drawing. More specifically, the case members 18 or/and 19 are formed by drawing rather than bending each side surface with respect to the main surface as conventionally practiced. In this way, the side surfaces adjacent at the corners of the case members 18 and 19 are provided with a part directly and integrally joined without through a slit (unconnected part). In the conventional case, slits (unconnected parts) provided at the parts where the side surfaces meet at the corners of the case members are likely to cause the side surfaces and the main surfaces to deform or bend. Meanwhile, according to the embodiment, at least one of the case members 18 and 19 is formed by drawing, and an integral part continuous to the side surfaces adjacent to each other is provided at each of the corners of the case members 18 and 19, so that the integral part securely fixes the side surfaces. Therefore, the mechanical strength of the side surfaces as well as the mechanical strength of the main surface connected to the side surfaces is considerably improved.

Now, the structure will be described in detail in conjunction with the accompanying drawings.

In the following, the case member 18 will be described by way of illustration.

Figure 3:
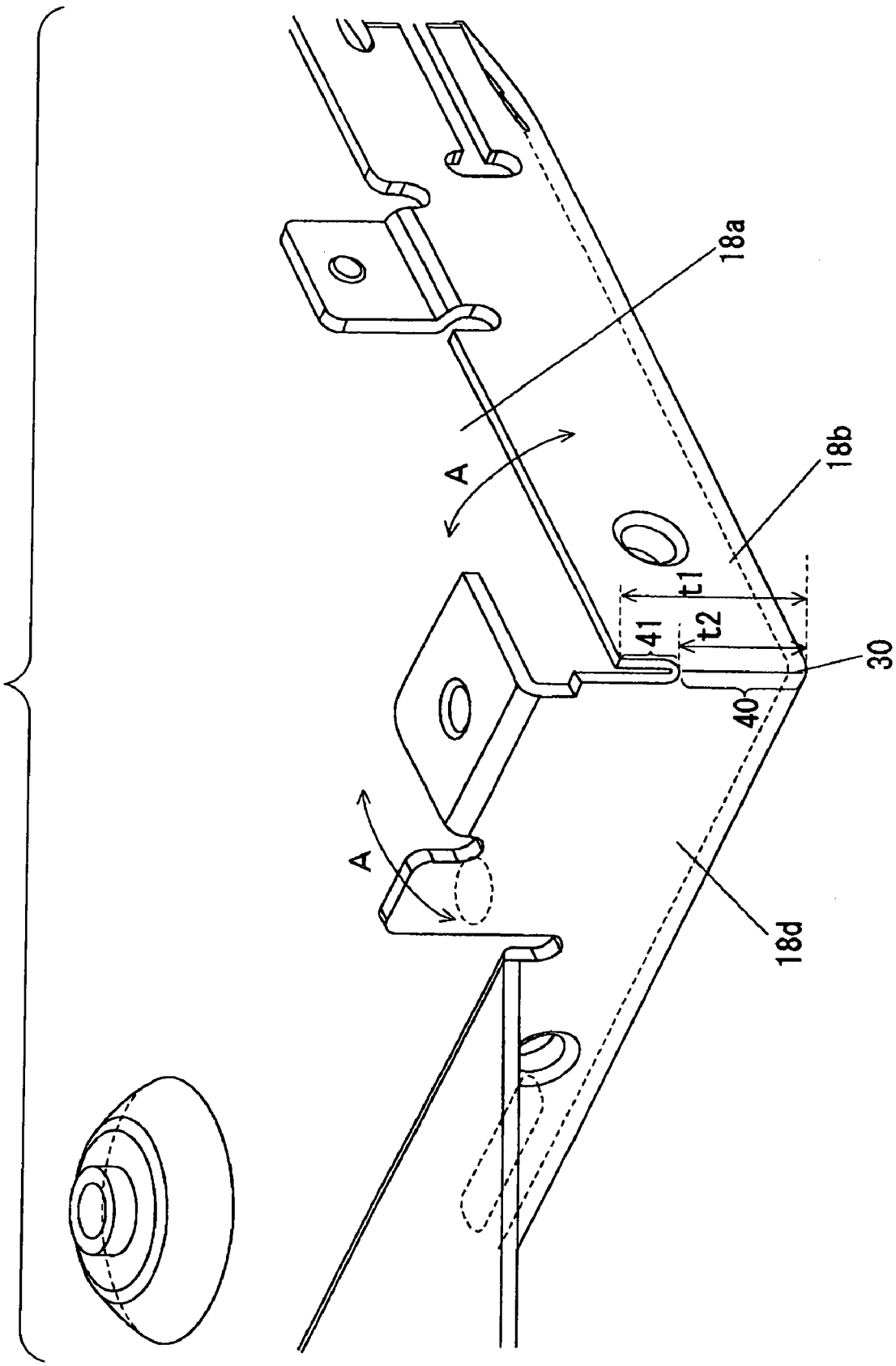
FIGS. 3 to 6 are partly expanded views of the optical disk device according to the embodiment.

As shown in FIG. 3, at a corner 30, there is an integral part 40 where the side surfaces 18b and 18d are continuously provided. The corner 30 has the integral part 40 and a slit part 41 (unconnected part) in this order from the side of the main surface 18a. The integral part 40 can easily be formed by carrying out drawing to sheet metal. The integral part 40 integrates the side surfaces 18b and 18d, and the mechanical strength of the side surfaces 18b and 18d considerably increases. More specifically, even with external force imposed upon the side surfaces 18b and 18d in the direction of arrow A in FIG. 3, the side surfaces 18b and 18d firmly united by the integral part 40 are unlikely to bend or deform. The main surface 18a is less likely to deform because the side surfaces 18b and 18d do not easily deform. The height t2 of the integral part 40 preferably satisfies the relation represented by $t2/t1>0.2$ when the height of the corner 30 is t1. If the integral part 40 is provided so that $t2/t1 \leq 0.2$, the mechanical strength of the side surfaces 18b and 18d may not be sufficiently reinforced by the integral part 40.

Figure 4:
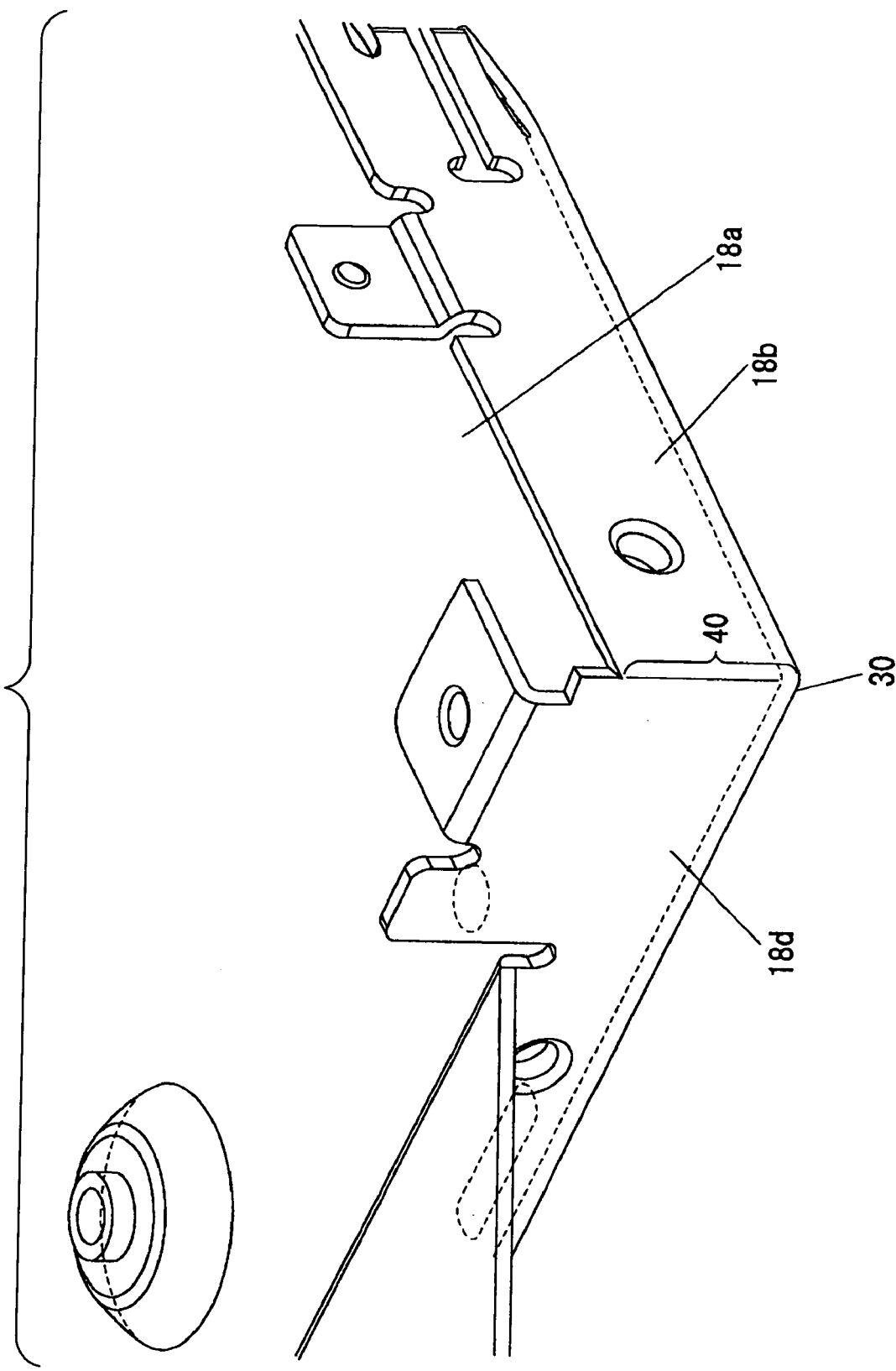

According to another embodiment, as shown in FIG. 4, the entire corner part 30 may be formed as the integral part 40. In this way, the mechanical strength of the side surfaces 18b and 18d can surely be increased, and the strength of the main surface 18a can be considerably increased.

Figure 5:
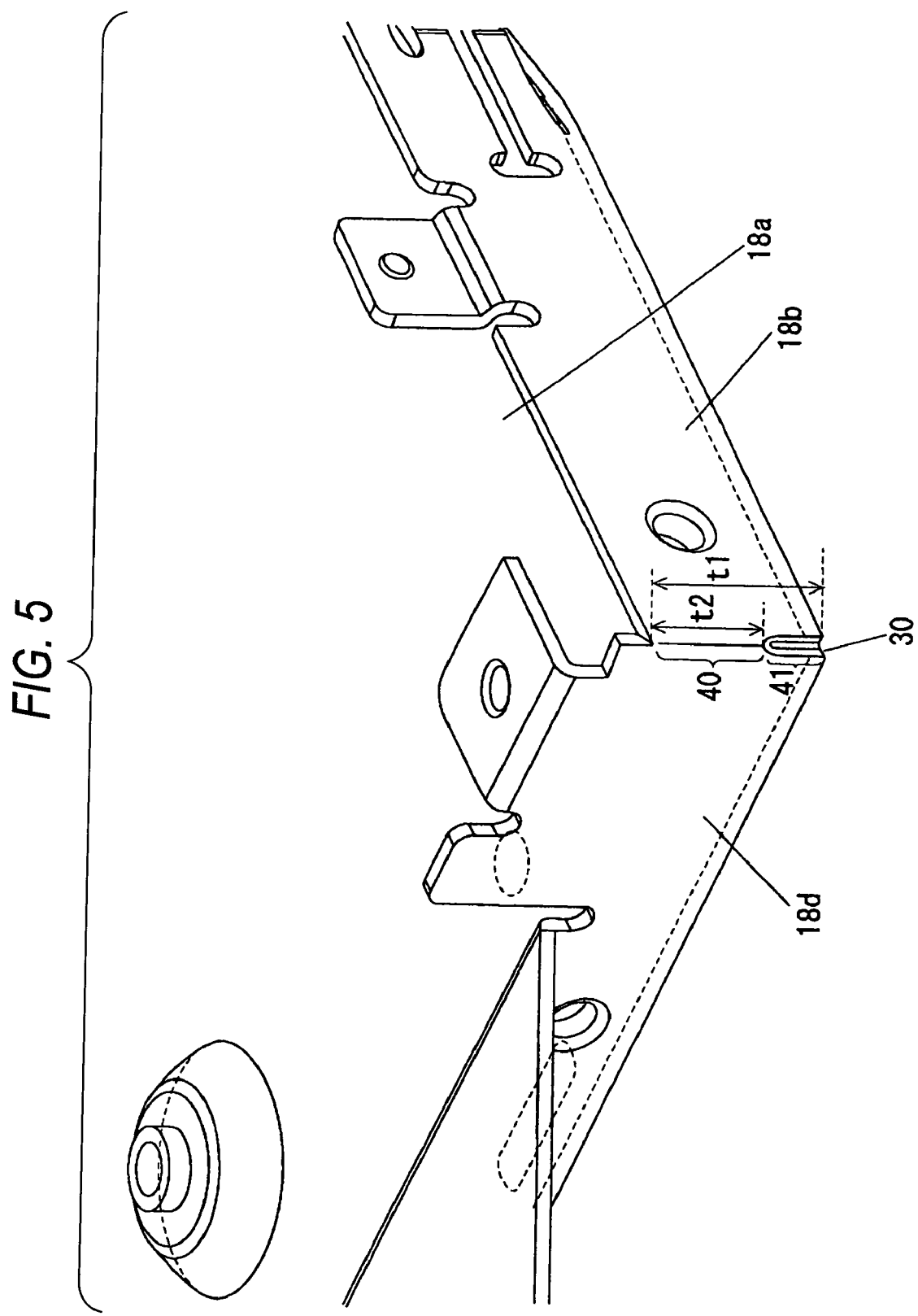

According to yet another embodiment, as shown in FIG. 5, the slit part 41 (unconnected part) and the integral part 40 may be provided in this order from the main surface 18a. As compared to the embodiment shown in FIG. 3, the integral part 40 is provided at the upper end of the side surfaces 18b and 18d, therefore the side surfaces 18b and 18d can be very strong against bending, and their mechanical strength extremely improves. Note that in this example, sufficient mechanical strength can be obtained when t2/t1>0.05.

Figure 6:
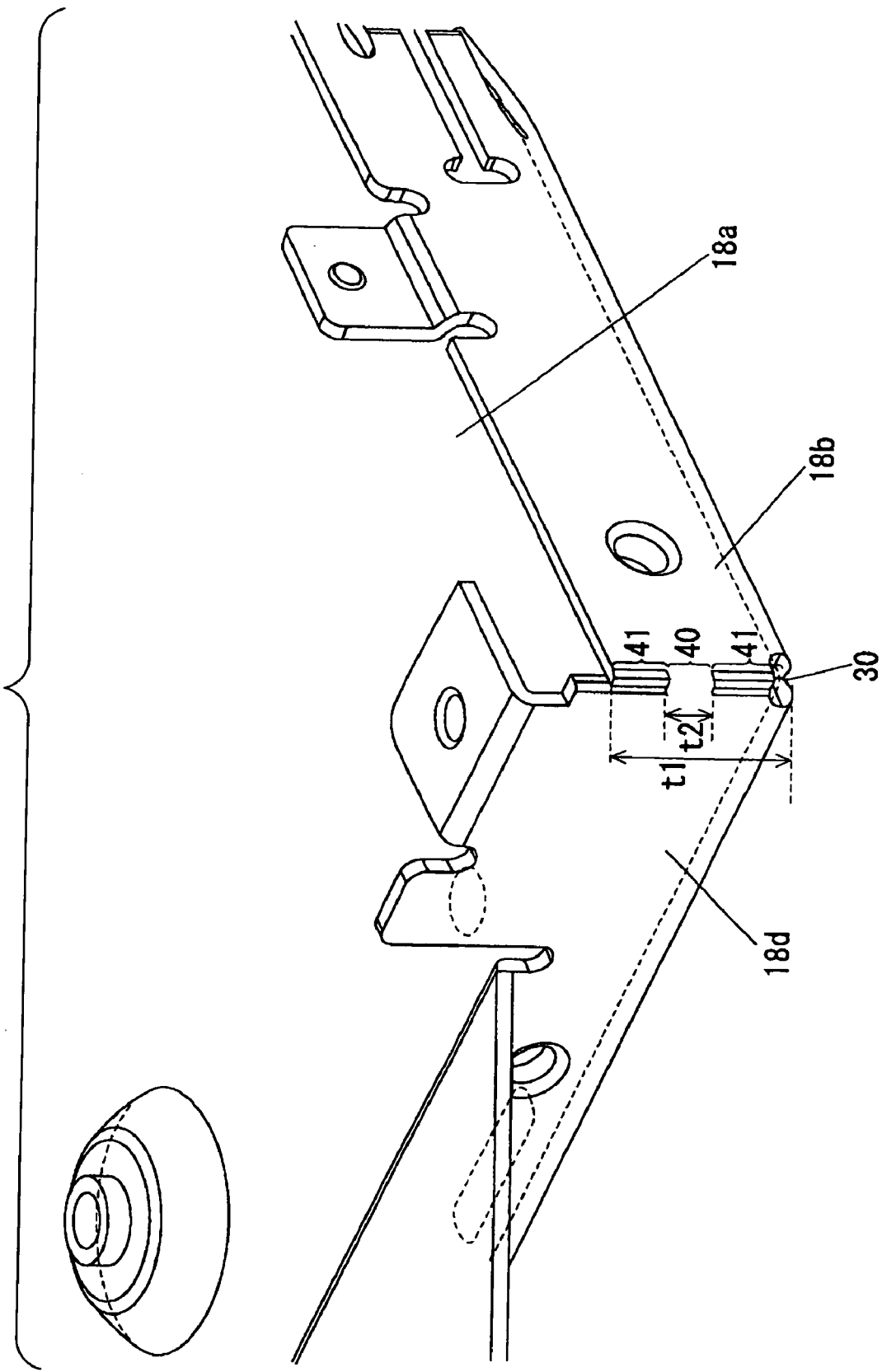

Finally, as shown in FIG. 6, the slit part 41 (unconnected part), the integral part 40, and a slit part 42 (unconnected part) may be provided in this order from the main surface 18a. In this example, sufficient mechanical strength can be obtained even when t2/t1>0.1.

The above described embodiments may be applied as desired depending on requirements and the like as shown in FIGS. 3 to 6.

According to the embodiments, the integral part 40 is provided at all the corners of the case member 18, while the integral part may be provided only at some of the corners. Alternatively, the case member 18 may be provided with no such integral part, while all or some of the corners of the case member 19 may be provided with the integral part 40. Most preferably, all the corners where the side surfaces of the case members 18 and 19 meet are each provided with the integral part 40, so that an optical disk device having extremely high mechanical strength can be provided.

The integral part 40 can easily be formed by drawing or deep drawing, and thus providing the integral part 40 allows the case members 18 and 19 to be reduced in thickness, so that the weight is reduced. When the case members 18 and 19 have reduced thickness in this way, the mechanical length of the case 10 itself can be extremely weak, which is not preferable, and therefore the integral part 40 is provided to prevent the side surfaces from bending and deforming even when at least one of the case members 18 and 19 is reduced in thickness for reducing the weight. In this way, the bending or deforming of the main surfaces 18a and 19a can be reduced. In other words, a lightweight optical disk device can be provided. Today, a thin optical disk device is often provided in a mobile product such as a notebook personal computer, and therefore the optical disk device must have high shock resistance. Therefore, if the case members 18 and 19 are not reduced in weight, the integral parts 40 provided at the corners of at least one of the case members 18 and 19 allows the mechanical strength and hence the shock resistance of the case 10 to be considerably improved.

The integral part 40 formed by drawing as described above can have a C shaped or relatively curved surface, and therefore when the optical disk device is inserted into an electronic device or the like, the rounded corners of the case 10 do not damage the other part of the electronic device by contacting or do not preclude the insertion into the electronic device by catching some part of the electronic device.

Now, a method of how the structure shown in FIG. 3 is produced by drawing will be described by way of illustration.

Figure 7:
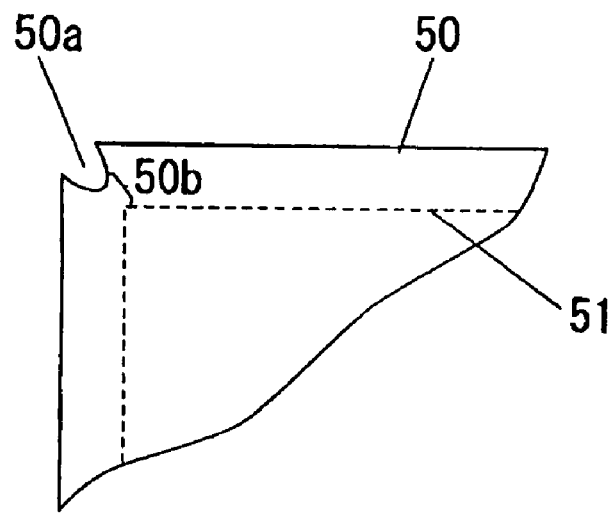
FIGS. 7(a) to 7(c) are views showing the process of producing a case member for the optical disk device according to the embodiment.
Figure 7:
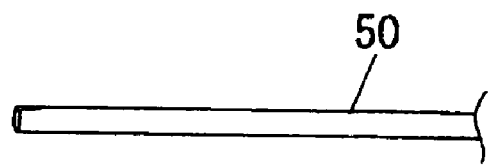
Figure 7:
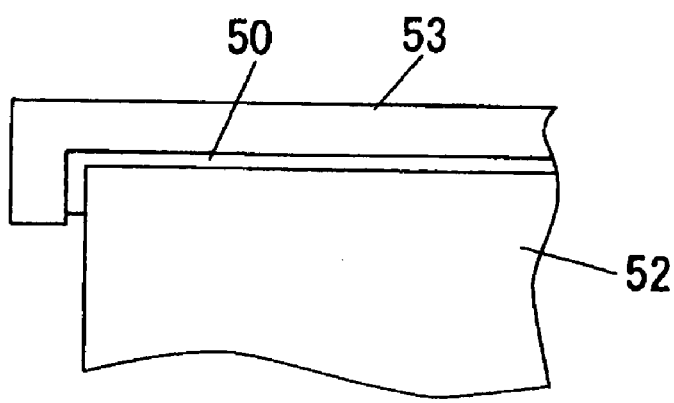
Figure 8:
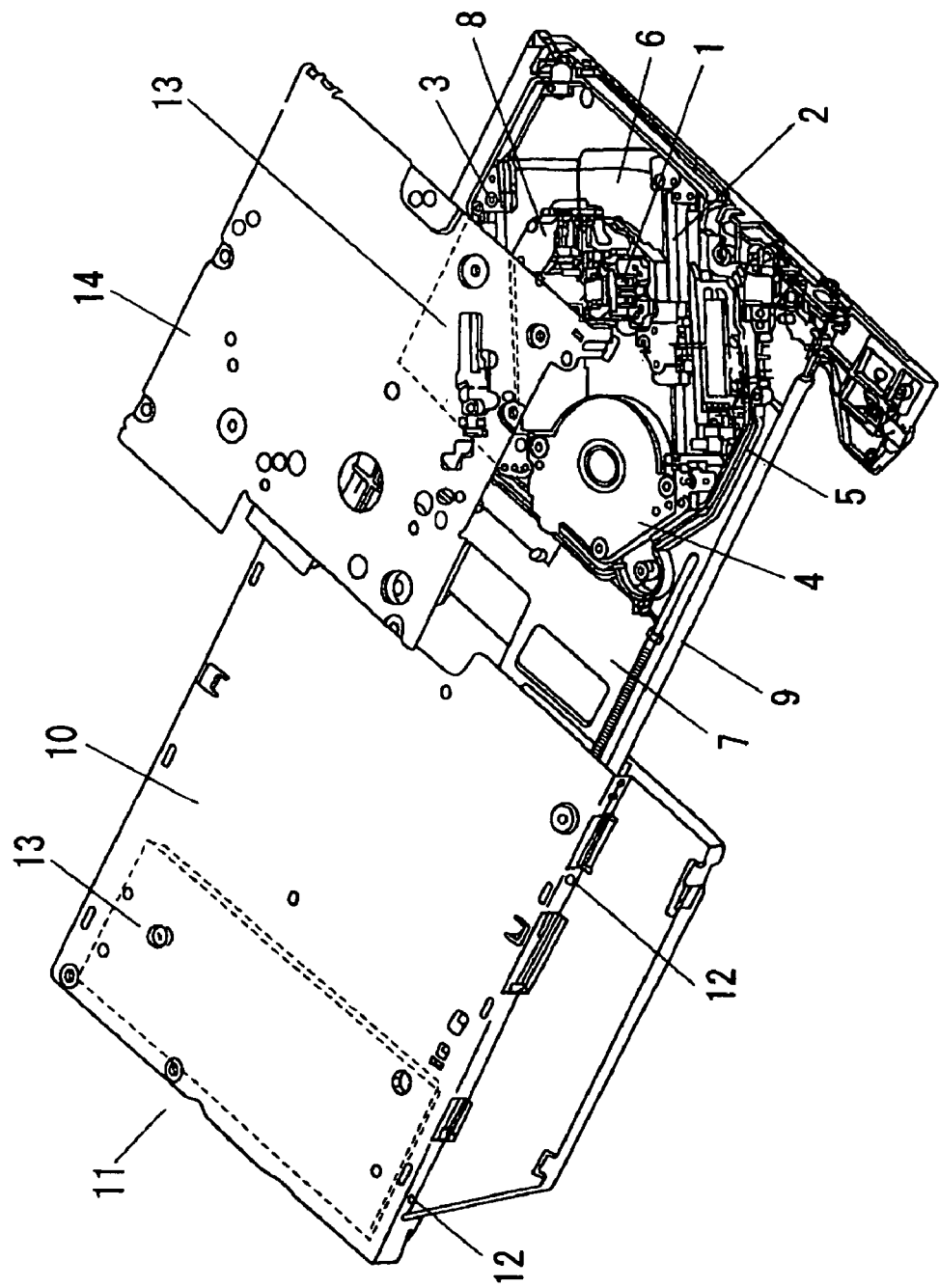
FIG. 8 is a perspective view of a conventional optical disk device.
Figure 9:
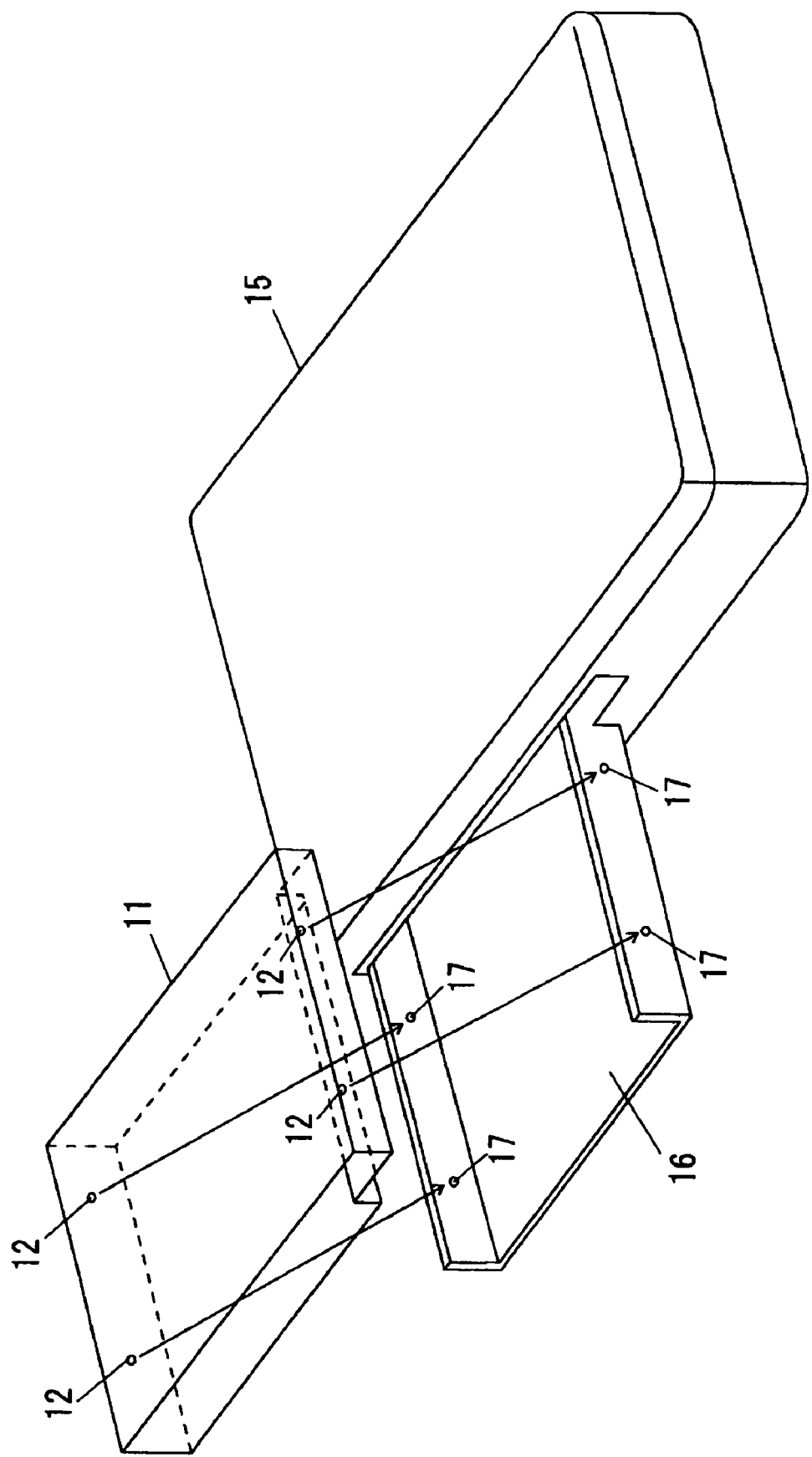
FIG. 9 is a view showing how the conventional disk device is mounted to a mobile electronic device.
Figure 10:
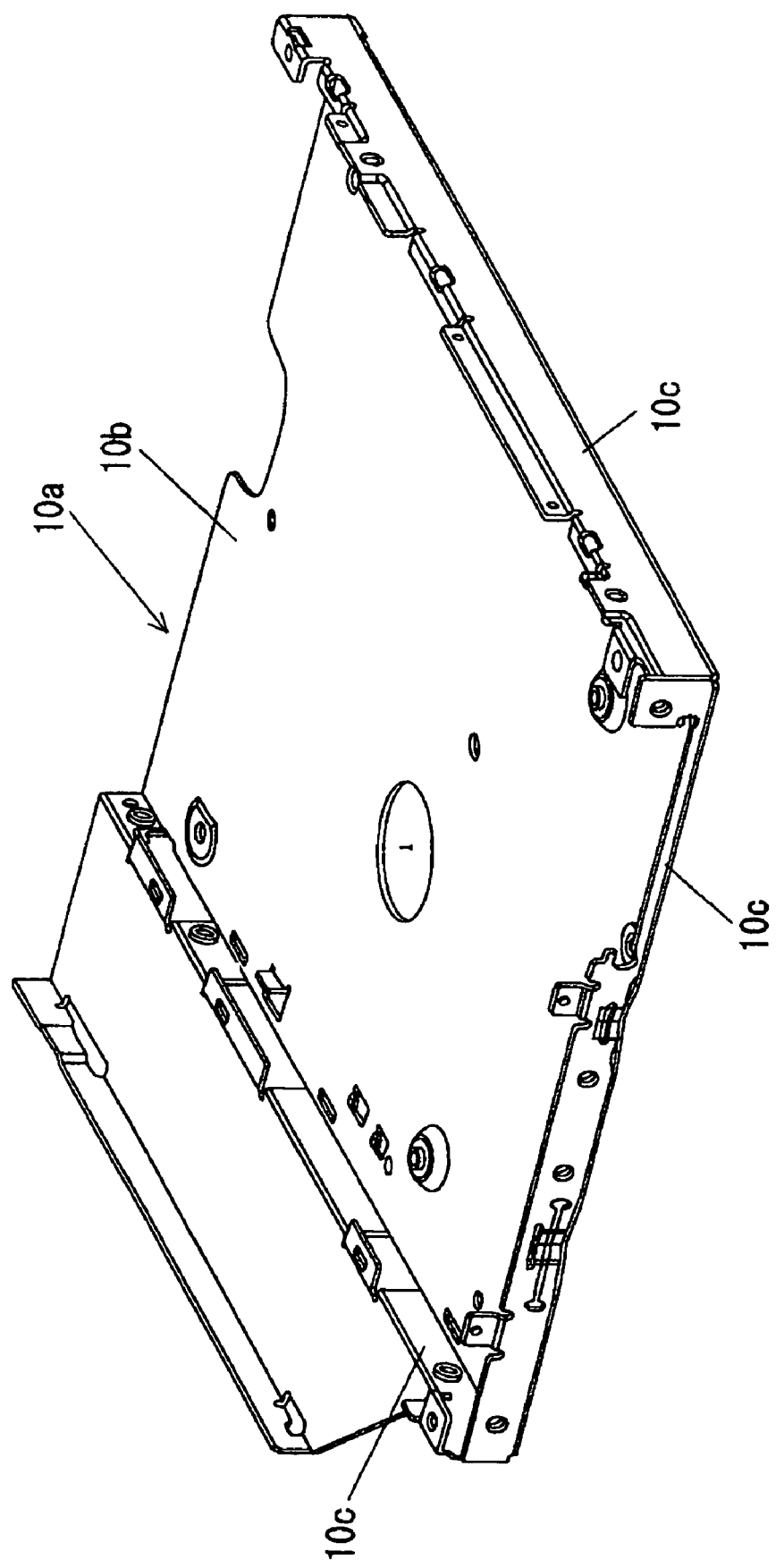
FIG. 10 is a perspective view of a case member in the conventional optical disk device.
Figure 11:
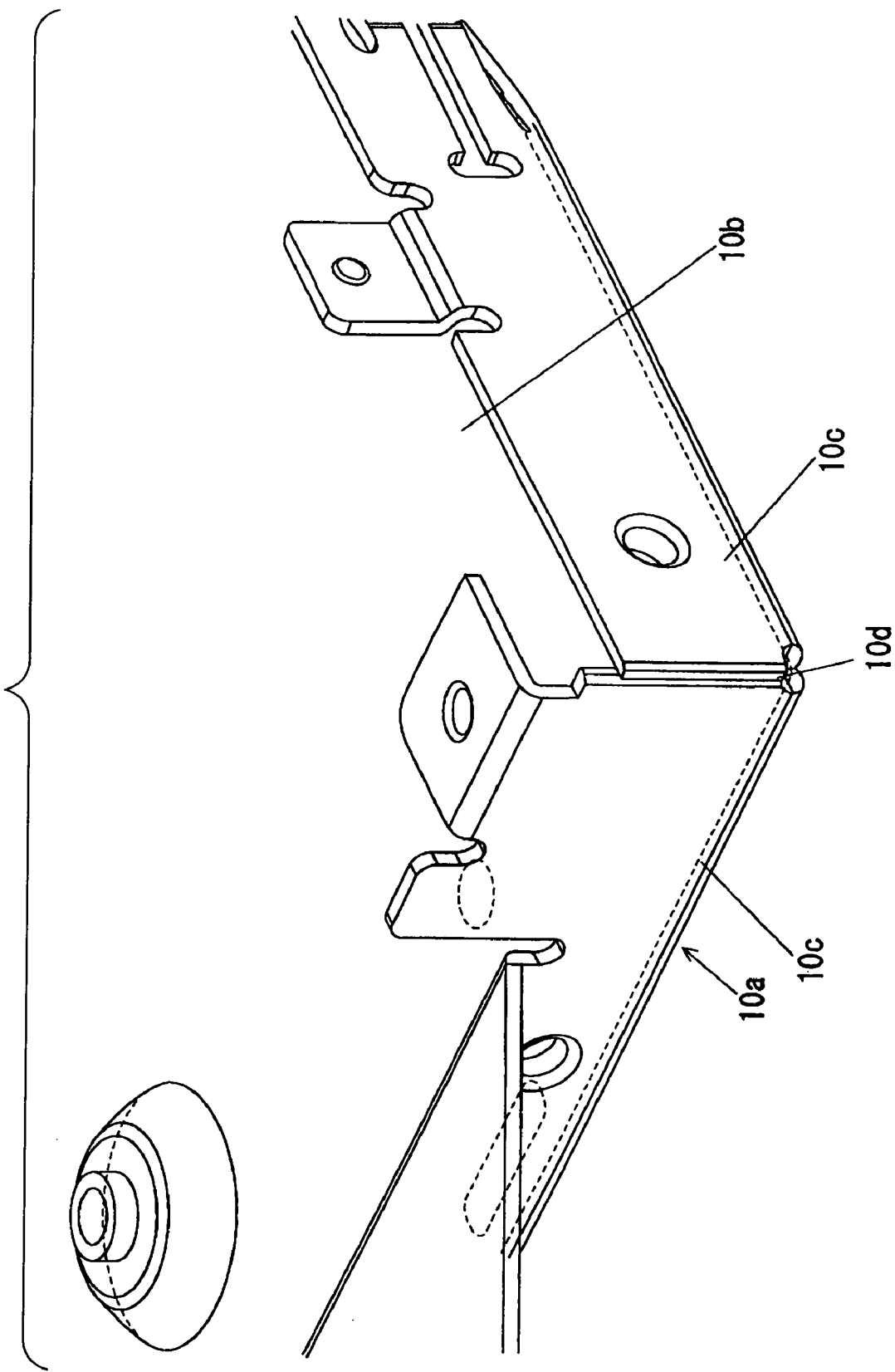
FIG. 11 is a partly expanded view of a case member in the conventional optical disk device.

As shown in FIG. 7(a), a notch 50a is provided at a corner of a metal plate 50, and the part abutting against the outer periphery of a male die 52 is denoted by the dotted line 51. The notch 50a is formed into the slit 41 in FIG. 3, and the part 50b between the dotted line 51 and the notch 50a is formed into the integral part 40. FIG. 7(b) is a sectional view of the metal plate 50. As shown in FIG. 7(c), the metal plate 50 is inserted between the male die 52 and a female die 53 having a substantially L-shaped section, and then after the drawing, the rest of the part is bent or perforated, so that the case member 18 is formed. The case member 19 is produced in the same manner.

The case member 19 is thinner than that of the case member 18 so that the weight of the optical disk device 11 itself is reduced. As described above, the case member 18 holds the tray 7 and the like, and reducing the average thickness of the case 18 lowers the mechanical strength, which can cause troubles related to vibration or bending when the disk device is mounted to another electronic device. In other words, the device may not be able to perform as well as it is intended to.

Therefore, the average thickness of the case member 19 serving rather as a cover is reduced in order to reduce the weight of the optical disk device 11.

More specifically, the average thickness of the case member 18 may be large enough to keep the mechanical strength, while the thickness of the case member 19 can be reduced to reduce the weight as a whole. The average thickness of the case member 18 is from 0.4 mm to 0.9 mm. The average thickness of the case member 19 is from 0.3 mm to 0.58 mm. The thickness ranges of the case members 18 and 19 partly overlap, but basically the case member 18 is formed to have a larger thickness. The average thickness herein refers to the average of the thickness measured at 20 points randomly selected in the main surfaces 18a and 19a. If the average thickness of the case member 18 in the above described range is 1, the average thickness of the case member 19 is preferably from 0.4 to 0.83. If the value is less than 0.4, the mechanical strength of the case member 19 cannot be maintained, and if the value is more than 0.83, the gaps at the side surfaces of the case members 18 and 19 are small, and a protrusion 20 that will be described is of no use.

When the case members 18 and 19 are fitted together and fixed, fixing means such as screws is used to firmly unite them.

Now, the protrusion 20 will be described in detail.

The protrusions 20 are provided at the parts of the side surfaces 19b to 19d of the case member 19 that oppose the side surfaces 18b to 18d of the case member 18. Note that according to the embodiment, two protrusions 20 are provided only at the side surface 19b corresponding to the back surface 10c, but one protrusion or three or more protrusions may be provided. One or more protrusions 20 may be provided at at least one side surface selected among the side surfaces 19b to 19d.

Figure 12:
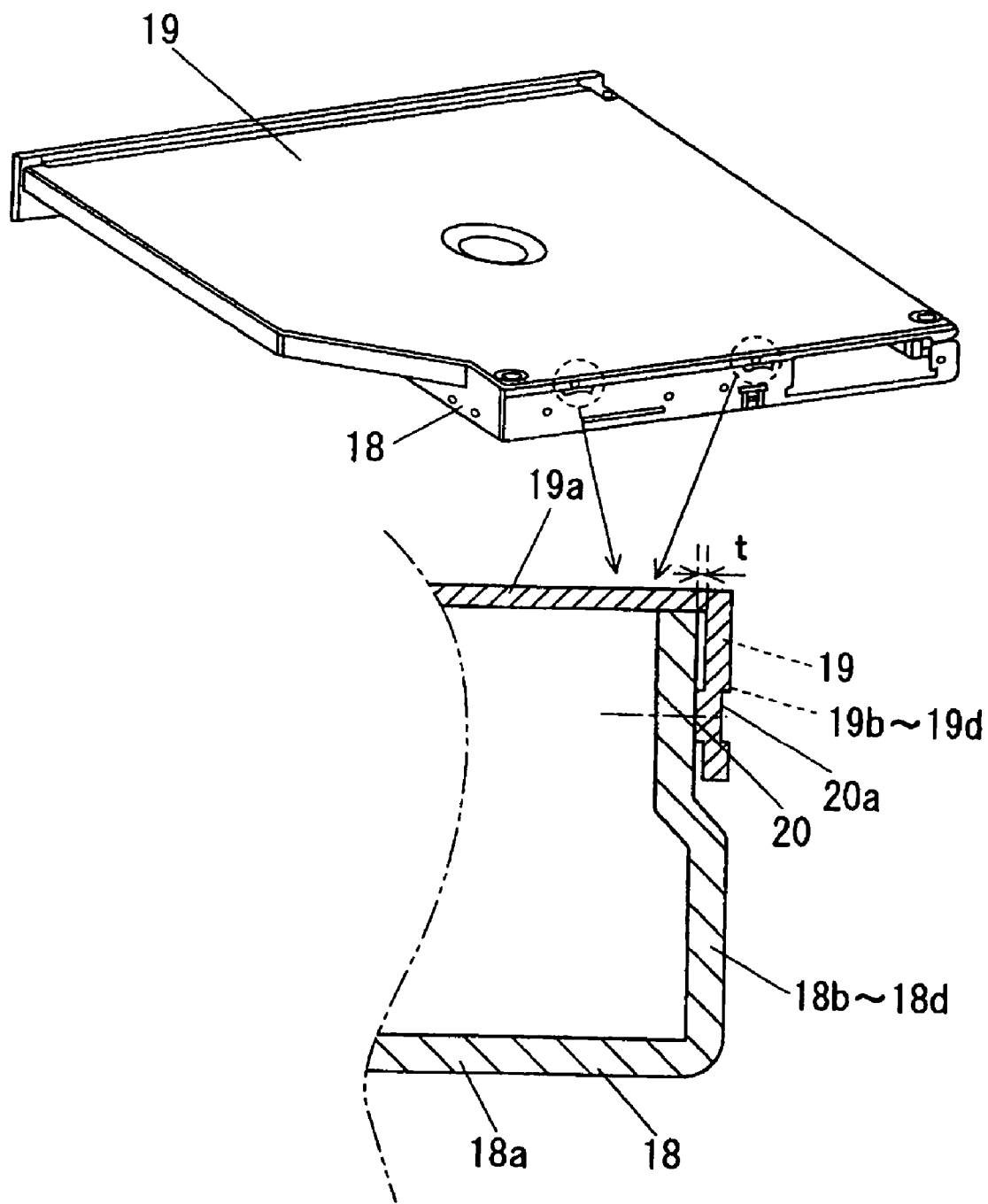
FIGS. 12 and 13 are partly expanded views of an optical disk device according to an embodiment of the invention.

The protrusion 20 is provided integrally with the side surfaces 19b to 19d, and as can be seen from FIG. 12, the protrusion 20 is formed by extrusion process. More specifically, a recess 20a is provided at the part of the side surfaces 19b to 19d on the opposite side to the protrusion 20. The protrusion 20 is columnar according to the embodiment, but the shape may be a triangular, quadratic, or pentagonal prism or a hemisphere. Note that according to the embodiment, the protrusion 20 is integrally provided at at least one of the side surfaces 19h to 19d, while the protrusions 20 of a different material may be formed at the side surfaces 19b to 19d. For example, solder or silver brazing metal may be applied in a dotted pattern to form protrusions. The protruding height t of the protrusion 20 is preferably substantially equal to the difference between the average thickness of the case member 18 and that of the case member 19. When for example the average thickness of the case member 18 is 0.7 mm and the average thickness of the case member 19 is 0.5 mm, the protruding height t of the protrusion 20 is preferably 0.2±0.05 mm (most preferably 0.2 mm).

As in the foregoing, in the process of making the average thickness of the case member 19 smaller than that of the case member 16, the protrusion 20 eliminates the necessity of changing the bending size or position in forming the case member 19 every time the case member 19 is thinned. In addition, the case member 19 does not have to be re-designed every time the case member 19 is thinned, which improves the productivity.

More specifically, when a case member 19 having an average thickness of 0.5 mm and a case member 19 having an average thickness of 0.4 mm are mounted to the case member 18 having a thickness of 0.7 mm, a gap is created between the side surfaces of the case members if there are not the protrusions 20. Then, the case members 18 and 19 are not fitted together well. In order to fill the gap, the bending position or the like must be changed depending on the average thickness as described above. According to the embodiment, simply by producing the protrusions 20 to have a prescribed height (preferably substantially equal to the average thickness of the case members 18 and 19), the top of the protrusions 20 abuts against the inner side surfaces of the side surfaces 18b to 18d of the case member 18, so that the case members 18 and 19 are fitted together less shakily despite the gap created between them. In this way, the case members 18 and 19 may be fixed with each other for example by screws without any troubles, which improves the productivity and the design of the case member 19 can easily be changed.

Figure 13:
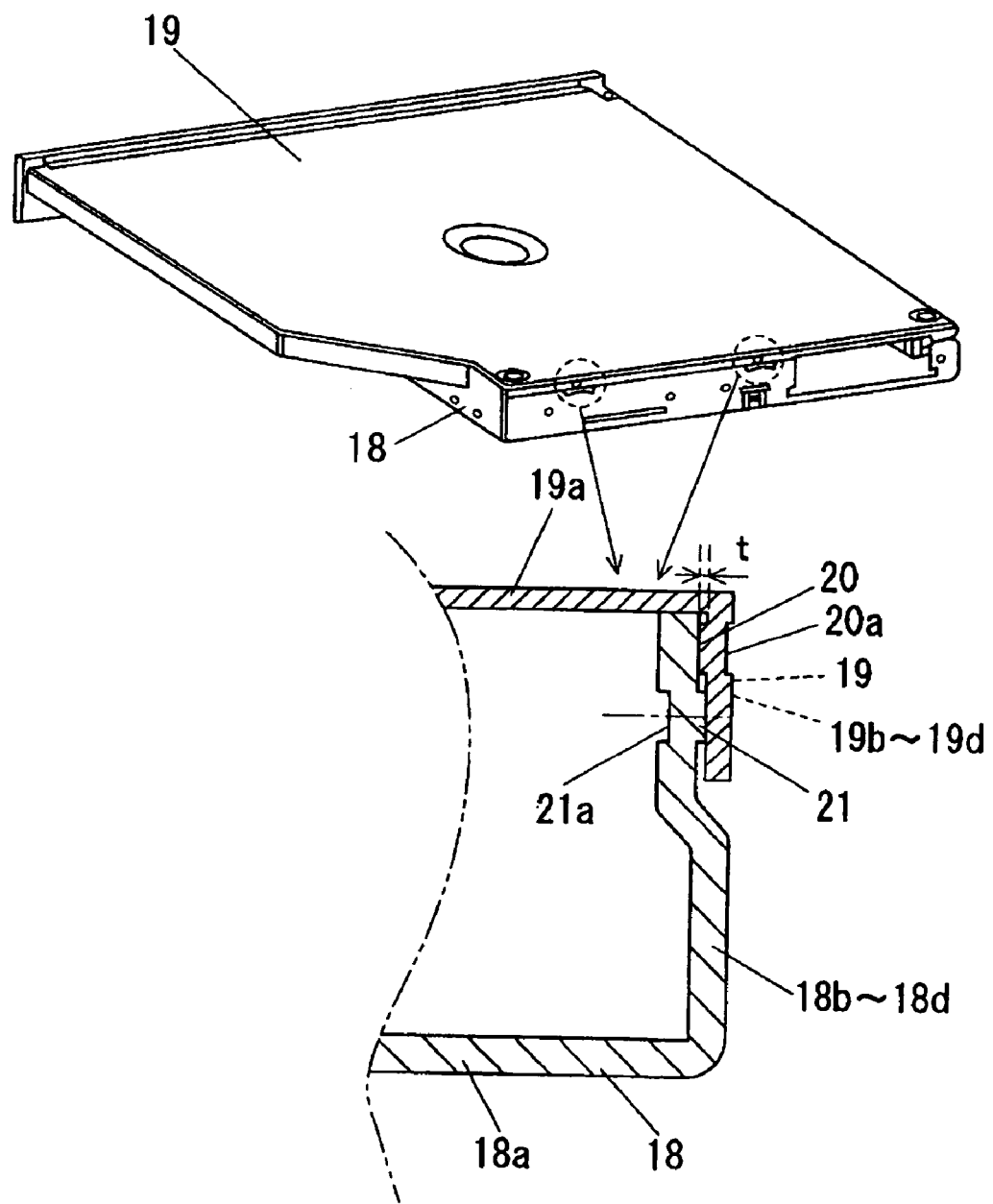

As shown in FIG. 13, not only the case member 19 is provided with the protrusion 20, but also the case member 18 is provided with a protrusion 21 similar to the protrusion 20, in other words, the case members 18 and 19 are provided with the protrusions 21 and 20, respectively, so that even more significant effects may result.

At the time, the protrusions 20 and 21 are preferably provided shifted from one another as shown in FIG. 13 so that the protrusions 20 and 21 do not abut against each other. According to the embodiment, they are aligned in the thickness-wise direction of the case 10 while the protrusions 20 and 21 may be provided alternately in the width-wise direction perpendicular to the thickness-wise direction of the case 10. According to the embodiment, both the protrusions 20 and 21 are provided at one side surface of the case 10. Meanwhile, only the protrusion 20 may be provided at a particular side surface of the case 10, and the protrusion 21 may be provided at the other side surfaces. Alternatively, the protrusions 20 and 21 may be provided at a first side surface of the case 10, only the protrusion 20 may be provided at a second side surface of the case 10, and only the protrusion 21 may be provided a third side surface of the case 10.

The protrusions 20 and 21 have the same height t according to the embodiment, while one of the protrusions 20 and 21 may be higher than the other or the protrusions 20 and 21 may have various heights among themselves depending on the requirements of the case members 18 and 19.

In this way, at least either by drawing the case members 18 and 19 or providing at least the protrusion 21 to the case member 18, the case 10 can have reduced weight.

Now, other ways of reducing the weight will be described in conjunction with FIGS. 14 to 17.

A case 101 includes an upper case member 101a and a lower case member 101b fitted together. The upper and lower case members 101a and 101b are fixed with each other by screws or the like. The case 101 may be made of a metal material such as iron, an iron alloy, aluminum, an aluminum alloy, and a magnesium alloy or a resin material. The upper case members 101a and 101b may be made of materials of the same kind or different kinds. The average thickness of the main plane parts of the upper and lower case members 101a and 101b is from 0.3 mm to 1.6 mm. When the average thickness is relatively small, the upper and lower case members 101a and 101b are made of a metal material and produced for example by press-working a metal plate. When the average thickness is relatively large, the upper and lower case members 101a and 101b are made of a resin material or a die cast material (such as aluminum and a magnesium alloy). When the case 101 is made of a resin material, the optical disk device can have reduced weight.

A tray 102 provided at the case can protrude/withdraw from/into the case. The tray 102 is made of a resin frame and has parts that will be described. A spindle motor 103 is provided at the tray 102. An optical pickup 104 includes at least an optical source and optical elements that are not shown and writes/reads information to/from an optical disk by irradiating the optical disk with light. A bezel 105 provided at the front end of the tray 102 closes the opening through which the tray 102 protrudes/withdraws when the tray 102 is stored in the case 101. The bezel 105 is made of a resin material or a metal material. Rails 106 and 107 are slidably provided at the tray 102 and the case 101, respectively. The rails 106 and 107 are provided along the sides of the tray 102 and the tray 102 is attached to the case 101 in such a manner that the tray 102 can protrude/withdraw from/into the case 101 in the directions denoted by arrow A in FIG. 14. In the upper case member 101a, a through hole 101c is provided at the part opposing the spindle motor 103 when the tray 102 is stored in the case 101.

Figure 16:
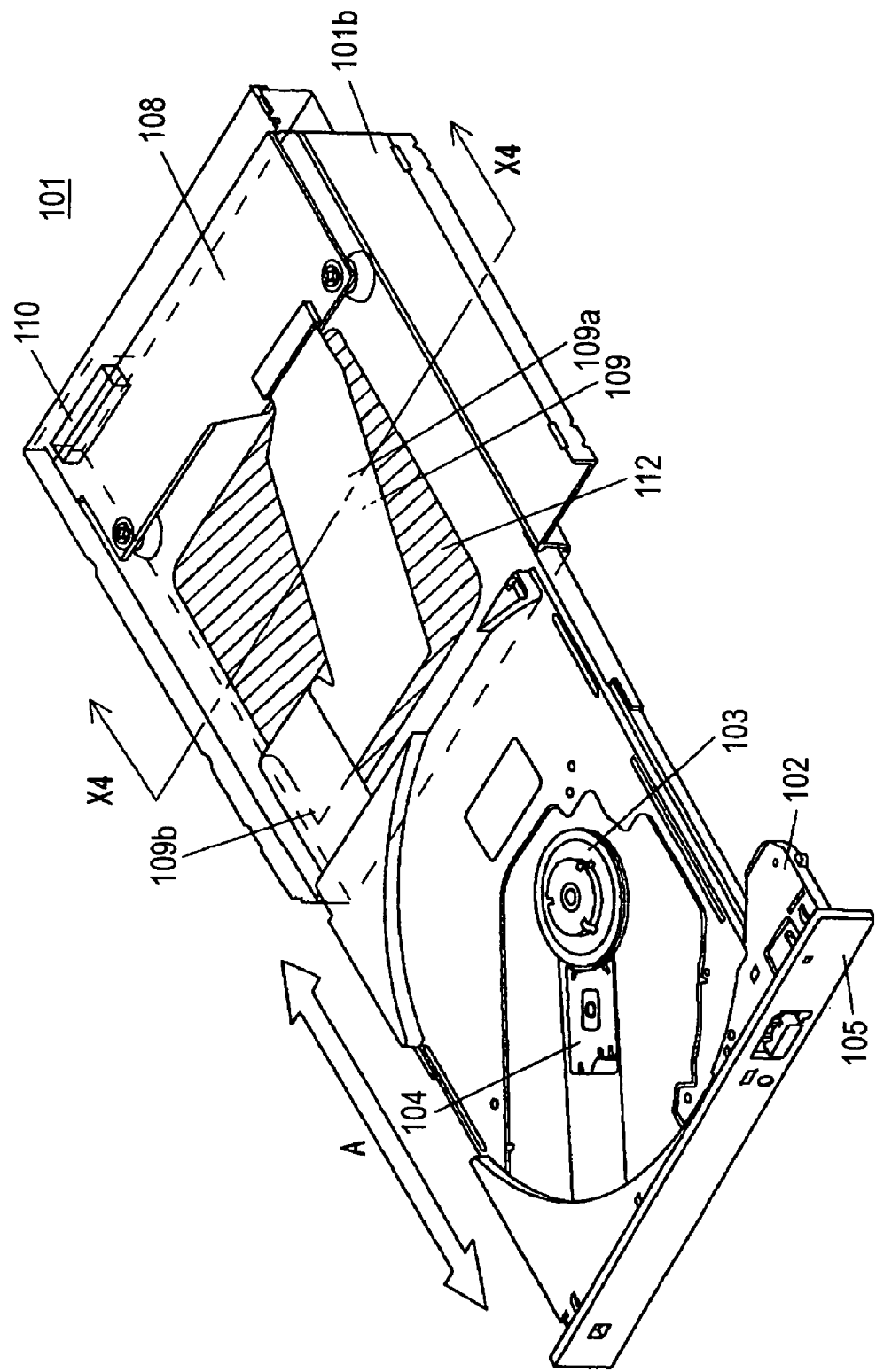
Figure 18:
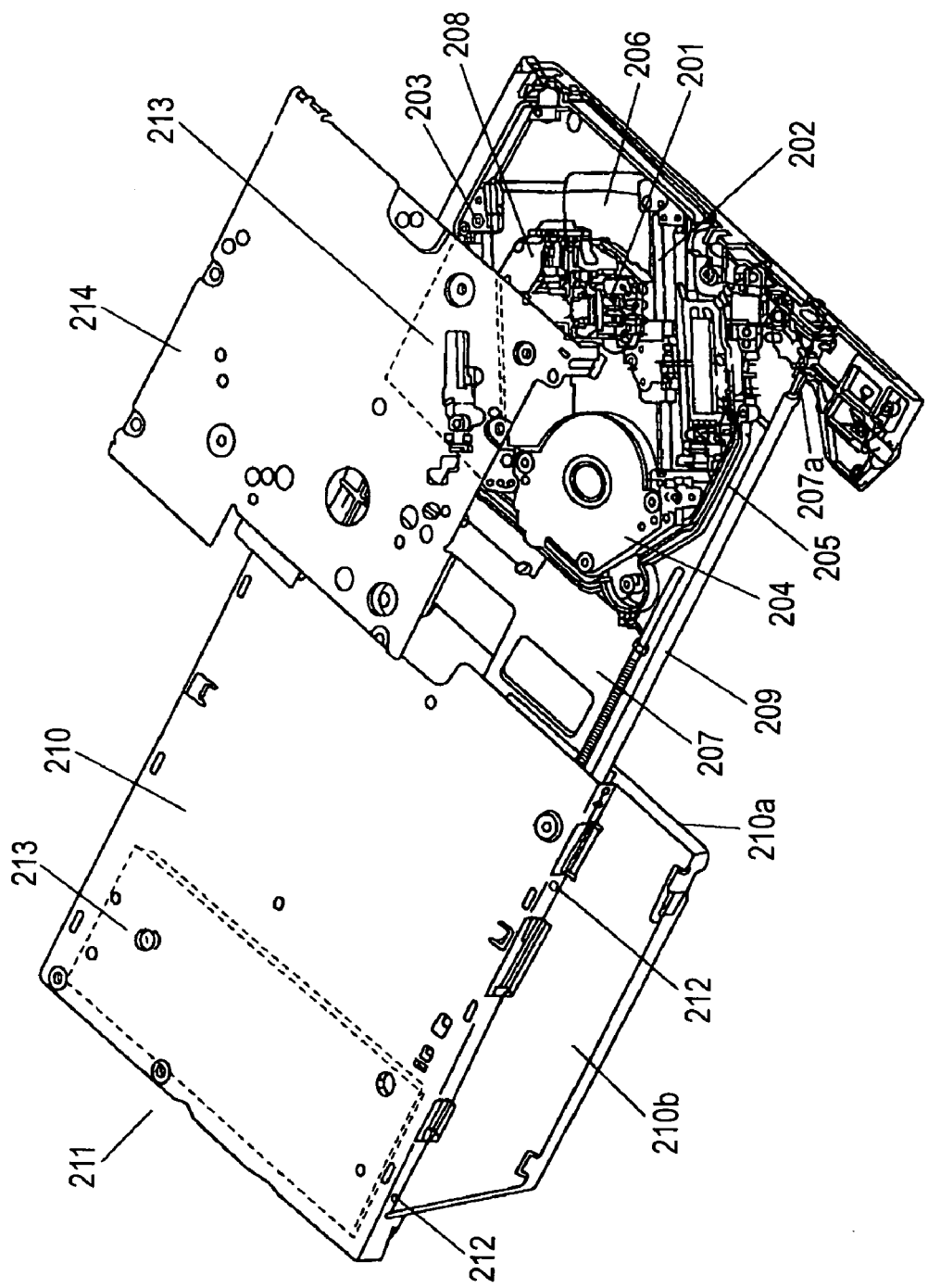
FIG. 18 is a perspective view of an optical disk device according to an embodiment.
Figure 19:
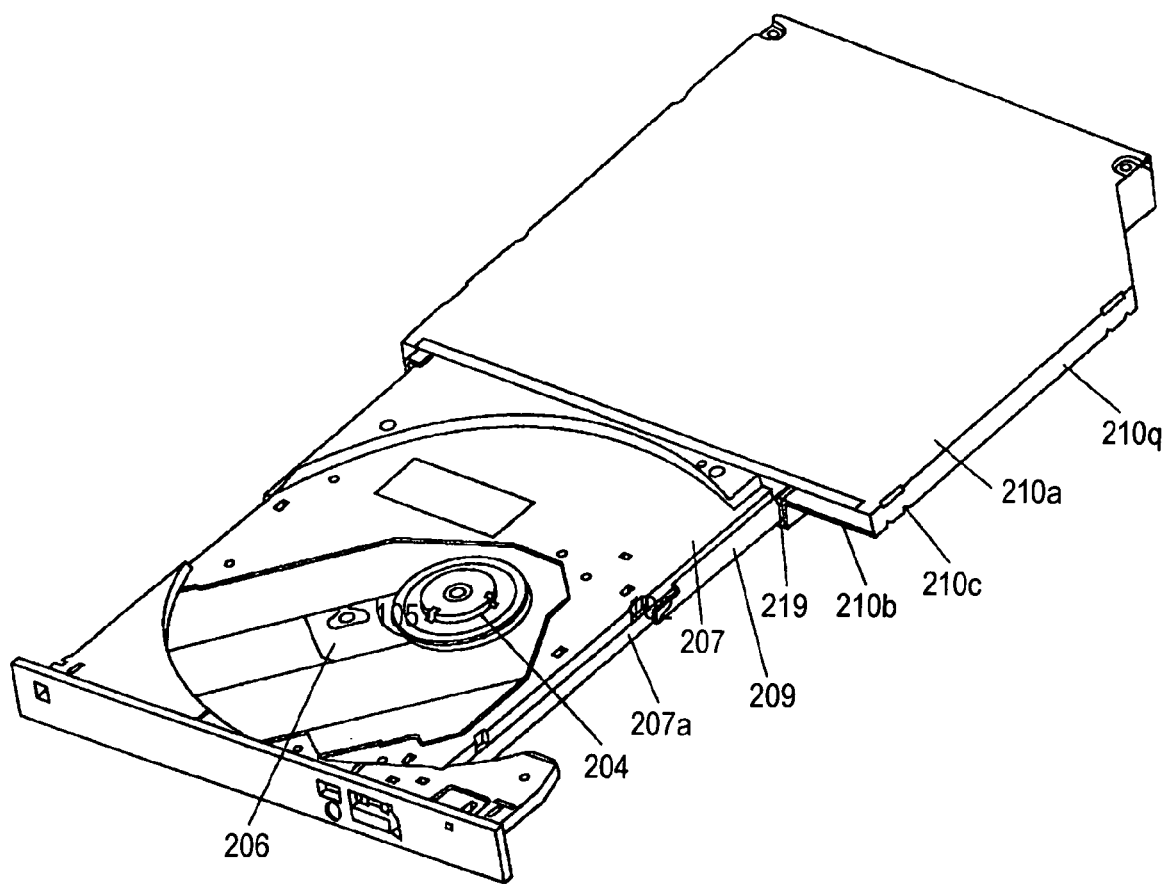
FIG. 19 is a perspective view of the optical disk device according to the embodiment when viewed from the surface.

In FIG. 16, a circuit board 108 is fixed in the back of the case 101 and has an IC for signal processing, a power supply circuit and the like thereon. A flexible printed circuit board 109 electrically connects a circuit board (not shown) provided at the tray 102 and the circuit board 108 and is formed to have an approximately U shape. The printed circuit board 109 includes a fixed part 109a attached to the inner wall of the case 101 and a movable part 109b integrally connected to the fixed part 109a. The fixed part 109a has an end connected to a connector 108a and the movable part 109b has an end electrically connected to a connector (not shown) provided on the circuit board on the tray 102. The movable part 109b is not fixed to the lower case member 101b and therefore bent and connected to the tray 102, which prevents the printed circuit board 109 from being caught somewhere in the case 101 when the tray 102 protrudes/withdraws from/into the case 101. Note that the fixed part 109a is fixed to the lower case member 101b by a double-faced adhesive tape or by an adhesive. The printed circuit board 109 may be placed and fixed between a length of single-faced adhesive tape and the lower case member 101b.

An external connector 110 is connected to a power supply/signal line provided at an electronic device such as a computer. Through the external connector 110, electric power is supplied into the optical disk device, externally applied signals are transferred into the optical disk device, or electrical signals generated by the optical disk device are transmitted to an electronic device.

Figure 14:
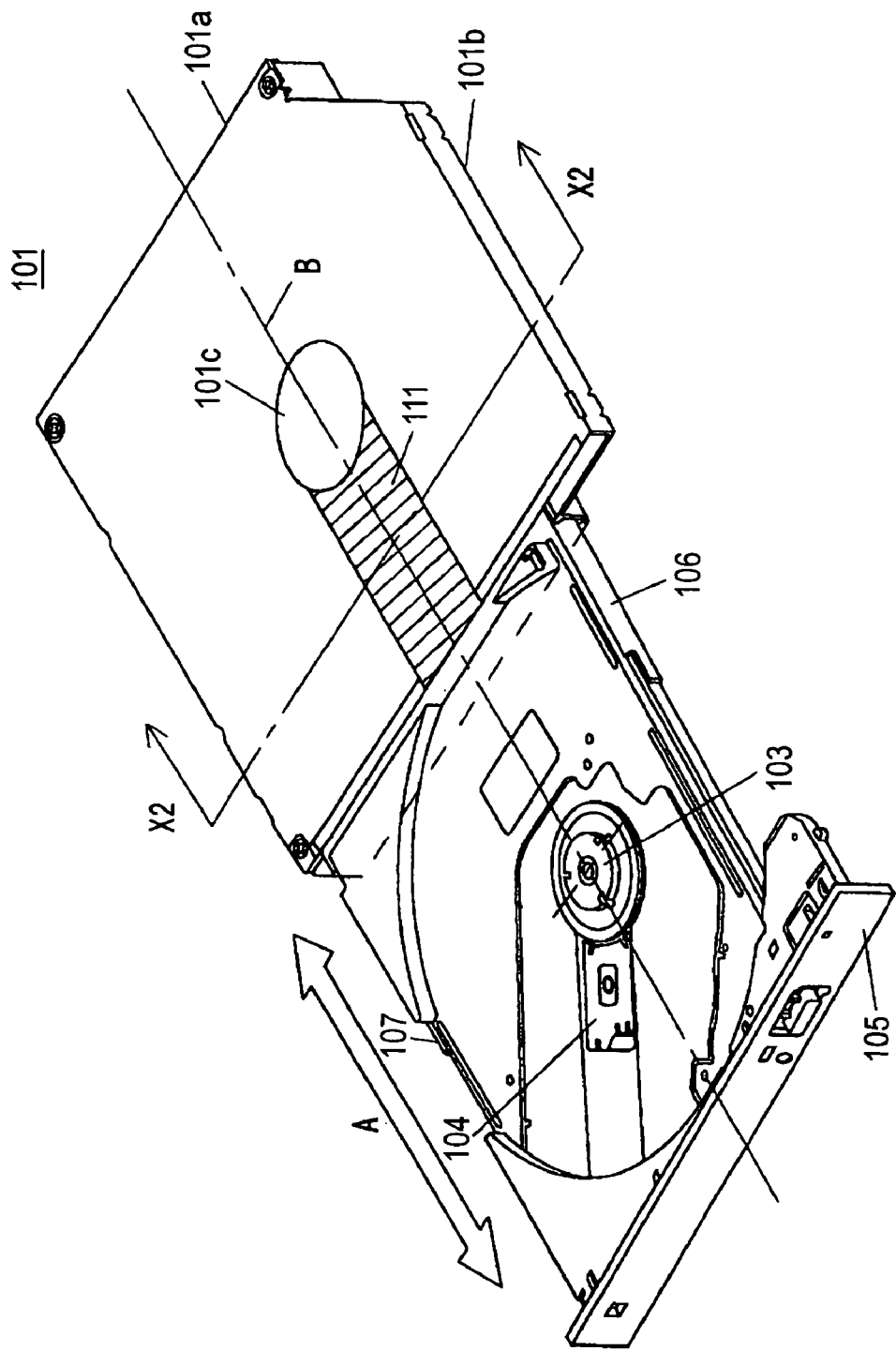
FIGS. 14 to 16 are perspective views of an optical disk device according to an embodiment of the invention.
Figure 15:
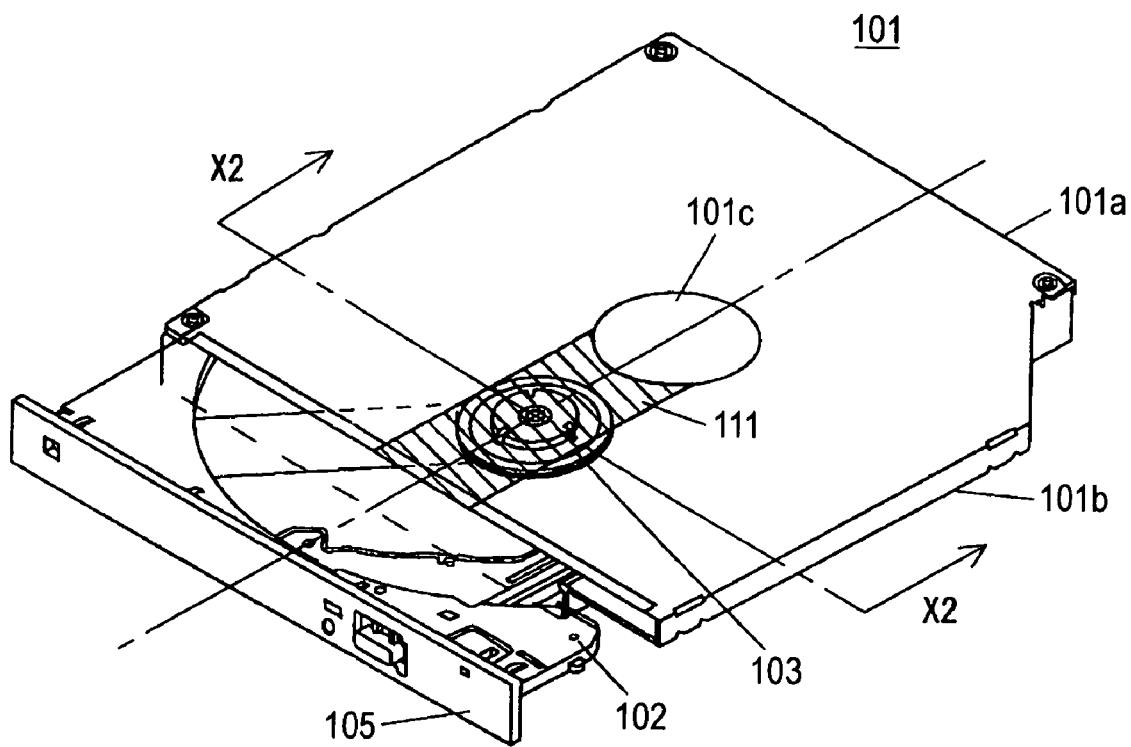

In FIGS. 14, 15, and 17(a), a recess 111 is provided in a position where the spindle motor 103 can oppose the inner wall of the upper case 101a. In this way, by the presence of the recess 111, the upper surface 103a of the spindle motor 103 is less likely to contact the upper case member 101a if the gap between the upper and lower case members 101a and 101b is narrowed. Note that the depth t1 of the recess 111 (see FIG. 17(b)) is preferably from 0.1 mm to 0.6 mm. Note that according to the embodiment, the average thickness of the upper and lower case members 101a and 101b is from 0.3 mm to 1.6 mm, and therefore the depth t1 of the recess 111 should be set as required in consideration of the average thickness. If the depth t1 is smaller than 0.1 mm, the recess 111 is of no use, and the gap between the upper and lower case members 101a and 101b cannot be narrowed enough. Meanwhile, when the depth t1 is larger than 0.6 mm, the upper and lower case members 101a and 101b must have larger thickness. Therefore, the depth t1 is preferably from 0.1 mm to 0.6 mm as described above.

According to the embodiment, the recess 111 is provided in a string shape that extends from the opening to the through hole 101c at the inner wall of the upper case member 101a, but the recess may have a width equal to or larger than the width of the upper surface 103a. The recess may be in various shapes other than the string shape. The recess 111 is provided at a part of the inner wall of the upper case member 101a, so that the device may be thinned while the mechanical strength of the upper case member 101a is maintained. Note that the upper case member 101a is made of a metal material such as a metal plate, and the material can be processed by cutting, etching, drawing or the like. Meanwhile, when the upper case member 101a is made of a resin material or a die cast material (such as aluminum and an magnesium alloy), the material may readily be processed by cutting, resin molding, die casting and the like.

Note that according to the embodiment, the corners 111a of the recess 111 substantially form a right angle, but the sharp angled corners 111a can easily damage members inside when large impact is applied upon the optical disk device, and therefore the corners 111a are preferably tapered or chamfered.

According to the embodiment, the depth t1 of the recess 111 is approximately the same in any locations, but the depth t1 may be reduced or increased toward the through hole 101c or the depth may be reduced or increased in a stepped manner toward the through hole 101c. As shown in FIG. 14, the depth t1 of the recess 111 may be larger in the part on the central line B and may be reduced smoothly or in a stepped manner in the width-wise direction perpendicular to the central line B.

In FIGS. 14, 16, and 17(a), a recess 112 is provided at the inner wall of the lower case member 101b opposing the fixed part 109a. In this way, the gap between the upper and lower case members 101a and 101b in the case 101 can be reduced by the thickness of the printed circuit board 109 (that would not be reduced otherwise) by providing the recess 112 and the fixed part 109a in the recess 112 as described above. Therefore, the device can be thinned accordingly. Note that the depth t2 of the recess 112 (see FIG. 17(c)) is preferably from 0.1 mm to 0.6 mm. Note that according to the embodiment, the average thickness of the upper and lower case members 101a and 101b is from 0.3 mm to 1.6 mm, and therefore the depth t2 of the recess 112 should be set as required in consideration of the average thickness. If the depth t2 is smaller than 0.1 mm, the recess 112 is of no use, and the gap between the upper and lower case members 101a and 101b cannot be narrowed enough. Meanwhile, if the depth t2 is larger than 0.6 mm, the upper and lower case members 101a and 101b must have larger thickness. Therefore, the depth t2 is preferably from 0.1 mm to 0.6 mm as described above. As shown in FIG. 16, the recess 112 (having a rectangular outer shape according to the embodiment) having a greater area than the area of the attached fixed part 109a allows the operation of attaching the fixed part 109a to be easily carried out, which improves the productivity. Note that if the operability may be ignored, the recess 112 may be provided only at the adhesion part of the fixed part 109a, so that the fixed part 109a may be stored in the recess 112 and still the device can be sufficiently thinned. It is understood that the depth t2 of the recess 112 is preferably equal to or larger than the thickness of the printed circuit board 109 plus the thickness of the double-faced tape or adhesive used for attaching the printed circuit board 9. Meanwhile, if the thickness t2 is slightly smaller than the thickness of the printed circuit board 109 plus the double-faced tape or the like and the upper part of the printed circuit board 109 protrudes from the recess 112, the device can still be thinned by the amount of the provided recess 112.

In the process of providing the fixed part 109a of the printed circuit board 109 in the recess 112 and allowing the bent part of the movable part 109b to slide onto the recess 112, the fixed part is positioned almost on the recess 112, so that the bending degree of the bent part of the movable part 109b is somewhat alleviated. Therefore, the printed circuit board 109 can be prevented from being bent sharply and having line disconnection.

According to the embodiment, the recess 112 has a rectangular outer shape or a shape substantially the same as that of the fixed part 109a of the printed circuit board 109, while the fixed part 109a needs only have a storable shape. When the recess 112 is provided at part of the inner wall of the lower case member 101b, the device can be thinned while the mechanical strength of the lower case member 101b is maintained. Note that when the lower case member 101b is made of a metal material such as a metal plate, the material may be processed by cutting, etching, drawing and the like. When the upper case member 101b is made of a resin material or a die cast material, the material may readily be processed by cutting, resin molding, die casting and the like.

Note that according to the embodiment, the corners 112a of the recess 112 substantially form a right angle, but the sharp angled corners 112a can easily damage members inside when large impact is applied upon the optical disk device, and therefore the corners 112a are preferably tapered or chamfered.

According to the embodiment, the depth t2 of the recess 112 is approximately the same in any locations, but the depth t2 may be reduced or increased from the center of the recess 112 to the ends or the depth may be reduced or increased in a stepped manner from the center of the recess 112 to the ends.

At least one of the recesses 111 and 112 is provided, and the optical disk device can be thinned. The depths t1 and t2 of the recesses 111 and 112 are approximately the same, but they may be different depending on the requirements of the device and the parts.

Note that according to the embodiment, a flexible printed circuit board that can be suitably thinned and easily handled is used as line connection means, but something deformable such as a flat cable and a lead can be used.

In this way, at least either the line connection means whose thickness would otherwise impede the thinning of the device is stored in the recess provided in the case or the recess is provided excluding the top surface of the driving means. Therefore, the gap between the case members can be narrowed without reducing the thickness of the case, and the device can be thinned. Even without narrowing the gap between the case members, the bending degree of the bent part of line connection means such as the flexible printed circuit board is less sharp by providing the line connection means in the recess and therefore the line connection means can be prevented from being disconnected.

In this way, at least the case members 18 or/and 19 are subjected to drawing or the case member 18 is provided with at least the protrusion 21 in the optical disk device described above and in addition at least one of the recesses 111 and 112 is provided at each of the case members, so that both the thickness and weight can be reduced.

Another way of reducing the weight will be described in conjunction with FIGS. 18 to 27(c). When the weight is reduced, the strength of the parts of the case may be reduced. The following embodiment is directed to a solution to such a problem. The figures show an optical pickup 201, a main shaft 202, a sub shaft 203, a spindle motor 204, a base 205, a pickup module (PUM) 206, a tray 207, a carriage 208, a rail 209, a case 210, an optical disk device 211, an attachment screw hole 212 on the optical disk device side, a circuit board 213 having a control circuit and the like thereon, and a frame 214. The pickup module 206 and the tray 207 oppose a bottom surface 210$h$.

The case 210 includes an upper cover 210$a$ and a lower cover 210$b$. The case 210 is made of a material strong enough to hold the elements of the optical disk device 211 and to be fixed to an electronic device. The material is preferably a metal material such as iron, an iron alloy, aluminum, an aluminum alloy, and a magnesium ally, particularly preferably a lightweight metal material such as aluminum and an aluminum alloy. The surface of the material may be plated with a metal film in order to improve its corrosion resistance. The case 210 may be a resin material that can maintain strength despite its small thickness.

Figure 20:
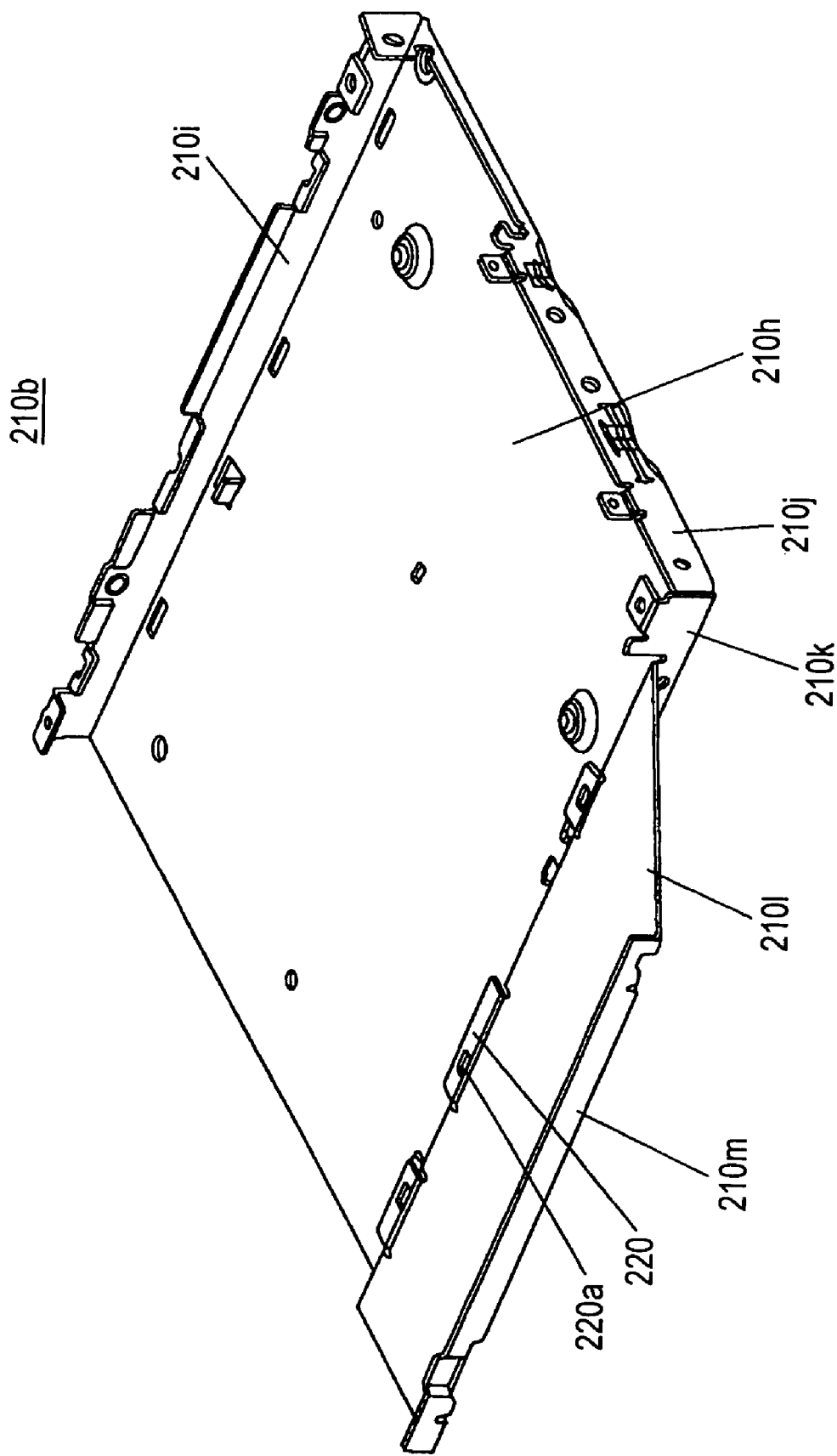
FIG. 20 is a perspective view of a lower cover according to the embodiment.

The upper cover 210$a$ is a flat plate shape and has a side surface 210$q$ approximately perpendicular to an end. In FIG. 20, in the lower cover 210$b$, side surfaces 210$i$, 210$j$, and 210$k$ approximately perpendicular to the bottom surface 210$h$ are provided at the three sides excluding the side for drawing out the tray among the four sides of the regular square or rectangular bottom surface. Among the three side surfaces approximately perpendicular to the bottom surface 210$h$, the distance between the two sides 210$i$ and 210$k$ parallel to the direction in which the tray 7 is drawn out is smaller than the diameter of a maximum size disk to be mounted. Therefore, the end of the side surface 210$k$ is substantially parallel to the bottom surface 210$h$ and is bent with respect to the side surface 210$k$ in the direction opposite to the bottom surface 210$h$ in order to avoid interference with the disk and thus forms a sub bottom surface 210$l$. At the end of the sub bottom surface 210$l$, a side surface 210$m$ is formed substantially parallel to the side surface 210$i$ and on the opposite side to the side surface 210$k$ with respect to the sub surface 210$l$ at such a distance not to interfere with a disk having the maximum diameter. The upper and lower covers 210$a$ and 210$b$ are engaged with each other in several locations between the side surface 210$q$ of the upper cover 210$a$ and the side surfaces 210$i$, 210$j$, 210$k$, and 210$m$ of the lower cover 210$b$.

A flat plate shaped protrusion 220 substantially parallel to the bottom surface 210$h$ is formed from the side surface 210$k$ toward the bottom surface 210$h$. The structure described above is preferably made from a sheet of plate metal by processing including bending for the ease of processing. The protrusion 220 may be formed so that the shape of the protrusion 220 is cut in the side surface 220, and the root of the protrusion 220 is not bent when the sub bottom surface 210$l$ is bent.

Rail guides 219 and 219$g$ are provided in contact with the side surfaces 210$i$ and 210$k$ on the side of the bottom surface 210$h$. A rail 209 is movably held at the rail guides 219 and 219$g$, and a tray 207 is held movably at the rail 209 by a rail holding portion 207$a$.

Now, the structure of the lower cover 210$b$, and the rail guides 219 and 219$g$ will be described in detail in conjunction with FIG. 21.

Figure 21:
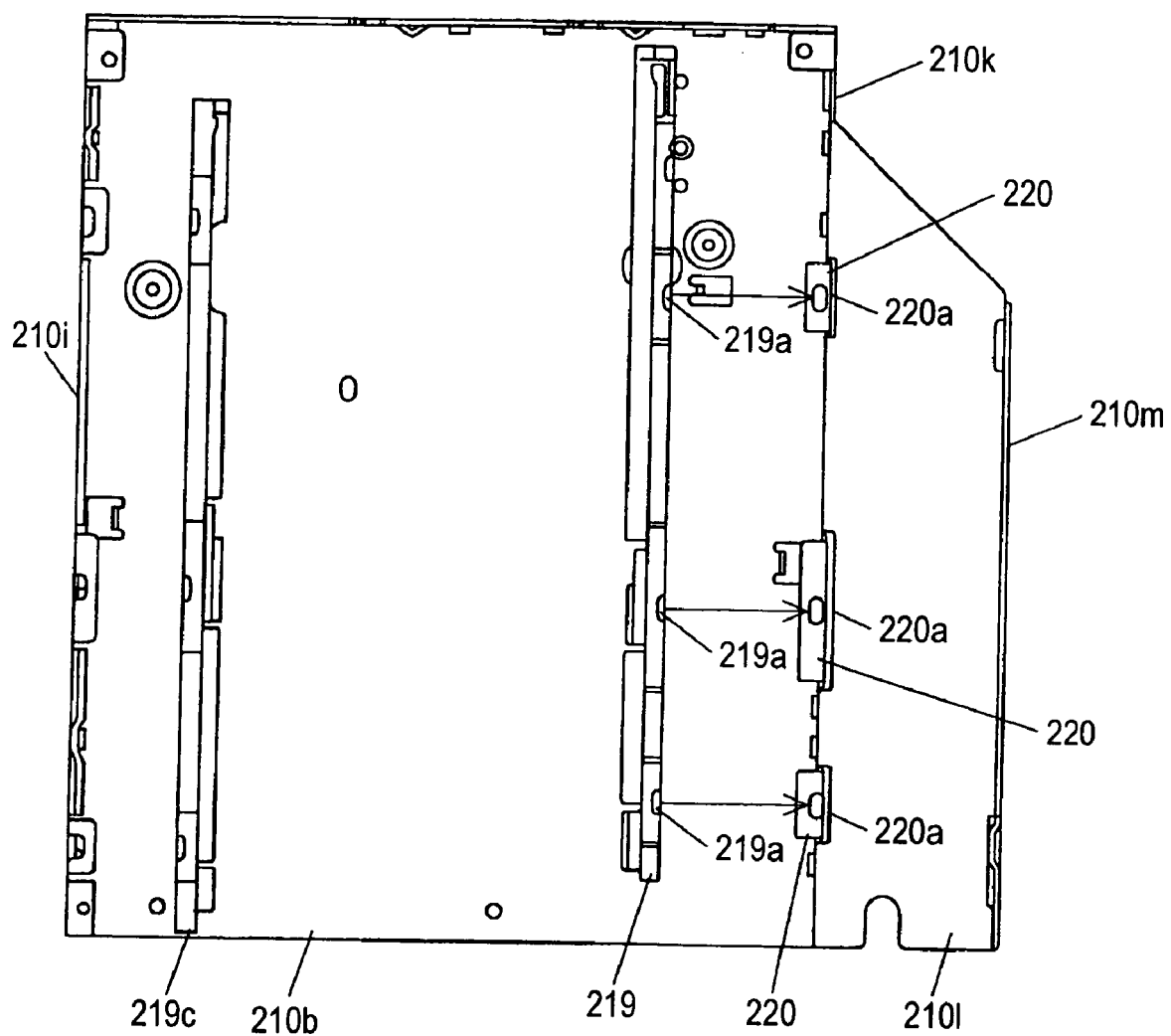
FIG. 21 is a view of a lower cover and a rail guide attached to the lower cover.
Figure 22:
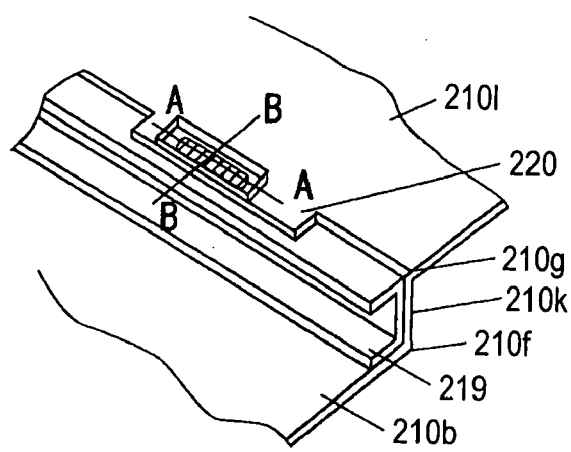
FIGS. 22(a) to 22(d) show protrusions and through holes.
Figure 22:
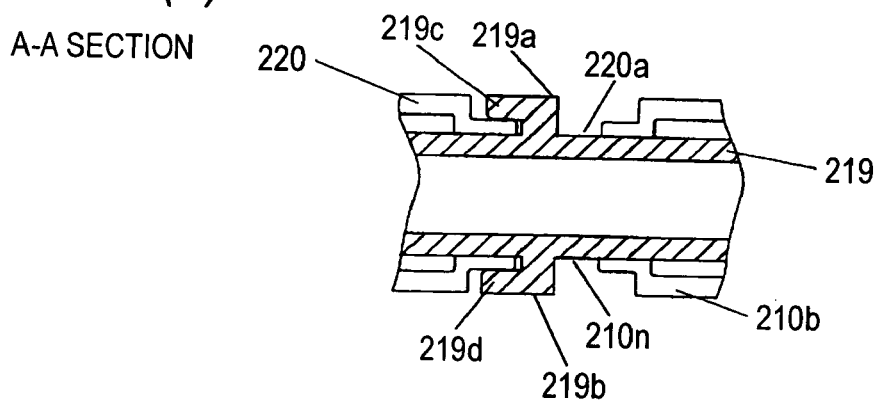
Figure 22:
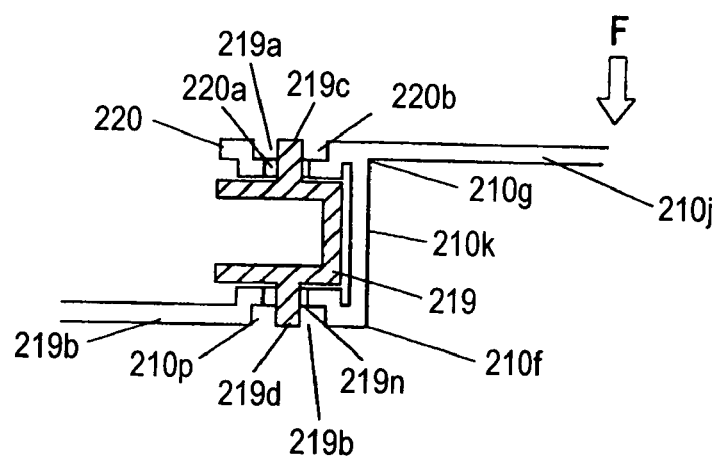
Figure 22:
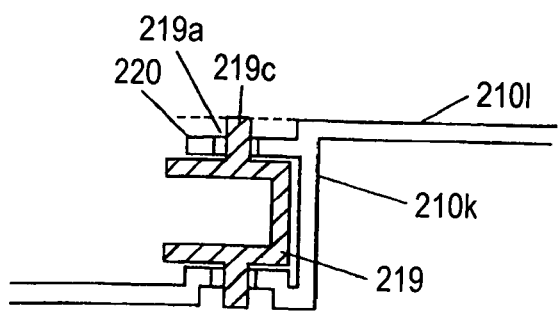

FIG. 21 shows the lower cover 10$b$ and the rail guide attached to the lower cover 10$b$. FIGS. 22($a$) to 22($d$) show the protrusion 219$a$ and a through hole 220$a$. There are the rail guide 219 mounted in contact with the side surface 210$k$ and the rail guide 219$g$ mounted in contact with the side surface 210$i$. How the rail guide 219$g$ is formed and attached may be the same as the conventional rail guide. The rail guide 219 is between the protrusion 220 and the bottom surface 210$h$, and the through hole 220$a$ is provided in an overlapping position between the rail guide 219 and the protrusion 220 on the side of the protrusion 220. A through hole 210$n$ is provided in an overlapping position between the rail guide 219 and the bottom surface 210$h$ on the side of the bottom surface 210$h$. The rail guide 219 is provided with a protrusion 219$a$ inserted into the through hole 220$a$ of the protrusion 220 and a protrusion 219$b$ inserted into the protrusion 210$n$ of the bottom surface 219$h$. As the protrusions 219$a$ and 219$b$ are inserted to the through holes 220$a$ and 210$n$, the rail guide 219 is mounted to the lower cover 210$b$. The protrusions 219$a$ and 219$b$ have engagement parts 219$c$ and 219$d$, respectively. After the protrusions 219$a$ and 219$b$ are inserted to the through holes 220$a$ and 210$n$, the rail guide 219 is allowed to slide and engage with the protrusion 220 and the bottom surface 210$h$. In this way, the rail guide 219 is engaged by the engagement parts 219$c$ and 219$d$ and reinforces the bent parts 210$f$ and 210$g$, so that the deformation of the bent parts 210$f$ and 210$g$ caused for example by load F as shown in FIGS. 22($c$) and 26($b$) imposed on the vicinity of the bent parts 210$f$ and 210$g$ can be reduced.

Note that as shown in FIGS. 22($a$) to 22($d$), in the vicinity of the through hole 220$a$ of the protrusion 220 and the through hole 210$n$ of the bottom surface 210$h$, recesses 220$b$ and 210$p$ can be provided so that the top of the engagement parts 219$c$ and 219$d$ of the rail guide 219 do not protrude from the surface of the protrusion 220 and the bottom surface 210$h$. Alternatively, the protrusion 220 may be provided with a step approximately aligned with the intersecting line between the protrusion 220 and the side surface 210, so that the top of the engagement part 219$c$ does not protrude from the sub surface 210$l$ as shown in the B-B section in FIG. 22($c$).

Figure 23:
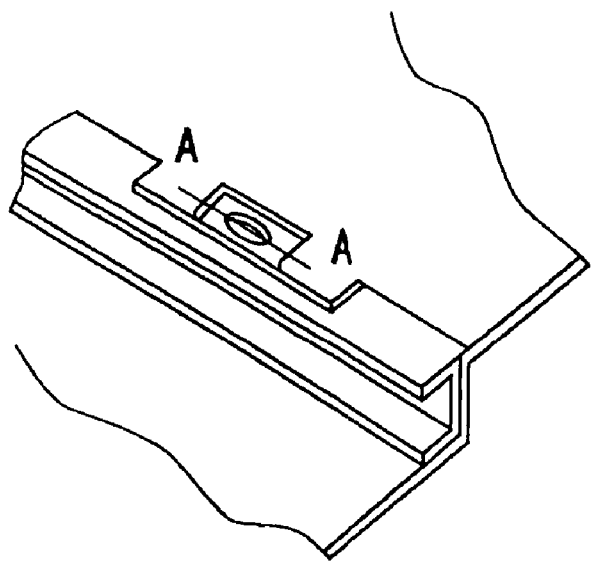
Figure 23:
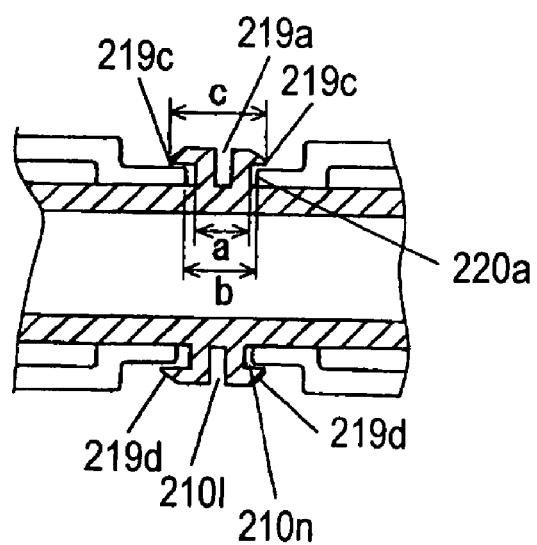

FIGS. 23($a$) to 27($c$) show other examples of the engagement parts provided at the protrusions 219$a$ and 219$b$ of the rail guide 219. The protrusions each include two or more protrusions and have their ends bent in the opposite directions from each other to form the engagement parts 219$c$ and 219$d$. The outer size a of the protrusion is equal to or smaller by allowance for engaging than the size b for which the through holes 220$a$ and 210$n$ oppose. The outer size c of the engagement parts 219$c$ and 219$d$ is larger than the corresponding size b of the through holes 220$a$ and 220$n$ but is set so that the protrusions 219$a$ and 219$b$ and the engagement parts 219$c$ and 219$d$ can be press-fitted into the through holes 220$a$ and 210$n$. The shape of the engagement parts on the side to be engaged with the lower cover 210$b$ is the same as that shown in FIG. 22($a$) to 22($d$). According to the embodiment, the rail guide 219 is engaged by the engagement parts 219$c$ and 219$d$ to reinforce the bent parts 210$f$ and 210$g$.

Note that as shown in FIGS. 24($a$) to 24($c$), the protrusions 219$a$ and 219$b$ may be protruded from the surfaces of the protrusion 220 and the bottom surface 210$h$ rather than providing the engagement parts and the protruded parts may be fused by ultrasonic welding or hot welding to form engagement parts.

Figure 25:
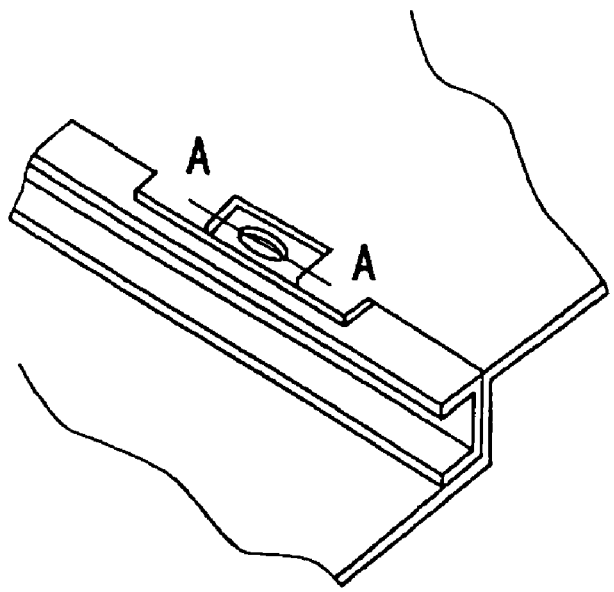
Figure 25:
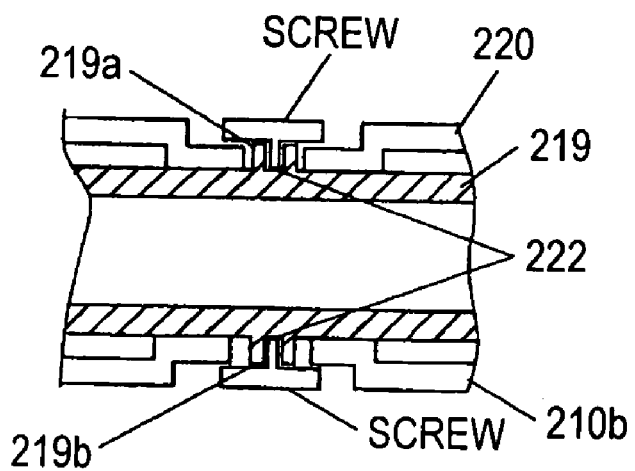
Figure 26:
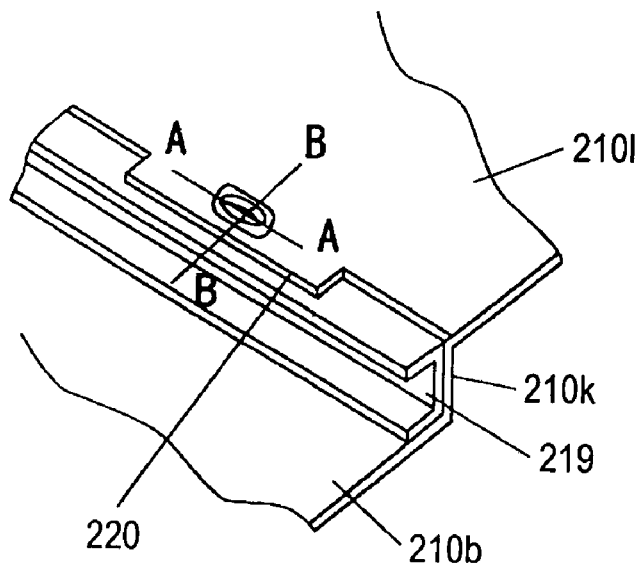
Figure 26:
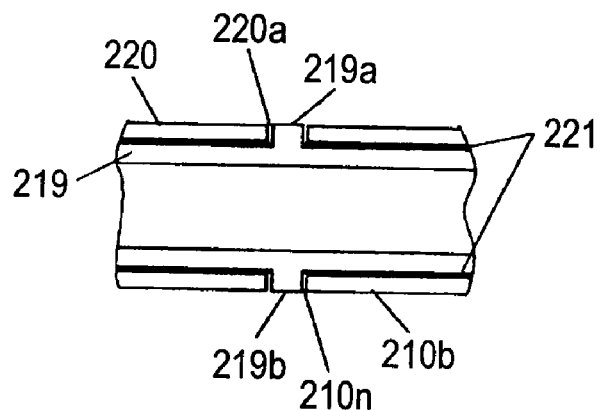
Figure 26:
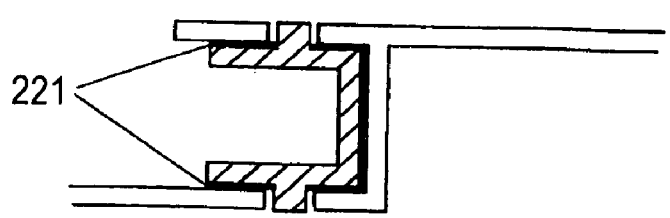

FIGS. 25($a$) and 25($b$) show another example of how the rail guide 219 is fixed to the lower cover 210$b$. The protrusions 219$a$ and 219$b$ of the rail guide 219 are engaged with the through holes 220$a$ and 210$n$, and their tip ends are flat and have screw holes 222. The protrusions 219$a$ and 220, and the protrusions 219$b$ and the bottom surface 210$h$ are fixed by screws. A recess or step may be provided at the protrusion 220 and the bottom surface 210$h$ so that the screw heads do not protrude from the surfaces of the protrusion 220 and the bottom surface 210$h$ similarly to the example shown in FIGS. 22($a$) to 22($d$).

FIGS. 26(a) to 26(c) show another example of how the rail guide 219 is fixed to the lower cover 210b. The protrusions 219a and 219b have no engagement part and engage with the through holes 220a and 220n, respectively in order to position the rail guide 219. At least part of the contact part between the rail guide 219 and the lower cover 210b is provided with an adhesive 221 and thus the rail guide 219 is fixed to the lower cover 210b. In this way, the rail guide 219 can reinforce the lower cover 210b.

FIGS. 27(a) to 27(c) show another example of how the rail guide 219 is fixed to the lower cover 210b. The protrusions 219a and 219b provided at the rail guide 219 have no engagement part and engage with the through holes 220a and 220n, respectively, as a through hole 219e is in close contact with the side surface 210k. Meanwhile, another flat protrusion 223 substantially parallel to the bottom surface 210h is formed from the side surface 210k. The through hole 219e is provided at a part corresponding to the protrusion 223 at the surface of the rail guide 219 in contact with the side surface 210k. The protrusion 223 penetrates the through hole 219e and is in contact with the inner surface 219f of the rail guide 219. More specifically, one side of the rail guide 219 is held between the protrusions 220 and 223 from both sides in the thickness-wise direction. Since the rail 209 slides, the part of the inner surface 219f of the rail guide 219 facing the protrusion 223 is thinned on the inner side than on the side of the rest of the part so that the protrusion 223 does not protrude from the inner surface 219f of the rail guide 219.

A plurality of such arrangements each having the rail guide 219 fixed to the lower cover 210b in the above-described manner are provided. Arrangements having the rail guides 219 fixed to the lower covers 210b in different manners may be provided.

Embodiment 2

Figure 31:
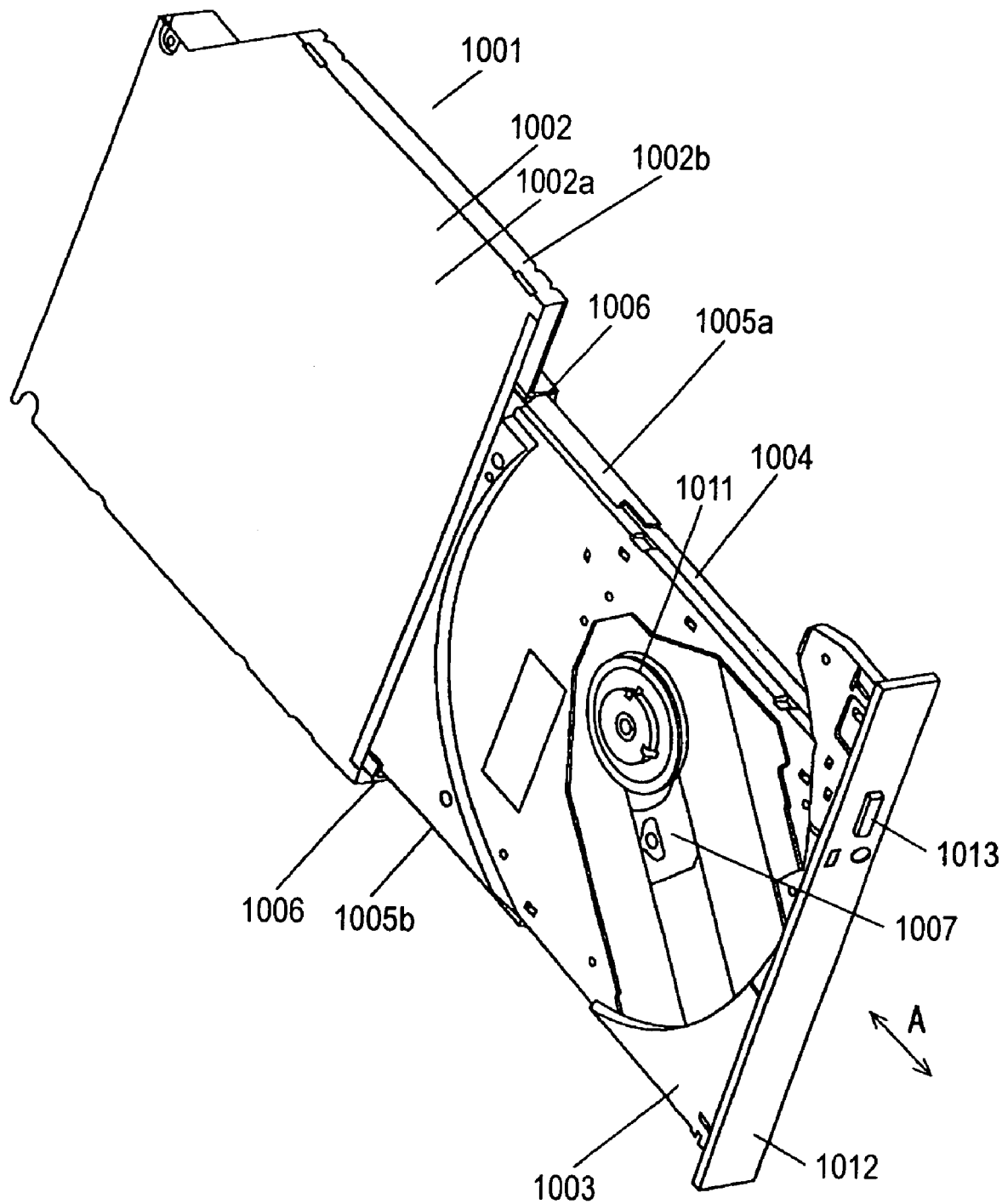
FIG. 31 is an external appearance perspective view of a tray type optical disk device as a reference example.

FIG. 31 is an external appearance perspective view of a tray type optical disk device as a reference example, and shows such a state that a tray 1003 is drawn out from a case 1002. In FIG. 31, 1002 designates a case, and the case 1002 is configured by combining an upper side case portion 1002a and a lower side case portion 1002b. Meanwhile, the upper side case portion 1002a and the lower side case portion 1002b are fixed to each other, by use of a screw etc. 1003 designates a tray which is disposed so as to be capable of protruding/withdrawing from/into the case, and 1011 designates a spindle motor which is disposed on the tray 1003, and 1007 designates an optical pickup, and the optical pickup 1007, on which at least a light source and each optical member, which are not shown in the figure, are mounted, irradiates an optical disk with light, and thereby, carries out at least one of operations for writing information or reading information in or from an optical disk. 1012 designates a bezel which is disposed on a front end surface of the tray 1003, and the bezel 1012 is configured so as to close an incoming and outgoing opening of the tray 1003. 1005a, 1005b designate rails which are attached movably to both of the tray 103 and the case 1002, respectively, and these rails 1005a, 1005b are disposed on both sides of the tray 1003, and by these rails 1005a, 1005b, the tray 1003 is attached so as to be capable of protruding/withdrawing from/into the case 1002, in a direction of an arroishown in FIG. 31. At the innermost portion of the case 1002, there is a circuit board which is disposed fixedly, and on the circuit board, a signal processing series IC and a power supply circuit etc. are mounted. A flexible printed board, which is disposed on the tray 1003 and is not shown in the figure and connects circuit boards electrically, is formed in a nearly U-letter shape, and an external connector is connected to power supply/signal lines which are disposed on an electronic device such as a computer. Then, through this external connector, electric power is supplied to an inside of an optical disk device, or an electric signal from an outside is guided into an optical disk device, or an electric signal, which is generated in an optical disk device, is sent out to an electronic device etc.

On the bezel 1012 which is disposed on a front end surface of the tray 1003, an eject button 1013 is disposed, and by depressing this eject button 1013, engagement of an engagement portion (not shown in the figure) which is disposed on the case 1002 and an engagement portion (not shown in the figure) which is disposed on the tray 1003 is released, and it is possible to pull out the tray so as put on and take off an optical disk from the case.

Figure 32:
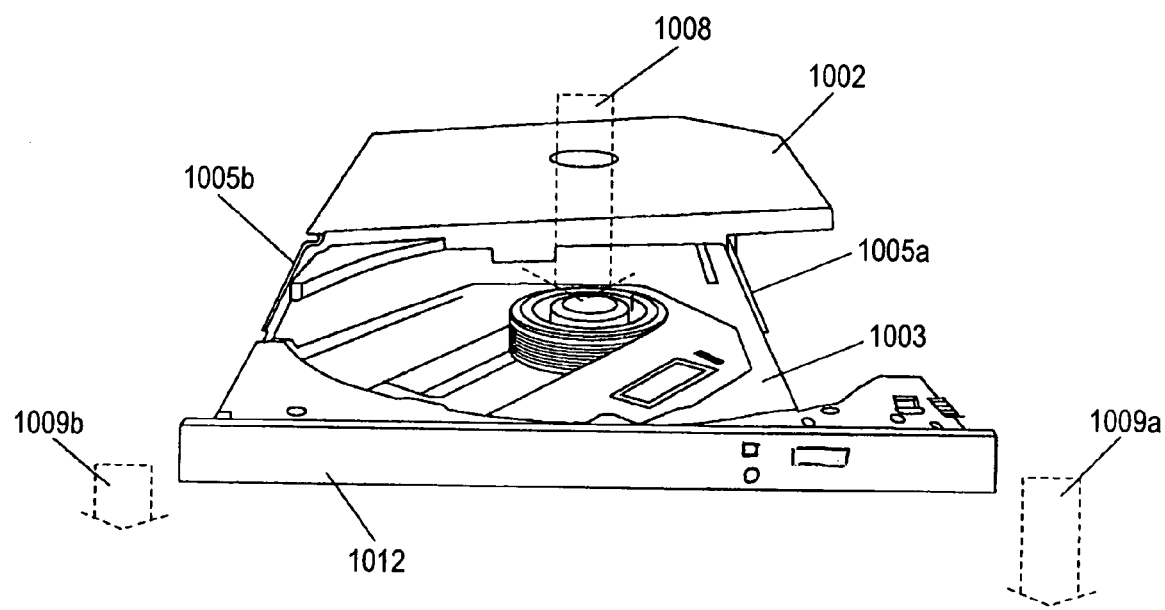
FIG. 32 is an image view of a load which is applied to the optical disk device at the time of inserting an optical disk in the tray type as the reference example.

FIG. 32 is an image view of a load which is applied to the optical disk device at the time of inserting an optical disk in the tray type as the reference example.

There is such a necessity that the rails 1005a, 1005b shown in FIG. 32, which support the tray 103, bear with a load 1008 from above on the occasion that a user loads an optical disk, in such a state that the tray 1003 is drawn out, and therefore, all rails are generally formed by a metal material, and a stainless material is mostly used.

In addition, in some cases, as a material of these rails 1005a, 1005b, there are such a case that a resin material is used for all rails, and such a case that a combination of a resin material for the rail 1005b and a metal material for the rail 1005a is used, but in each case, it is difficult to say that there is sufficient strength regarding torsion of the tray at the time of loading an optical disk, against the load 1008 from above on the occasion that a user loads an optical disk.

Figure 33:
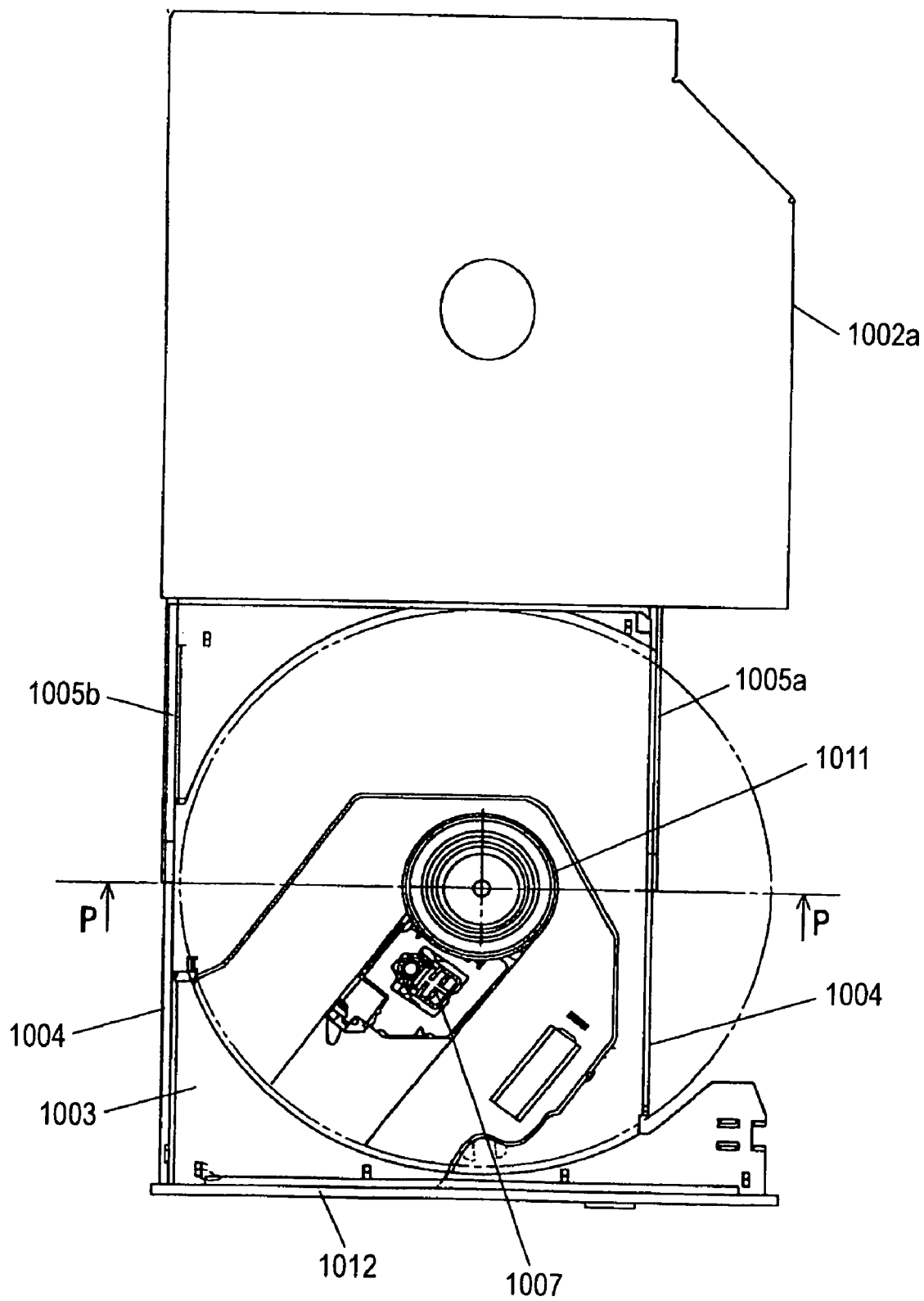
FIG. 33 is an upside plan view of the tray type optical disk device as the reference example.
Figure 34:
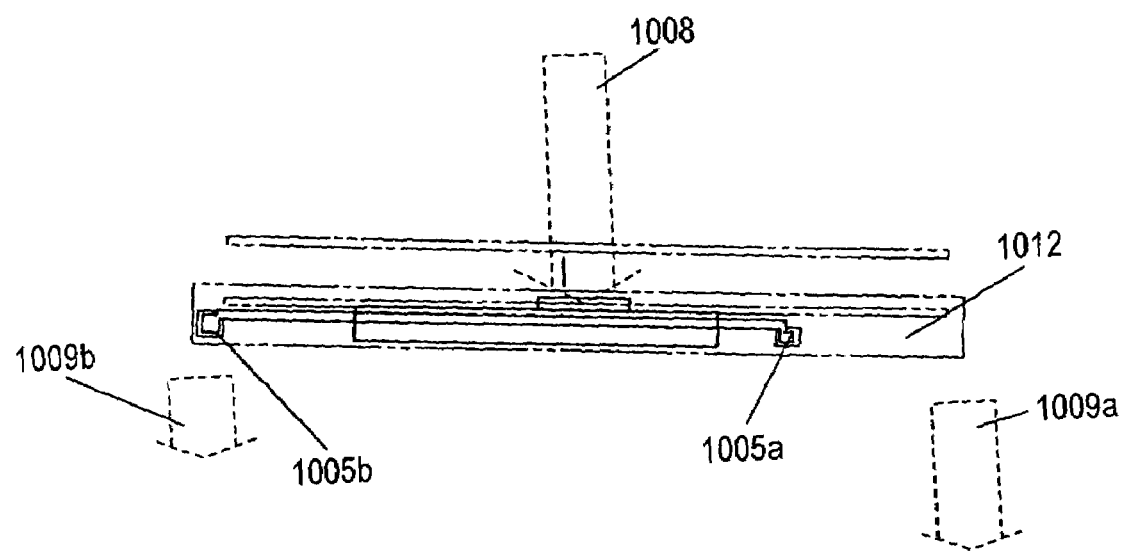
FIG. 34 is a cross-sectional view of the tray type optical disk device as the reference example.

FIG. 33 is an upside plan view of the tray type optical disk device as the reference example, and FIG. 34 is a P-P cross-sectional view of the upside plan view of the tray type optical disk device as the reference example shown in FIG. 33, and is a view which showed a state of the rails 1005a, 1005b and the tray 1003 etc. in such a state that the load 1008 shown in FIG. 32 at the time of loading an optical disk is applied to the tray type optical disk device of the reference example. Here, the rail 1005a is to be called as a right side rail since it is located on the right side when it is viewed from the bezel 1012 side, and the rail 1005b is to be called as a left side rail since it is located on the left side when it is viewed from the bezel 1012 side.

As to a shape of an optical disk device as represented by one which is built in a current notebook type personal computer, as evidenced from FIG. 31, such a shape that a right side is cut out when it is viewed from the bezel 1012 side becomes an industry standard shape, and in order to enlarge strength of the rails 1005a, 1005b against the load 1008 shown in FIG. 32 at the time of loading an optical disk, it is configured in such a manner that an overall height of the rails 1005a, 1005b, i.e., a height in a direction which is identical to an optical disk loading direction is maximized in a limited space.

On that account, as to the shapes of the right and left rails 1005a, 1005b, an overall height of the left side rail 1005b is necessarily set up to be larger than that of the right side rail 1005a, and entire strength can be enlarged but at the same time, there occurred asymmetric diversity in strength of the right and left rails 1005a, 1005b.

That is, as shown in FIG. 32, a bending amount 1009a of the rail 1005a against the load 1008 at the time of loading an optical disk becomes large, and a bending amount 1009b of the rail 1005b against the load 1008 at the time of loading an optical disk becomes small.

By this means, on the occasion of loading an optical disk as shown in FIG. 34, the right side rail 1005a of the tray 1003 tilts toward the lower side than the left side rail 1005b, and there occurred torsion of the tray 1003 at the time of loading an optical disk.

In addition, in some cases, as a material of these rails 1005a, 1005b, there are such a case that a resin material is used for all rails, and such a case that a combination of a resin material for the rail 1005b and a metal material for the rail 1005a is used.

In case of using a resin material all as materials of the rails 1005a, 1005b, there is such an advantage that a main body weight of an optical disk device becomes lightweight, but from the viewpoint of composite strength of the rail 1005a and the rail 1005b, there occurs significant strength deterioration as compared to one which uses a metal material.

In addition, in case of using a combination of a resin material for the rail 1005b and a metal material for the rail 1005a, there is also such an advantage that a main body weight of an optical disk device becomes lightweight, but there occurs a phenomenon which is opposite to that in the above-described case of using an identical metal material. That is, the bending amount 1009a of the rail 1005a against the load 1008 at the time of loading an optical disk becomes small, and the bending amount 9b of the rail 1005b against the load 1008 at the time of loading an optical disk becomes large. On this account, inversely to one shown in FIGS. 32 and 34, the left side rail 1005b of the tray 1003 tilts toward the lower side than the right side rail 1005a, and there occurred torsion of the tray 1003 at the time of loading an optical disk, in a direction which is opposite to that in case of using identical metal.

As to these torsion which occur in the tray 103, a user feels them uncomfortable at the time of loading an optical disk, and in addition, stress, which corresponds to the number of times for optical disk loading, is applied to the tray 1003 shown in FIG. 31 and components which are adjacent to the tray 1003, i.e., the rail 1005a, the rail 1005b, the rail attachment portion 1004, the rail attachment portion 1006, the optical pickup 1007 and so on, and accumulated. Influence of these grows larger in accordance with the number of loading of an optical disk, and, in the worst case, it evolves to a trouble of an opening and closing mechanism of the tray 1003 which arises from such a fact that the rails 1005a, 1005b are transformed, and a trouble of an information writing or information reading operation onto an optical disk, which arises from displacement of the optical pickup 1007. In addition, in these years, along with weight saving of a notebook type personal computer, weight saving of an optical disk device has been desired, but additional weight saving has become difficult in case that a stainless material, which is a normal rail material, is simply used in the method of the reference example.

As a matter of convenience of explanation of the embodiment 2 of the invention, the reference example is described above. Meanwhile, there is such a case that these reference examples are also used in the following embodiment of the invention, in contrast with it.

Hereinafter, the embodiment 2 of the invention will be described with reference to the drawings.

Figure 28:
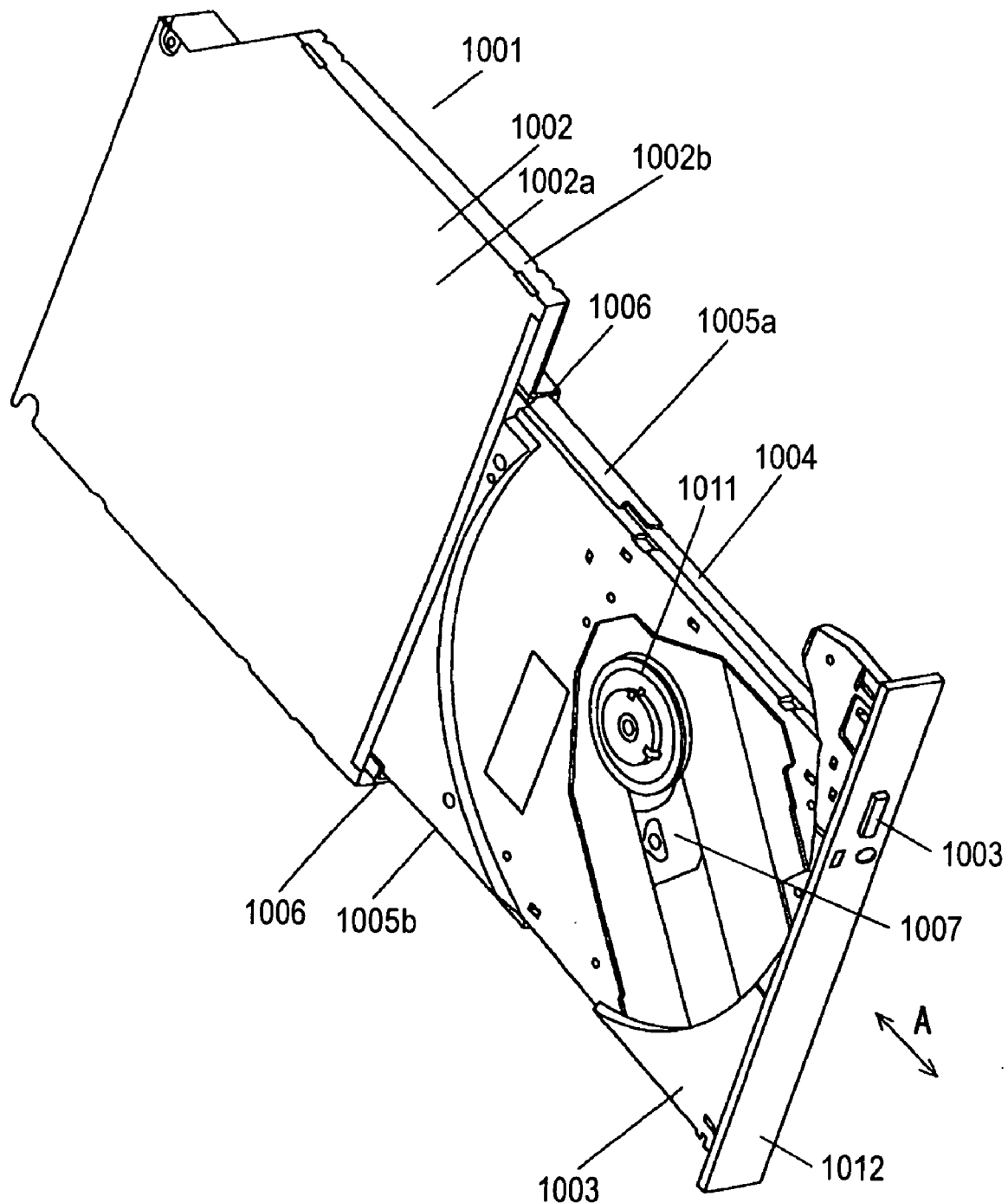
FIG. 28 is an external appearance view of an optical disk device in one embodiment of the invention.
Figure 29:
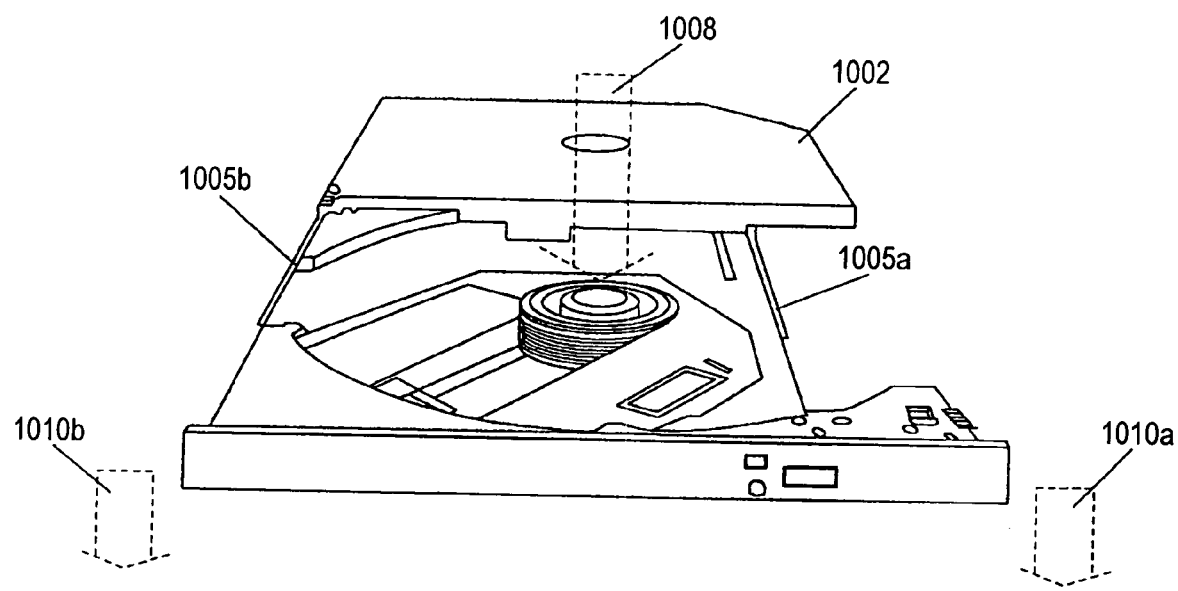
FIG. 29 is an image view of a load which is applied to the optical disk device at the time of inserting an optical disk in the embodiment of the invention.
Figure 30:
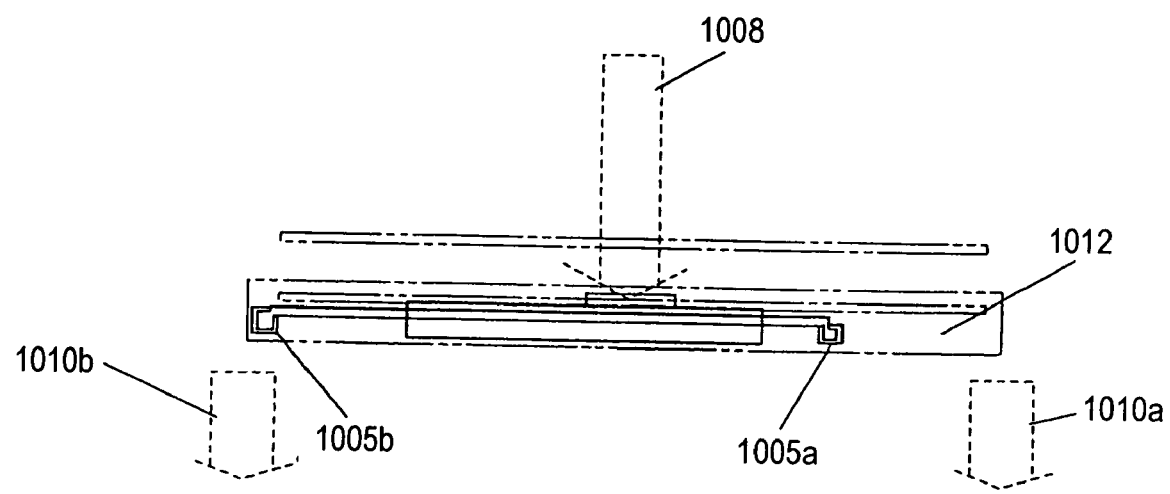
FIG. 30 is a cross-sectional view of the optical disk device in the embodiment of the invention.

FIG. 28 is an external appearance view of an optical disk device in one embodiment of the invention, and FIG. 29 is an image view of a load which is applied to the optical disk device at the time of inserting an optical disk in the embodiment of the invention. In addition, FIG. 30 is a P-P cross-sectional view of the upper side plan view of the tray type optical disk device shown in FIG. 33 and is a view which showed a state of the rails 1005a, 1005b and the tray 1003 etc. in such a state that the load 1008 shown in FIG. 29 at the time of loading an optical disk is applied to the tray type optical disk device of the invention. Hereinafter, the rail 1005a is to be called as a right side rail since it is located on the right side when it is viewed from the bezel 1012 side, and the rail 1005b is to be called as a left side rail since it is located on the left side when it is viewed from the bezel 1012 side.

FIG. 28 is a view which showed such a state that the tray 1003 is drawn out from the case 1002, and 1002 designates a pouch shaped case one end portion of which is opened, and the case 1002 is configured by combining an upper side case portion 1002a and a lower side case portion 1002b. The upper side case portion 1002a and the lower side case portion 1002b are strongly fixed to each other, optimally by use of a screw etc. As a constituent material of the case 1002, it is configured by a metal material such as iron, iron alloy, aluminum, aluminum alloy, and magnesium alloy and a resin material etc. In addition, the upper side case portion 1002a and the lower side case portion 1002b may be configured by materials of the same kind, respectively, and may be configured by different materials. In addition, an average radial thickness of a principal plane of each of the upper side case portion 1002a and the lower side case portion 1002b is 0.3 mm~1.6 mm, and in case that this average radial thickness is relatively thin, the upper side case portion 1002a and the lower side case portion 1002b are configured by a metal material, and for example, formed by applying a press work etc. to a metal plate, In addition, in case that the average radial thickness is relatively thick, the upper side case portion 1002a and the lower side case portion 1002b are configured by a resin material and die-casting (aluminum, magnesium alloy etc.). In case that the case 1002 is configured by a resin material, weight saving of an optical disk device can be realized. 1003 designates a tray which is disposed so as to be capable of protruding/withdrawing from/into the case 1002, and the tray 1003 is configured by a resin frame, and each portion, which will be described later, is attached thereto. 1011 designates a spindle motor which is disposed on the tray 1003, and 1007 designates an optical pickup, and the optical pickup 1007, on which at least a light source and each optical member, which are not shown in the figure, are mounted, irradiates an optical disk with light, and thereby, carries out at least one of operations for writing information or reading information in or from an optical disk. 1012 designates a bezel which is disposed on a front end surface of the tray 103, and the bezel 1012 is configured so as to close an incoming and outgoing opening of the tray 1003, when the tray 1003 is put in the case 1002, and configured by a resin material and a metal material. 1005a, 1005b designate rails which are attached movably to both of the tray 1003 and the case 1002, respectively, and these rails 1005a, 1005b are disposed on both sides of the tray 1003, and by these rails 1005a, 1005b, the tray 1003 is attached so as to be capable of protruding/withdrawing from/into the case 1002, in a direction of an arroishown in FIG. 28.

At the innermost portion of the case 1002, there is a circuit board which is disposed fixedly, and on the circuit board, a signal processing series IC and a power supply circuit etc. are mounted. A flexible printed board, which is disposed on the tray 1003 and is not shown in the figure and connects circuit boards electrically, is formed in a nearly U-letter shape, and an external connector is connected to power supply/signal lines which are disposed on an electronic device such as a computer. Then, through this external connector, electric power is supplied to an inside of an optical disk device, or an electric signal from an outside is guided into an optical disk device, or an electric signal, which is generated in an optical disk device, is sent out to an electronic device etc.

On the bezel 1012 which is disposed on a front end surface of the tray 1003, an eject button 1013 is disposed, and by depressing this eject button 1013, engagement of an engagement portion (not shown in the figure) which is disposed on the case 1002 and an engagement portion (not shown in the figure) which is disposed on the tray 1003 is released.

Hereinafter, a characterizing portion of the embodiment 1002 of the invention will be described.

As shown in FIG. 28, there are rail attachment portions 1004 on both side portions of the tray 1003, and the both side portions are fit with the rails 1005a, 1005b so as to be movable in an optical disk pull-out direction. In addition, the rails 1005a, 1005b are also fit with rail attachment portions 1006 which are disposed on inner surfaces of the both side portions of the case 1002 movably in an optical disk pull-out direction, and it is possible to pull out the tray 1003 so as put on and take off an optical disk from the case 1002.

As shown in FIG. 28, in an optical disk device 1001 which has the case 1002, the tray 103 which is attached so as to be capable of protruding/withdrawing from/into the case, and a holding portion which holds the case 1002 and the tray 1003 movably, and in which the holding portion is configured by the rail attachment portions 1006 which are disposed on the case 1002, the rail attachment portions 1004 which are disposed on the tray 1003, and the rails 1005a, 1005b which are disposed movably on the rail attachment portions 1004, 1006, it is configured in such a manner that a metal series material, which is different from a metal series material used for the other rail, is used as a material forming the rail 1005a or 1005b at right and left two locations which is disposed movably on the rail attachment portion 1004, 1006. The holding portion, which holds the case 102 and the tray 103 movably, is disposed at one location for each of both left and right end portions to a movable direction of the tray 103, and a longitudinal direction of the holding portion is set to be identical to a movable direction of the tray 1003, and thereby, it becomes possible to maintain the tray 1003 in a balanced manner, against the load 1008 which is applied to the tray 1003 which is pulled out from the case.

In case that, as a different material which forms the rail, a metal series material with stronger strength than that of a metal series material which is used in the other is used for one location of the rails 1005a, 1005b, it becomes possible to redress the balance of bending amounts 1010a, 1010b of the both rails 1005a, 1005b. By using a rail which is formed by a metal series material with stronger strength as the rail 1005a which has a lower height in a direction which is identical to an optical disk loading direction, it is possible to realize improvement of an optical disk loading property and reduction of torsion stress which is applied at the time of loading an optical disk, over maintaining a conventional shape of a rail, and therefore, a sharing property of an equipment of a press work etc for forming the rail 1005a is heightened, and it is possible to suppress a new expense.

In addition, in case that, as a different material which forms the rail, a metal series material with smaller relative density than that of a metal series material which is used in the other is used for one location of the rails 1005a, 105b, it becomes possible to redress the balance of the bending amounts 1010a, 1010b of the both rails 1005a, 1005b, and at the same time, to carry out reduction of such a weight that both of the rails 1005a, 1005b are summated. By using a rail which is formed by a metal series material with smaller relative density as the rail 1005a which has a higher height in a direction which is identical to an optical disk loading direction, it is possible to realize improvement of an optical disk loading property and reduction of torsion stress which is applied at the time of loading an optical disk, over maintaining a conventional shape of a rail, and therefore, a sharing property of an equipment of a press work etc. for forming the rail 105b is heightened, and it is possible to suppress a new expense, and in addition, it is possible to carry out reduction of such a weight that both of the rails 1005a, 1005b are summated, and therefore, it is also possible to realize weight saving of an optical disk device main body weight.

Further, by such a fact that a major component, which configures a metal series material, is different, it becomes possible to apply a substantial change to bending amounts of the rails 1005a, 1005b, and it is possible to realize improvement of a loading property of an optical disk and weight saving of torsion stress which is applied at the time of loading an optical disk, drastically.

In consideration of the above-described content, it is desired to use at least one combination out of for example a combination of a stainless material for the rail 105a and aluminum alloy or aluminum for the rail 1005b, a combination of titanium alloy for the rail 1005a and aluminum alloy or aluminum for the rail 105b, a combination of a stainless material for the rail 105a and titanium alloy for the rail 1005b, a combination of aluminum alloy or aluminum for the rail 1005a and magnesium alloy or magnesium for the rail 1005b, and a combination of titanium alloy for the rail 1005a and magnesium alloy or magnesium for the rail 1005b, as a metal series material to be used. By doing this thing, it is possible to nearly uniform the bending amounts 1010a, 1010b of the both rails 1005a, 1005b against a load, and in addition, it is possible to realize weight saving of a rail weight.

If material selection is carried out from the viewpoint of strength of a material, a stainless material, strength of which is stronger than that of the rail 1005b, is used as a material of the rail 1005a, and aluminum alloy or aluminum is used as a material of the rail 1005b.

In addition, if material selection is carried out from the viewpoint of relative density of a material, a stainless material is used as a material of the rail 1005a, and aluminum, aluminum alloy or magnesium, magnesium alloy etc., relative density of which is smaller than that of the rail 1005a, is used as a material of the rail 1005b.

In this embodiment, in consideration of both of balance of rail strength of the right and left rails 105a, 1005b and reduction of a rail weight, a combination of a stainless material and aluminum alloy is used. By doing this thing, it is possible to nearly uniform the bending amounts 1010a, 1010b of the both rails 1005a, 1005b against the load 1008, and in addition, at the same time, it is possible to realize weight saving of a rail weight. The stainless material, which is used here, is SUS304 or SUS430 in JIS (Japanese Industrial Standard, hereinafter referred to as JIS) part number, and aluminum alloy is A5182 or A5052 in JIS part number.

Meanwhile, in this embodiment, a stainless material is used for the rail 1005a and aluminum alloy is used for the rail 1005b, and a stainless material to be used is SUS304 or SUS430 in JIS part number and aluminum alloy is A5182 or A5052 in JIS part number, but a material of the rail 1005b is not determined in an unambiguous manner by a shape of a rail to be applied and a material which is used for the rail 1005a, and therefore, the above-described materials are not intended as a definition of the limits of the invention.

Hereinafter, its operation will be described.

In this embodiment shown in FIGS. 28-30, a stainless material, which has been generally used in the past, is used as a material of the rail 1005a, and aluminum alloy, which is a material relating to the invention, is used for the rail 1005b. Here, by using a stainless material for the right side rail 1005a, it is possible to maintain strength as usual, as to strength of a rail single body of the right side rail 1005a of FIG. 30.

Then, as to the left side rail 1005b, a stainless material, which is of an identical metal material, is used under ordinary circumstances, but in the invention, in case of focusing attention on strength of a material, aluminum, aluminum alloy etc. are used as a material of the rail 1005b, and in case of focusing attention on relative density, aluminum, aluminum alloy or magnesium, magnesium alloy or titanium alloy etc. are used.

By this means, strength of a single body of the rail 1005b weakens relatively, as compared with such a case that a material, which is identical to that of the rail 1005a, is used in the same manner as in the past, as a material of the rail 1005b.

In the meantime, as to a rail which is widely used in the case 1002 of an industry standard shape shown in FIG. 28, an overall height of the rail 1005b, i.e., a height in a direction which is identical to an optical disk loading direction is larger against the rail 1005a, and therefore, the rail 1005b has stronger strength than that of the rail 1005a.

On that account, the rail 1005b has stronger strength than that of the rail 1005a from the viewpoint of a shape, and has weaker strength than that of the rail 1005a from the viewpoint of a material.

By this means, in case that an identical material is used for conventional rails 1005a, 1005b as shown in FIG. 29, a difference of the bending amount 1010a which occurred due to the load 1008 at the time of loading an optical disk and arises from the rail 1005a and the bending amount 1010b which arises from the rail 1005b is reduced, and on the occasion of loading an optical disk as shown in FIGS. 29 and 30, such a matter that the right side rail 1005a of the tray 1003 tilts toward the lower side than the left side rail 1005b by the suchlike load 1008 is reduced or prevented and thereby, it is possible to realize improvement of a loading property at the time of loading an optical disk and reduction of torsion stress which is applied to the tray 1003 shown in FIG. 28 and components which are adjacent to the tray, i.e., the rail 1005a, the rail 1005b, the rail attachment portion 1004, the rail attachment portion 1006, the optical pickup 1007 etc. at the time of loading an optical disk. On that account, it becomes possible to prevent a trouble of an opening and closing mechanism of the tray 1003 which arises from such a fact that the rails 1005a, 1005b are transformed due to long term repeating use, and a trouble of an information writing or information reading operation onto an optical disk, which arises from displacement of the optical pickup 1007.

In addition, in comparison with such a case that a resin material is used for both or one of conventional rails 1005a, 1005b (in this case, a state of bending amounts 1009b>1009a in FIGS. 32 and 34), composite strength of the rail 1005a and the rail 1005b is strengthened, and a difference of the bending amount 1010a which occurred due to the load 1008 at the time of loading an optical disk and arises from the rail 1005a and the bending amount 1010b which arises from the rail 1005b is reduced, and on the occasion of loading an optical disk as shown in FIG. 30, such a matter that the left side rail 1005b of the tray 1003 shown in FIG. 29 tilts toward the lower side than the left side rail 1005b by the suchlike load 1008 is reduced or prevented and thereby, it is possible to realize improvement of a loading property at the time of loading an optical disk and reduction of torsion stress which is applied to the tray 1003 shown in FIG. 28 and components which are adjacent to the tray, i.e., the rail 1005a, the rail 1005b, the rail attachment portion 1004, the rail attachment portion 1006, the optical pickup 1007 etc. at the time of loading an optical disk. On that account, it becomes possible to prevent a trouble of an opening and closing mechanism of the tray 1003 which arises from such a fact that the rails 1005a, 1005b are transformed due to long term repeating use, and a trouble of an information writing or information reading operation onto an optical disk, which arises from displacement of the optical pickup 1007.

Furthermore, in the rail 1005b, in case of a shape which is, identical to conventional one, a weight also becomes small by its relative density effect. On that account, it becomes possible to carry out weight saving of an optical disk device main body weight at the same time.

By these things, it is possible to control the bending amounts 101a, 1010b of the rails 1005a, 1005b against the external load 1008 with respect to each rail, and therefore, it becomes possible to redress the balance of the bending amounts 1010a, 1010b of the both rails 1005a, 1005b, and it is possible to realize an optical disk device which can realize improvement of an loading property of an optical disk and reduction of torsion stress which is applied at the time of loading an optical disk, weight saving of an optical disk device main body weight.

Meanwhile, in this embodiment, a stainless material is used as a material of the rail 1005a and aluminum alloy is used as a material of the rail 1005b, but by using titanium alloy for the rail 1005a and aluminum alloy for the rail 1005b, it can be expected that much further weight saving of an optical disk device main body weight can be realized.

In this embodiment, a rail which is disposed on one holding portion is formed by a metal series material which is different from that of a rail which is disposed on the other holding portion, and thereby, it is possible to control bending amounts of the rails, which occur on the occasion of loading an optical disk etc., against an external load with respect to each rail, and therefore, it becomes possible to redress the balance of the bending amounts of the both rails.

In addition, as to a rail which is disposed on one holding portion, a thickness of a material which forms the rail is thinner than that of a rail which is disposed on the other holding portion, or a cutout, a hole is disposed in at least one of the rails, and thereby, it is possible to control bending amounts, which occur on the occasion of loading an optical disk, against an external load of rails with respect to each rail, and therefore, it becomes possible to redress the balance of the bending amounts of the both rails.

Further, as a material which forms a rail, a material, which has smaller relative density than that of a metal series material which has been used in the past and a cutout, a hole is disposed in a rail, and thereby, weight saving of a rail becomes possible.

By these things, it is possible to reduce unbalance, which occurs on the occasion of loading an optical disk etc., of bending amounts of both rails and to carry out weight saving of rails, and therefore, it is possible to realize an optical disk device which can realize improvement of a loading property of an optical disk and reduction of torsion stress which is applied at the time of loading an optical disk, and weight saving of an optical disk device main body weight.

Embodiment 3

Figure 35:
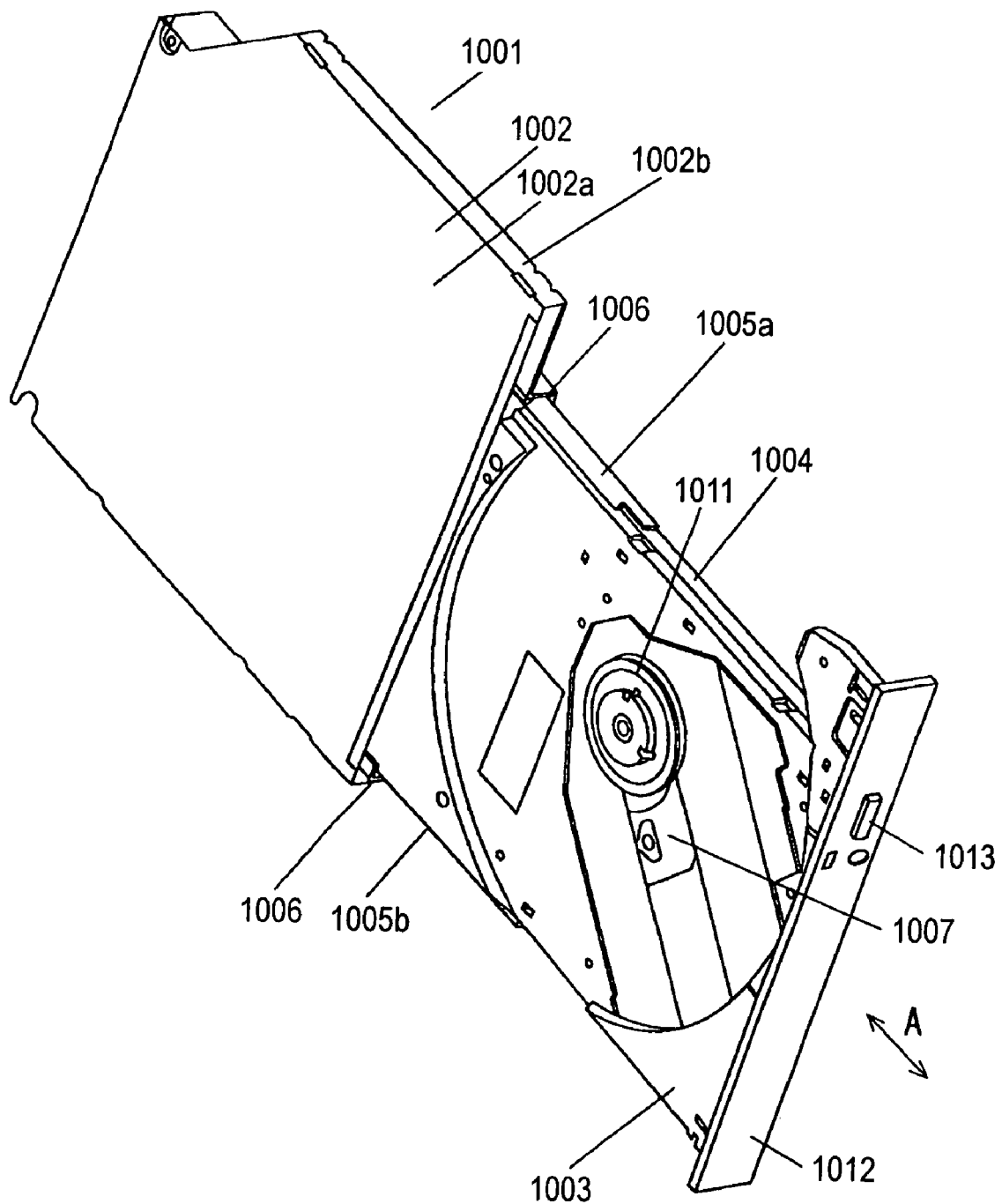
FIG. 35 is an external appearance view of an optical disk device in one embodiment of the invention.
Figure 36:
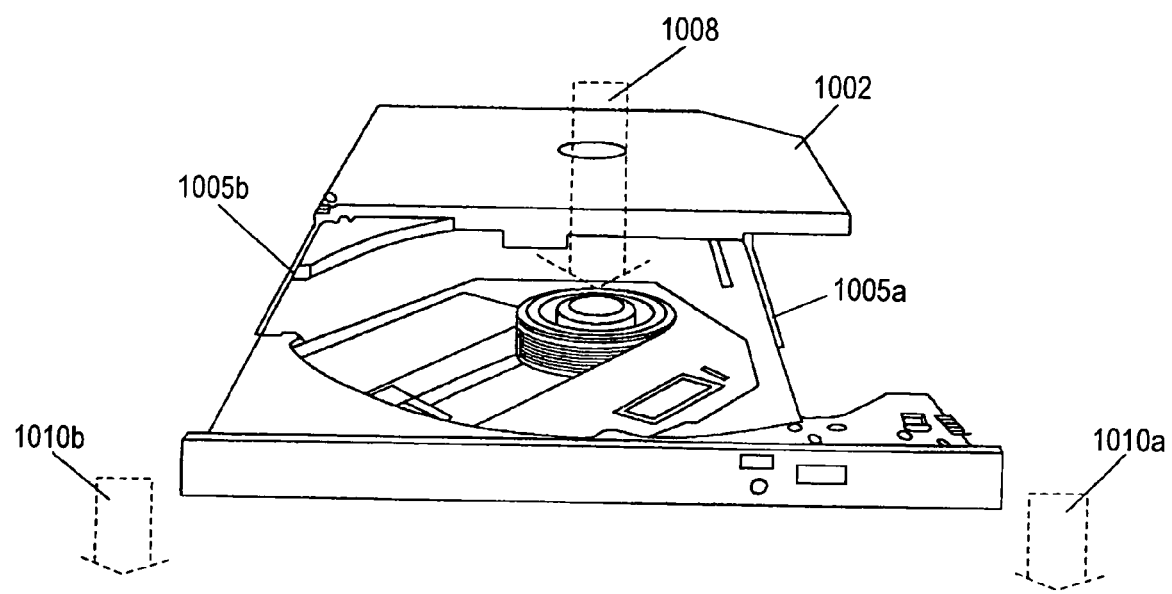
FIG. 36 is an image view of a load which is applied to the optical disk device at the time of inserting an optical disk in one embodiment of the invention.
Figure 37:
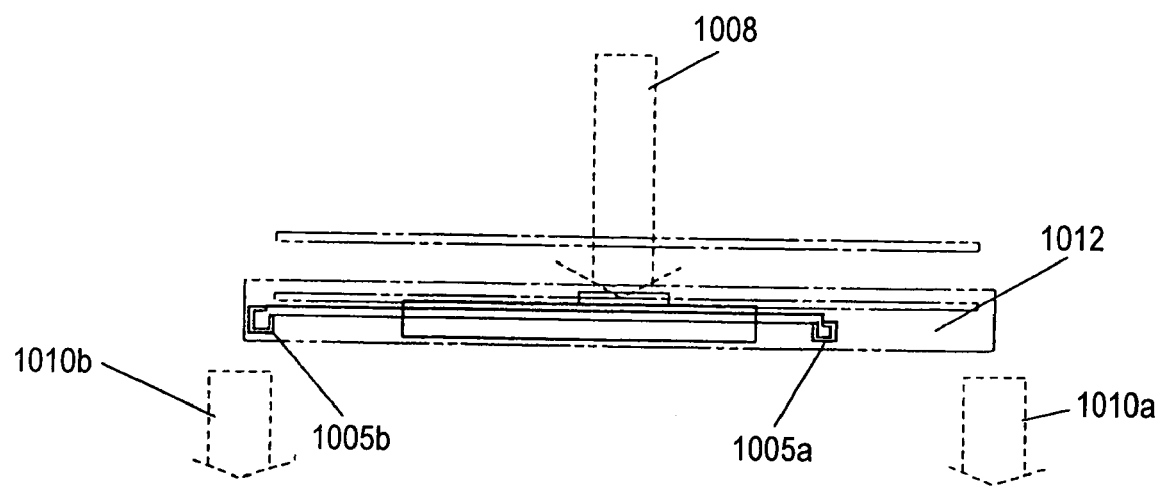
FIG. 37 is a cross sectional view of the optical disk device in the embodiment of the invention.

FIG. 35 is an external appearance view of an optical disk device in one embodiment of the invention, and FIG. 36 is an image view of a load which is applied to the optical disk device at the time of inserting an optical disk into the optical disk device in one embodiment of the invention. FIG. 37 is a P-P cross sectional view of the upper side plan view of the tray type optical disk device shown in FIG. 33, and is a view which showed a state of rails 1005a, 1005b and a tray 1003 etc. in such a state that a load 1008 shown in FIG. 32 at the time of loading an optical disk is applied to the tray type optical disk device of the invention. Hereinafter, the rail 1005a is to be called as a right side rail since it is located on the right side when it is viewed from a bezel 112 side, and the rail 1005b is to be called as a left side rail since it is located on the left side when it is viewed from the bezel 1012 side.

FIG. 35 is a view which showed such a state that the tray 1003 is drawn out from the case 1002 in the same manner as in FIG. 28, and a configuration of an entire optical disk device is the same as that of the embodiment 1.

Hereinafter, a characterizing portion of the embodiment 1003 of the invention will be described.

As shown in FIG. 35, there are rail attachment portions 1004 on both side portions of the tray 1003, and the both side portions are fit with the rails 1005a, 1005b so as to be movable in an optical disk pull-out direction. In addition, the rails 1005a, 1005b are also fit with rail attachment portions 1006 which are disposed on inner surfaces of the both side portions of the case 1002 movably in an optical disk pull-out direction, and it is possible to pull out the tray 1003 so as put on and take off an optical disk from the case 1002.

As shown in FIG. 35, in an optical disk device 1001 which has the case 1002, the tray 1003 which is attached so as to be capable of protruding/withdrawing from/into the case, and a holding portion which holds the case 1002 and the tray 1003 movably, and in which the holding portion is configured by the rail attachment portions 106 which are disposed on the case 1002, the rail attachment portions 1004 which are disposed on the tray 1003, and the rails 1005a, 1005b which are disposed movably on the rail attachment portions 1004, 1006, it is configured in such a manner that an identical material is used for the rail 1005a or 1005b at right and left two locations which is disposed movably on the rail attachment portion 1004, 1006, and one rail has a thinner thickness than that of the other tail. Here, any material can be used as a material which is used for forming rails, but by using any one material of aluminum alloy or aluminum, magnesium alloy or magnesium, and titanium alloy, it is possible to realize weight saving of an optical disk device main body weight, over maintaining strength of a rail main body as much as possible.

By doing this thing, it is possible to control balance of bending amounts 1010a, 1010b of the both rails 1005a, 1005b against the load 1008 with respect to each rail, and therefore, it is possible to realize an optical disk device which is capable of realizing improvement of a loading property of an optical disk and reduction of torsion stress which is applied at the time of loading an optical disk. A rail in which a thickness of a material forming the rail is thin is used for the rail 1005b which has a higher height in a direction which is identical to an optical disk loading direction, and thereby, it is possible to realize improvement of an optical disk loading property and reduction of torsion stress which is applied at the time of loading an optical disk, over maintaining a shape of a conventional rail, and therefore, a sharing property of an equipment of a press work etc. for forming the rail 1005a is heightened, and it is possible to suppress a new expense, and in addition, it is possible to reduce such a weight that the both rails 1005a, 1005b are summated, and therefore, it is also possible to realize weight saving of an optical disk device main body weight.

Figure 38:
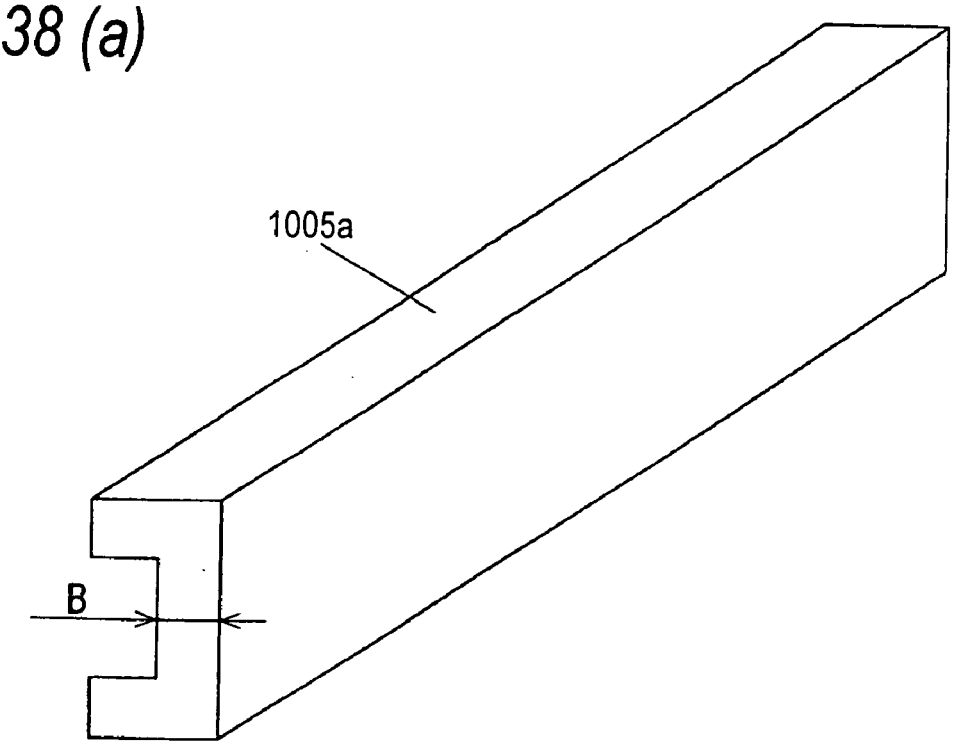
Figure 38:
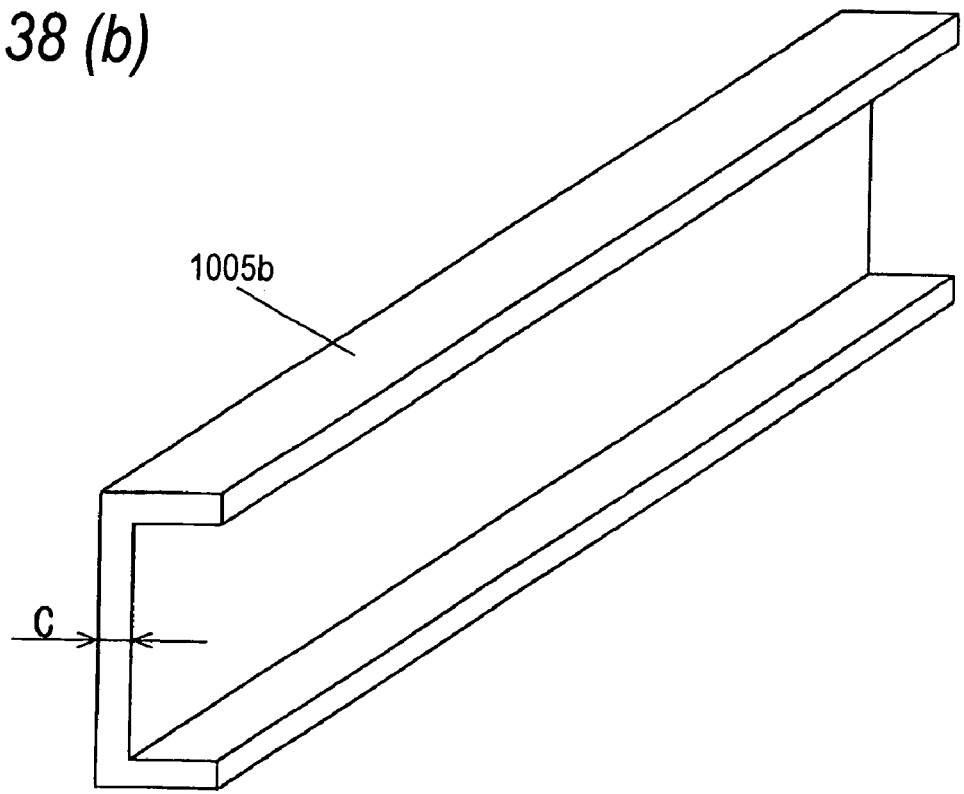

In this embodiment, as materials of the rail 1005a and the rail 1005b. a stainless material, which is generally used under normal circumstances, is used. The rail 105b is configured to have a thinner thickness, i.e., to be dimension B>dimension C, as shown in FIG. 38, against the rail 1005a.

Here, the dimension B is a thickness of the rail 1005a, and the dimension C is a thickness of the rail 1005b.

Meanwhile, in this embodiment, as one example, a stainless material is used as materials of the rail 1005a and the rail 1005b, but the above-described materials are not intended as a definition of the limits of the invention.

Hereinafter, its operation will be described.

In the rails of the invention shown in FIGS. 35-37, a stainless material, which has been generally used in the past, is used as materials of the rail 1005a and the rail 1005b. Here, the right side rail 1005a has a conventional rail configuration, and a stainless material is used as its material, and thereby, it is possible to maintain strength as usual, as rail single body strength of the right side rail 1005a.

Then, as to the left side rail 1005b, a stainless material, which is of an identical metal material and has an identical thickness, is used under ordinary circumstances, but one embodiment of the invention uses a material which is of a material which is identical to that of the right side rail 105a and has a thinner thickness of the rail.

By this means, strength of a single body of the rail 1005b weakens relatively, as compared with such a case that the same thickness as in the past is used as a thickness of the rail 1005b.

In the meantime, as to a rail which is widely used in the case 1002 of an industry standard shape shown in FIG. 35, an overall height of the rail 1005b, i.e., a height in a direction which is identical to an optical disk loading direction is larger against the rail 1005a, and therefore, the rail 1005b has stronger strength than that of the rail 1005a, and strength becomes weaker than that of the rail 1005a from the viewpoint of thickness.

By this means, in case that an identical material is used for conventional rails 1005a, 1005b as shown in FIG. 36 and a rail material with a thinner thickness is used for the rail 1005b, a difference of the bending amount 1010a which occurred due to the load 1008 at the time of loading an optical disk and arises from the rail 1005a and the bending amount 1010b which arises from the rail 1005b is reduced, and on the occasion of loading an optical disk as shown in FIGS. 36 and 37, such a matter that the right side rail 1005a of the tray 1003 tilts toward the lower side than the left side rail 1005b by the suchlike load 1008 is reduced or prevented and thereby, it is possible to realize improvement of a loading property at the time of loading an optical disk and reduction of torsion stress which is applied to the tray 1003 shown in FIG. 28 and components which are adjacent to the tray, i.e., the rail 1005a, the rail 1005b, the rail attachment portion 1004, the rail attachment portion 1006, the optical pickup 1007 etc. at the time of loading an optical disk.

On that account, it becomes possible to prevent a trouble of an opening and closing mechanism of the tray 1003 which arises from such a fact that the rails are transformed due to long term repeating use, and a trouble of an information writing or information reading operation onto an optical disk, which arises from displacement of the optical pickup 1007.

By these things, it is possible to control the bending amounts 1010a, 1010b of the rails 1005a, 1005b against the external load 1008 with respect to each rail, and therefore, it becomes possible to redress the balance of the bending amounts 1010a, 1010b of the both rails 1005a, 1005b, and it is possible to realize an optical disk device which can realize improvement of an loading property of an optical disk and reduction of torsion stress which is applied at the time of loading an optical disk, weight saving of an optical disk device main body weight.

Embodiment 4

Here, it will be also described by use of FIG. 35, and FIG. 35 is a view which showed such a state that the tray 1003 is drawn out from the case 1002 in the same manner as in FIG. 28, and a configuration of an entire optical disk device is the same as that of the embodiment 2.

Figure 42:
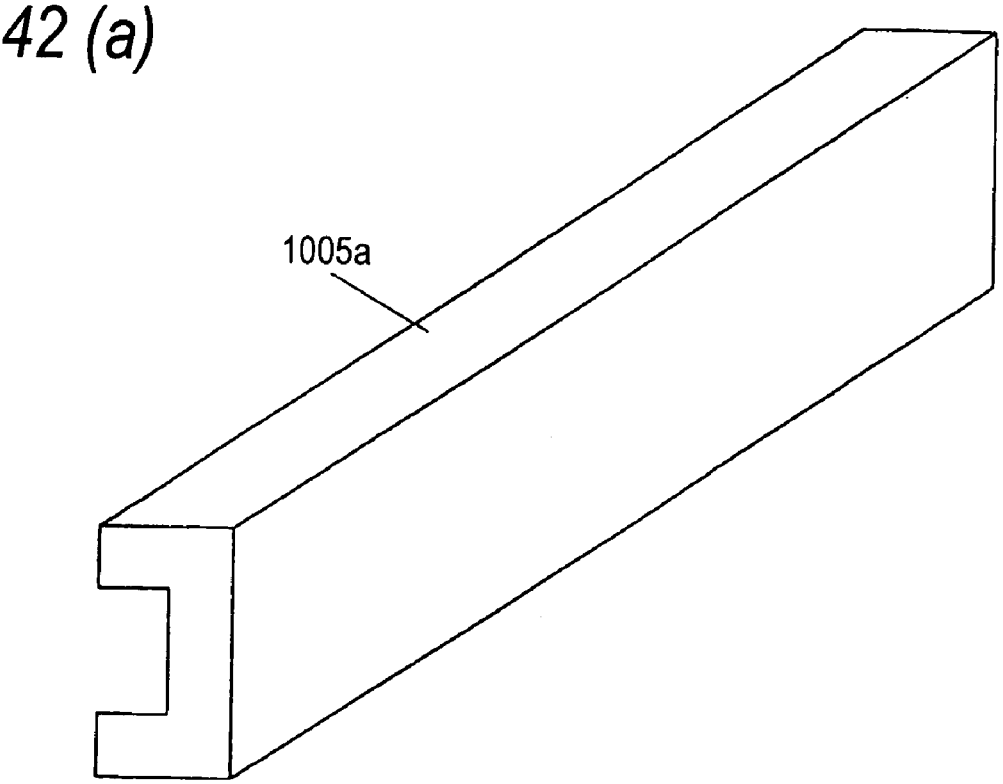
FIG. 42(a) and FIG. 42(b) are external appearance views of a rail of a tray type optical disk device as a reference example.
Figure 42:
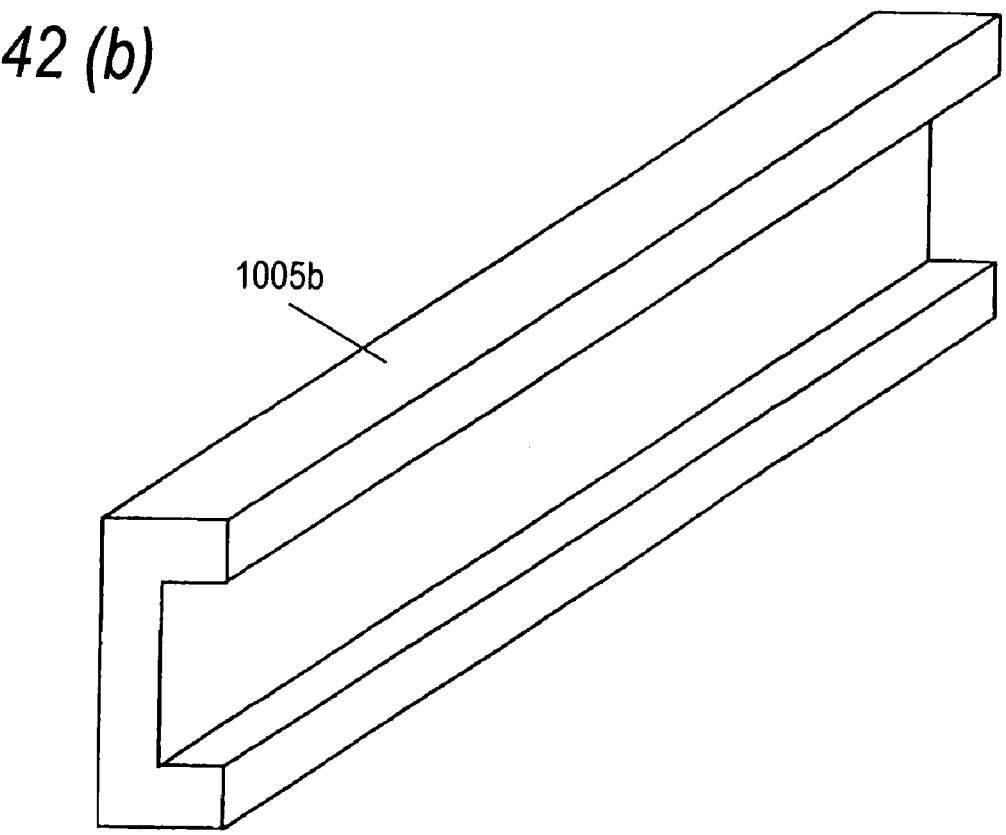

Here, FIG. 42 is an external appearance view which represented rails 1005a, 1005b of the reference example, and FIG. 42(a) shows the right side rail 1005a, and FIG. 42(b) shows the left side rail 1005b.

Here, as a configuration of a conventional commonly used rail, a stainless material is used as a material, and its thickness is the same as to both of the right side rail 1005a and the left side rail 1005b.

Hereinafter, a characterizing portion of the embodiment 4 of the invention will be described.

As shown in FIG. 35, there are rail attachment portions 1004 on both side portions of the tray 1003, and the both side portions are fit with the rails 1005a, 1005b so as to be movable in an optical disk pull-out direction. In addition, the rails 1005a, 1005b are also fit with rail attachment portions 1006 which are disposed on inner surfaces of the both side portions of the case 1002 movably in an optical disk pull-out direction, and it is possible to pull out the tray 1003 so as put on and take off an optical disk from the case 1002.

As shown in FIG. 35, in an optical disk device 1001 which has the case 1002, the tray 1003 which is attached so as to be capable of protruding/withdrawing from/into the case, and a holding portion which holds the case 1002 and the tray 1003 movably, and in which at least one of the rails is configured in such a manner that a cutout, a hole, which is not devoted for fitting or movement stop, are disposed therein. Here, any material can be used as a material which is used for forming rails, but by using any one material of aluminum alloy or aluminum, magnesium alloy or magnesium, and titanium alloy, it is possible to realize weight saving of an optical disk device main body weight, over maintaining strength of a rail main body as much as possible.

By doing this thing, it is possible to control balance of bending amounts 1010a, 110b of the both rails 1005a, 1005b against the load 1008 with respect to each rail, and therefore, it is possible to realize an optical disk device which is capable of realizing improvement of a loading property of an optical disk and reduction of torsion stress which is applied at the time of loading an optical disk. A rail, in which a cutout and/or a hole, which is not devoted for fitting or movement stop, is used for the rail 1005b which has a higher height in a direction which is identical to an optical disk loading direction, and thereby, it is possible to more finely control the bending amounts 1010a, 1010b of the rails against the external load with respect to each rail, and therefore, it becomes possible to redress the balance of the bending amounts 1010a, 1010b of the both rails 1005a, 1005b, and it is possible to realize improvement of an optical disk loading property and reduction of torsion stress which is applied at the time of loading an optical disk.

In one embodiment of the invention, as materials of the rail 1005a and the rail 1005b. a stainless material, which is generally used under normal circumstances, is used. The rail 1005b is configured in such a manner that a cutout 1014 and a hole 1015, which are not devoted for fitting and movement stop, are disposed therein. A shape of the cutout 1014 or the hole 1015 to be disposed is not limited to one shown in FIGS. 39-41, and for example, the cutout 1014 and the hole 1015, of a round type and an elliptic type may be disposed.

Figure 39:
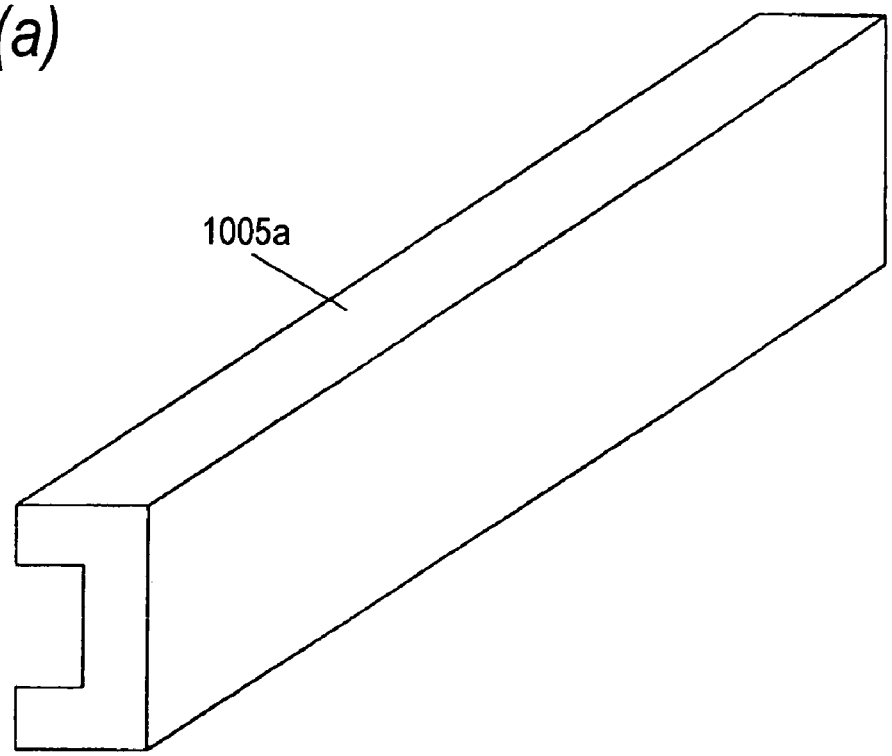
Figure 39:
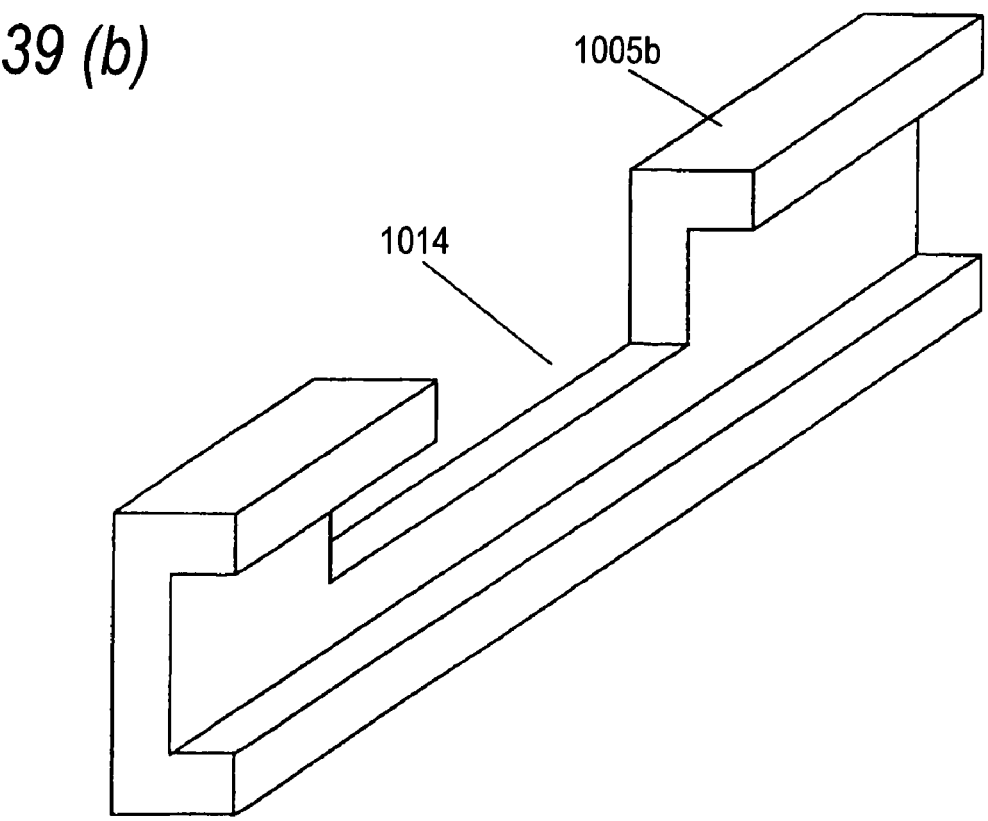
Figure 40:
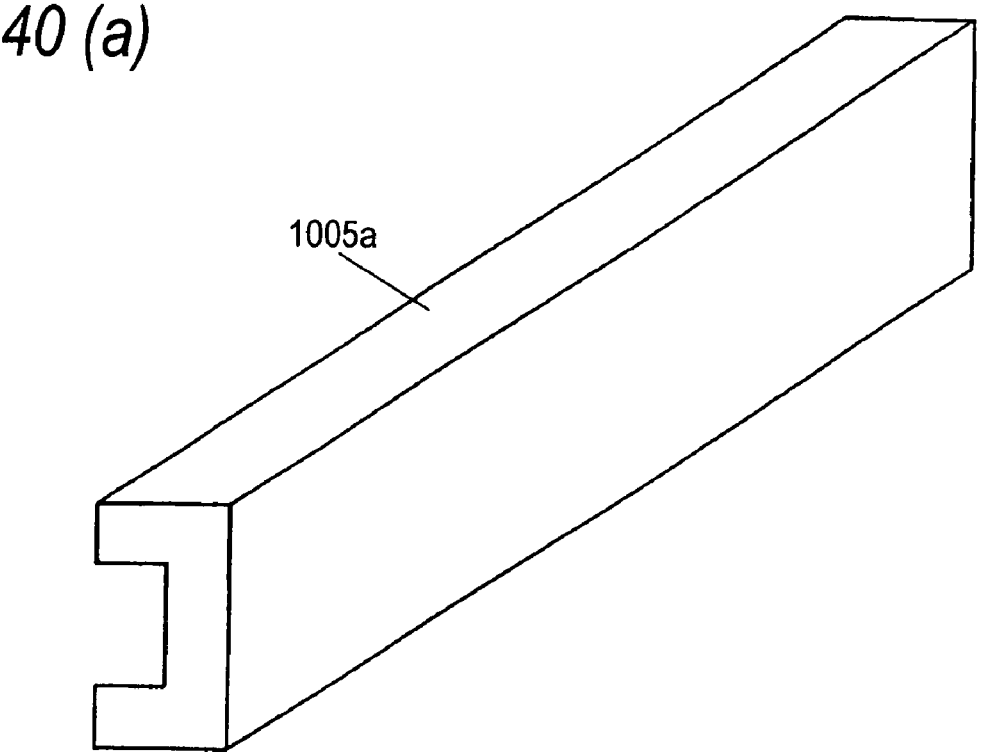
FIG. 40(a) and FIG. 40(b) are external appearance views of a rail of the optical disk device in the embodiment of the invention.
Figure 40:
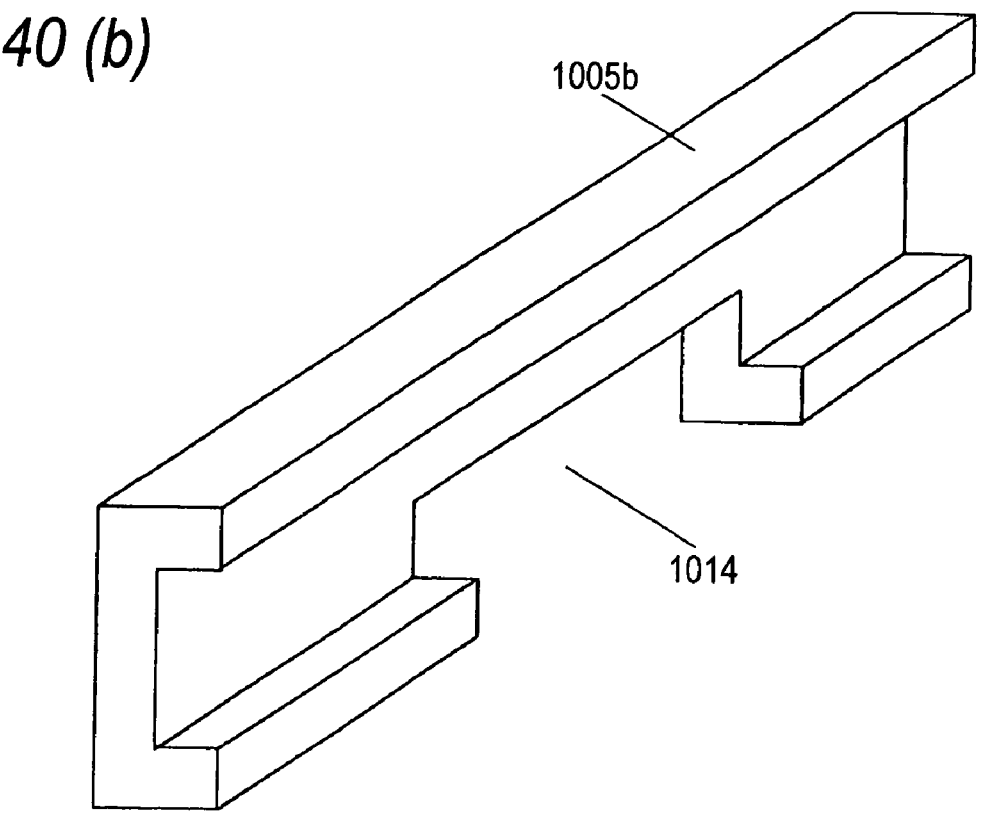
Figure 41:
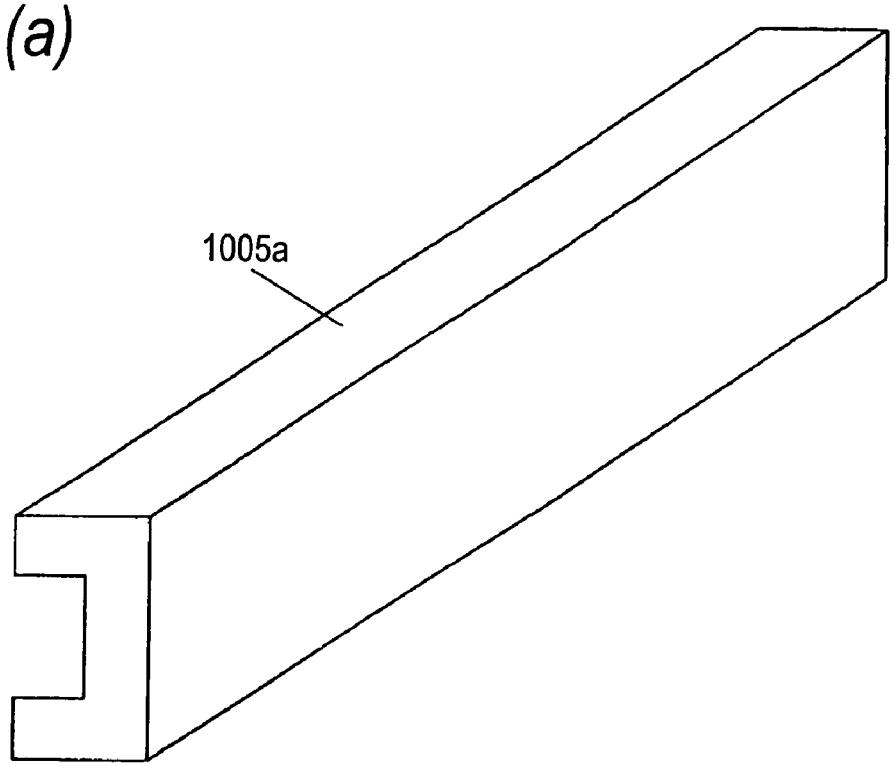
FIG. 41(a) and FIG. 41(b) are external appearance views of a rail of the optical disk device in the embodiment of the invention.
Figure 41:
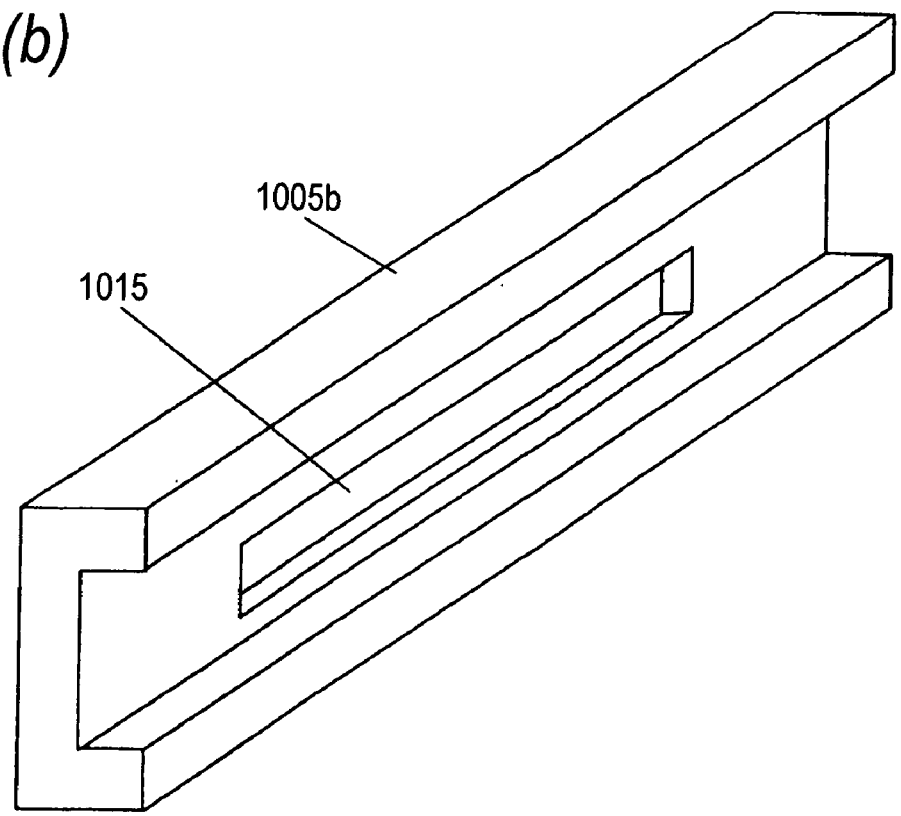

FIGS. 39-41 are external appearance views of a rail of an optical disk device in one embodiment of the invention, and in respective views, (a) shows the right side rail 1005a, and (b) shows the left side rail 105b.

The left side rail 1005b shown in FIG. 39(b) is of such a configuration that the cutout 1014 is disposed from a plane portion which is opposed to the upper side case portion 1002a shown in FIG. 35 in a part of its vertical direction plane portion, and the left side rail 1005b shown in FIG. 40(b) is of such a configuration that the cutout 1014 is disposed from a plane portion which is opposed to the lower side case portion 1002b shown in FIG. 35 in its vertical direction plane portion.

In addition, the left side rail 1005b shown in FIG. 41(b) is of such a configuration that the hole 1015 is disposed in a plane portion which is opposed to a plane in a direction which is perpendicular to the upper side case portion 1002a and the lower side case portion 1002b shown in FIG. 35.

Meanwhile, in this embodiment, as one example, a stainless material is used as materials of the rail 1005a and the rail 1005b and thereby, a configuration of FIGS. 39-41 is made, but a material is not limited to the stainless material, and in addition, as to a configuration, allocation of a cutout and a hole in such a direction that strength of the rail 1005b weakens and in such a direction that a rail weight is saved is not limited to these, if it has an advantage which is equivalent to an advantage which appears in the configuration of FIGS. 39-41.

Hereinafter, its operation will be described.

In the rails of the invention shown in FIGS. 35-37, a stainless material, which has been generally used in the past, is used as materials of the rail 1005a and the rail 1005b. Here, the right side rail 1005a has a conventional rail configuration, and a stainless material is used as its material, and thereby, it is possible to maintain strength as usual, as rail single body strength of the right side rail 1005a.

Then, as to the left side rail 1005b, a stainless material, which is of an identical metal material and has an identical thickness, is used under ordinary circumstances, but in one embodiment of the invention, it is the same to use a stainless material which is of an identical material and an identical thickness to those of the right side rail 1005a, but further, in at least one of the rails, i.e., in the rail 1005b, a cutout and a hole, which are not devoted for fitting or movement stop, are allocated.

By this means, strength of a single body of the rail 5b weakens relatively, as compared with such a case that the same thickness as in the past is used as a thickness of the rail 1005b.

In the meantime, as to a rail which is widely used in the case 1002 of an industry standard shape shown in FIG. 35, an overall height of the rail 1005b is larger against that of the rail 1005a, and therefore, the rail 1005b has stronger strength than that of the rail 1005a, and strength becomes weaker than that of the rail 1005a from the viewpoint of shape.

By this means, in case that an identical material is used for conventional rails 1005a, 1005b as shown in FIG. 36 and a cutout 1014 and a hole 1015, which are not devoted for fitting or movement stop, are disposed in the rail 1005b, a difference of the bending amount 1010a which occurred due to the load 1008 at the time of loading an optical disk and arises from the rail 1005a and the bending amount 1010b which arises from the rail 1005b is reduced, and on the occasion of loading an optical disk as shown in FIGS. 36 and 37, such a matter that the right side rail 1005a of the tray 1003 tilts toward the lower side than the left side rail 1005b by the suchlike load 1008 is reduced or prevented and thereby, it is possible to realize improvement of a loading property at the time of loading an optical disk and reduction of torsion stress which is applied to the tray 1003 shown in FIG. 28 and components which are adjacent to the tray, i.e., the rail 1005*a*, the rail 105*b*, the rail attachment portion 1004, the rail attachment portion 1006, the optical pickup 1007 etc. at the time of loading an optical disk.

On that account, it becomes possible to prevent a trouble of an opening and closing mechanism of the tray 103 which arises from such a fact that the rails are transformed due to long term repeating use, and a trouble of an information writing or information reading operation onto an optical disk, which arises from displacement of the optical pickup 1007.

In addition, at the same time, in the rail 1005*b*, in case of the same material and the same shape as those in the past, a weight is to become smaller by disposing the cutout and the hole. On that account, it is possible to carry out weight saving of a main body weight of an optical disk device at the same time.

By these things, it is possible to control the bending amounts 1010*a*, 1010*b* of the rails 1005*a*, 1005*b* against the external load 1008 with respect to each rail, and therefore, it becomes possible to redress the balance of the bending amounts 1010*a*, 1010*b* of the both rails 1005*a*, 1005*b*, and it is possible to realize an optical disk device which can realize improvement of an loading property of an optical disk and reduction of torsion stress which is applied at the time of loading an optical disk, weight saving of an optical disk device main body weight.

Embodiment 5

A case of an optical disk device which has a case 102, a tray 1003 which is attached so as to be capable of protruding/withdrawing from/into the case 1002, and holding portions which hold the case 1002 and the tray 1003 movably and in which the holding portion has a first rail attachment portion 1006 and a second rail attachment portion 1004 which is disposed on the tray, and rails 1005*a*, 1005*b* which are disposed movably on the first and second attachment portions 1006, 1004, wherein a rail which is disposed on one holding portion and a rail which is disposed on the other holding portion are formed by different metal series materials, and the rail which is disposed on one holding portion has a thinner thickness of a material forming the rail than that of the rail which is disposed on the other holding portion, will be described.

A configuration of an entire optical disk device of the embodiment 1005 is the same as in the embodiment 2~the embodiment 4.

Hereinafter, a characterizing portion of the embodiment 5 of the invention will be described.

As shown in FIG. 28, there are rail attachment portions 1004 on both side portions of the tray 1003, and the both side portions are fit with the rails 1005*a*, 1005*b* so as to be movable in an optical disk pull-out direction. In addition, the rails 1005*a*, 1005*b* are also fit with rail attachment portions 1006 which are disposed on inner surfaces of the both side portions of the case 1002 movably in an optical disk pull-out direction, and it is possible to pull out the tray 1003 so as put on and take off an optical disk from the case 1002.

As shown in FIG. 28, in an optical disk device 1001 which has the case 1002, the tray 103 which is attached so as to be capable of protruding/withdrawing from/into the case, and a holding portion which holds the case 1002 and the tray 1003 movably, and in which the holding portion is configured by the rail attachment portions 1006 which are disposed on the case 1002, the rail attachment portions 1004 which are disposed on the tray 1003, and the rails 1005*a*, 1005*b* which are disposed movably on the rail attachment portions 1004, 1006, it is configured in such a manner that a metal series material, which is different from a metal series material used for the other rail, is used as a material forming the rail 1005*a* or 1005*b* at right and left two locations which is disposed movably on the rail attachment portion 1004, 1006. The holding portion, which holds the case 1002 and the tray 1003 movably, is disposed at one location for each of both left and right end portions to a movable direction of the tray 1003, and a longitudinal direction of the holding portion is set to be identical to a movable direction of the tray 1003, and thereby, it becomes possible to maintain the tray 1003 in a balanced manner, against the load 1008 which is applied to the tray 1003 which is pulled out from the case.

In case that, as a different material which forms the rail, a metal series material with stronger strength than that of a metal series material which is used in the other is used for one location of the rails 1005*a*, 1005*b*, it becomes possible to redress the balance of bending amounts 1010*a*, 1010*b* of the both rails 1005*a*, 1005*b*. By using a rail which is formed by a metal series material with stronger strength as the rail 1005*a* which has a lower height in a direction which is identical to an optical disk loading direction, it is possible to realize improvement of an optical disk loading property and reduction of torsion stress which is applied at the time of loading an optical disk, over maintaining a conventional shape of a rail, and therefore, a sharing property of an equipment of a press work etc. for forming the rail 1005*a* is heightened, and it is possible to suppress a new expense.

In addition, in case that, as a different material which forms the rail, a metal series material with smaller relative density than that of a metal series material which is used in the other is used for one location of the rails 1005*a*, 1005*b*, it becomes possible to redress the balance of the bending amounts 1010*a*, 1010*b* of the both rails 1005*a*, 1005*b*, and at the same time, to carry out reduction of such a weight that both of the rails 1005*a*, 1005*b* are summated. By using a rail which is formed by a metal series material with smaller relative density as the rail 1005*a* which has a higher height in a direction which is identical to an optical disk loading direction, it is possible to realize improvement of an optical disk loading property and reduction of torsion stress which is applied at the time of loading an optical disk, over maintaining a conventional shape of a rail, and therefore, a sharing property of an equipment of a press work etc. for forming the rail 1005*b* is heightened, and it is possible to suppress a new expense, and in addition, it is possible to carry out reduction of such a weight that both of the rails 1005*a*, 1005*b* are summated, and therefore, it is also possible to realize weight saving of an optical disk device main body weight.

Further, by such a fact that a major component, which configures a metal series material, is different, it becomes possible to apply a substantial change to bending amounts of the rails 1005*a*, 1005*b*, and it is possible to realize improvement of a loading property of an optical disk and weight saving of torsion stress which is applied at the time of loading an optical disk, drastically.

In consideration of the above-described content, it is desired to use at least one combination out of for example a combination of a stainless material for the rail 1005*a* and aluminum alloy or aluminum for the rail 1005*b*, a combination of titanium alloy for the rail 1005*a* and aluminum alloy or aluminum for the rail 1005*b*, a combination of a stainless material for the rail 105*a* and titanium alloy for the rail 1005*b*, a combination of aluminum alloy or aluminum for the rail 1005*a* and magnesium alloy or magnesium for the rail 1005*b*, and a combination of titanium alloy for the rail 1005a and magnesium alloy or magnesium for the rail 1005b, as a metal series material to be used. By doing this thing, it is possible to nearly uniform the bending amounts 110a, 1010b of the both rails 1005a, 1005b against a load, and in addition, it is possible to realize weight saving of a rail weight.

If material selection is carried out from the viewpoint of strength of a material, a stainless material, strength of which is stronger than that of the rail 1005b, is used as a material of the rail 1005a, and aluminum alloy or aluminum is used as a material of the rail 1005b.

In addition, if material selection is carried out from the viewpoint of relative density of a material, a stainless material is used as a material of the rail 105a, and aluminum, aluminum alloy or magnesium, magnesium alloy etc., relative density of which is smaller than that of the rail 1005a, is used as a material of the rail 1005b.

In this embodiment, in consideration of both of balance of rail strength of the right and left rails 1005a, 1005b and reduction of a rail weight, a combination of a stainless material and aluminum alloy is used. By doing this thing, it is possible to nearly uniform the bending amounts 1010a, 1010b of the both rails 1005a, 1005b against the load 1008, and in addition, at the same time, it is possible to realize weight saving of a rail weight. The stainless material, which is used here, is SUS304 or SUS430 in JIS part number, and aluminum alloy is A5182 or A5052 in JIS part number.

Further, by adjusting a bending amount of the rail which is disposed on one holding portion in a direction of making a thickness of a material forming the rail thinner than that of the rail which is disposed on the other portion, it is possible to more finely control the bending amounts 1010a, 1010b of the rails against the external load 1008 with respect to each rail, as compared with only such a case that different metal series materials are used for a material forming one rail and a material forming the other rail, and therefore, it becomes possible to redress the balance of the bending amounts of the both rails, and it is possible to realize an optical disk device which is capable of realizing improvement of an optical disk loading property and reduction of torsion stress which is applied at the time of loading an optical disk and weight saving of an optical disk device main body weight.

Furthermore, a rail in which a thickness of a material forming the rail is thin is used for the rail 1005b which has a higher height in a direction which is identical to an optical disk loading direction, and thereby, it is possible to realize improvement of an optical disk loading property and reduction of torsion stress which is applied at the time of loading an optical disk, over maintaining a shape of a conventional rail, and therefore, a sharing property of an equipment of a press work etc. for forming the rail 1005a is heightened, and it is possible to suppress a new expense, and in addition, it is possible to reduce such a weight that the both rails 1005a, 1005b are summated, and therefore, it is also possible to realize weight saving of an optical disk device main body weight.

Meanwhile, in this embodiment, a stainless material is used for the rail 1005a and aluminum alloy is used for the rail 1005b, and a stainless material to be used is SUS304 or SUS430 in JIS part number and aluminum alloy is AS182 or A5052 in JIS part number, but a material of the rail 1005b is not determined in an unambiguous manner by a shape of a rail to be applied and a material which is used for the rail 1005a, and therefore, the above-described materials are not intended as a definition of the limits of the invention.

Hereinafter, its operation will be described.

In this embodiment shown in FIGS. 28-30, a stainless material, which has been generally used in the past, is used as a material of the rail 1005a, and aluminum alloy, which is a material relating to the invention, is used for the rail 1005b. Here, by using a stainless material for the right side rail 1005a, it is possible to maintain strength as usual, as to strength of a rail single body of the right side rail 1005a of FIG. 3.

Then, as to the left side rail 1005b, a stainless material, which is of an identical metal material, is used under ordinary circumstances, but in the invention, in case of focusing attention on strength of a material, aluminum, aluminum alloy etc. are used as a material of the rail 1005b, and in case of focusing attention on relative density, aluminum, aluminum alloy or magnesium, magnesium alloy or titanium alloy etc. are used.

By this means, strength of a single body of the rail 105b weakens relatively, as compared with such a case that a material, which is identical to that of the rail 1005a, is used in the same manner as in the past, as a material of the rail 1005b.

In the meantime, as to a rail which is widely used in the case 1002 of an industry standard shape shown in FIG. 28, an overall height of the rail 1005b, i.e., a height in a direction which is identical to an optical disk loading direction is larger against the rail 1005a, and therefore, the rail 1005b has stronger strength than that of the rail 1005a.

On that account, the rail 1005b has stronger strength than that of the rail 1005a from the viewpoint of a shape, and has weaker strength than that of the rail 1005a from the viewpoint of a material.

By this means, in case that an identical material is used for conventional rails 1005a, 1005b as shown in FIG. 29, a difference of the bending amount 110a which occurred due to the load 1008 at the time of loading an optical disk and arises from the rail 105a and the bending amount 1010b which arises from the rail 1005b is reduced, and on the occasion of loading an optical disk as shown in FIGS. 29 and 30, such a matter that the right side rail 1005a of the tray 1003 tilts toward the lower side than the left side rail 1005b by the suchlike load 1008 is reduced or prevented and thereby, it is possible to realize improvement of a loading property at the time of loading an optical disk and reduction of torsion stress which is applied to the tray 103 shown in FIG. 28 and components which are adjacent to the tray, i.e., the rail 1005a, the rail 1005b, the rail attachment portion 1004, the rail attachment portion 1006, the optical pickup 1007 etc. at the time of loading an optical disk. On that account, it becomes possible to prevent a trouble of an opening and closing mechanism of the tray 1003 which arises from such a fact that the rails 1005a, 1005b are transformed due to long term repeating use, and a trouble of an information writing or information reading operation onto an optical disk, which arises from displacement of the optical pickup 1007.

In addition, in comparison with such a case that a resin material is used for both or one of conventional rails 1005a, 1005b (in this case, a state of bending amounts 1009b>1009a in FIGS. 32 and 34), composite strength of the rail 105a and the rail 105b is strengthened, and a difference of the bending amount 1010a which occurred due to the load 1008 at the time of loading an optical disk and arises from the rail 1005a and the bending amount 110b which arises from the rail 1005b is also reduced, and on the occasion of loading an optical disk as shown in FIG. 30, such a matter that the left side rail 1005b of the tray 1003 shown in FIG. 29 tilts toward the lower side than the left side rail 1005b by the suchlike load 1008 is reduced or prevented and thereby, it is possible to realize improvement of a loading property at the time of loading an optical disk and reduction of torsion stress which is applied to the tray 1003 shown in FIG. 28 and components which are adjacent to the tray, i.e., the rail 105a, the rail 1005b, the rail attachment portion 1004, the rail attachment portion 1006, the optical pickup 1007 etc. at the time of loading an optical disk. On that account, it becomes possible to prevent a trouble of an opening and closing mechanism of the tray 1003 which arises from such a fact that the rails 1005a, 1005b are transformed due to long term repeating use, and a trouble of an information writing or information reading operation onto an optical disk, which arises from displacement of the optical pickup 1007.

In addition, in the rail 1005b, in case of a shape which is identical to conventional one, a weight also becomes small by its relative density effect. On that account, it becomes possible to carry out weight saving of an optical disk device main body weight at the same time.

Further, by adjusting a bending amount of the rail which is disposed on one holding portion in a direction of making a thickness of a material forming the rail thinner than that of the rail which is disposed on the other portion, as shown in FIG. 38 in the embodiment 3, it is possible to much more finely control the bending amounts 1010a, 1010b of the rails against the external load 1008 with respect to each rail, as compared with only such a case that different metal series materials are used for a material forming one rail and a material forming the other rail, and therefore, it becomes possible to redress the balance of the bending amounts of the both rails, and it is possible to realize an optical disk device which is capable of realizing improvement of an optical disk loading property and reduction of torsion stress which is applied at the time of loading an optical disk and weight saving of an optical disk device main body weight.

Furthermore, a rail in which a thickness of a material forming the rail is thin is used for the rail 5b which has a higher height in a direction which is identical to an optical disk loading direction, and thereby, it is possible to realize improvement of an optical disk loading property and reduction of torsion stress which is applied at the time of loading an optical disk, over maintaining a shape of a conventional rail, and therefore, a sharing property of an equipment of a press work etc. for forming the rail 1005a is heightened, and it is possible to suppress a new expense, and in addition, it is possible to reduce such a weight that the both rails 5a, 5b are summated, and therefore, it is also possible to realize weight saving of an optical disk device main body weight.

By these things, it is possible to control the bending amounts 1010a, 1010b of the rails 1005a, 1005b against the external load 1008 with respect to each rail, and therefore, it becomes possible to redress the balance of the bending amounts 1010a, 1010b of the both rails 1005a, 1005b, and it is possible to realize an optical disk device which can realize improvement of an loading property of an optical disk and reduction of torsion stress which is applied at the time of loading an optical disk, weight saving of an optical disk device main body weight.

Meanwhile, in this embodiment, a stainless material is used as a material of the rail 1005a and aluminum alloy is used as a material of the rail 1005b, but by using titanium alloy for the rail 1005a and aluminum alloy for the rail 1005b, it can be expected that much further weight saving of an optical disk device main body weight can be realized.

Embodiment 6

A case of an optical disk device which has a case 1002, a tray 1003 which is attached so as to be capable of protruding/withdrawing from/into the case 1002, and holding portions which hold the case 1002 and the tray 103 movably and in which the holding portion has a first rail attachment portion 1006 and a second rail attachment portion 1004 which is disposed on the tray, and rails 1005a, 1005b which are disposed movably on the first and second attachment portions 1006, 1004, wherein a rail which is disposed on one holding portion and a rail which is disposed on the other holding portion are formed by different metal series materials, and at least one of the rail which is dispose on one holding portion and the rail which is disposed on the other holding portion is configured in such a manner that a cutout, a hole, which is not devoted for fitting or movement stop, is disposed therein.

A configuration of an entire optical disk device of the embodiment 6 is the same as in the embodiment 2~the embodiment 5.

Hereinafter, a characterizing portion of the embodiment 6 of the invention will be described.

As shown in FIG. 28, there are rail attachment portions 1004 on both side portions of the tray 1003, and the both side portions are fit with the rails 1005a, 1005b so as to be movable in an optical disk pull-out direction. In addition, the rails 1005a, 1005b are also fit with rail attachment portions 106 which are disposed on inner surfaces of the both side portions of the case 102 movably in an optical disk pull-out direction, and it is possible to pull out the tray 1003 so as put on and take off an optical disk from the case 1002.

As shown in FIG. 28, in an optical disk device 1001 which has the case 1002, the tray 1003 which is attached so as to be capable of protruding/withdrawing from/into the case, and a holding portion which holds the case 1002 and the tray 1003 movably, and in which the holding portion is configured by the rail attachment portions 106 which are disposed on the case 102, the rail attachment portions 1004 which are disposed on the tray 1003, and the rails 1005a, 1005b which are disposed movably on the rail attachment portions 1004, 1006, it is configured in such a manner that a metal series material, which is different from a metal series material used for the other rail, is used as a material forming the rail 1005a or 1005b at right and left two locations which is disposed movably on the rail attachment portion 1004, 1006. The holding portion, which holds the case 1002 and the tray 1003 movably, is disposed at one location for each of both left and right end portions to a movable direction of the tray 1003, and a longitudinal direction of the holding portion is set to be identical to a movable direction of the tray 1003, and thereby, it becomes possible to maintain the tray 1003 in a balanced manner, against the load 1008 which is applied to the tray 1003 which is pulled out from the case.

In case that, as a different material which forms the rail, a metal series material with stronger strength than that of a metal series material which is used in the other is used for one location of the rails 1005a, 1003b, it becomes possible to redress the balance of bending amounts 1010a, 1010b of the both rails 1005a, 1005b. By using a rail which is formed by a metal series material with stronger strength as the rail 1005a which has a lower height in a direction which is identical to an optical disk loading direction, it is possible to realize improvement of an optical disk loading property and reduction of torsion stress which is applied at the time of loading an optical disk, over maintaining a conventional shape of a rail, and therefore, a sharing property of an equipment of a press work etc. for forming the rail 1005a is heightened, and it is possible to suppress a new expense.

In addition, in case that, as a different material which forms the rail, a metal series material with smaller relative density than that of a metal series material which is used in the other is used for one location of the rails 1005a, 1005b, it becomes possible to redress the balance of the bending amounts 1010a, 1010b of the both rails 1005a, 1005b, and at the same time, to carry out reduction of such a weight that both of the rails 1005a, 105b are summated. By using a rail which is formed by a metal series material with smaller relative density as the rail 1005a which has a higher height in a direction which is identical to an optical disk loading direction, it is possible to realize improvement of an optical disk loading property and reduction of torsion stress which is applied at the time of loading an optical disk, over maintaining a conventional shape of a rail, and therefore, a sharing property of an equipment of a press work etc. for forming the rail 1005b is heightened, and it is possible to suppress a new expense, and in addition, it is possible to carry out reduction of such a weight that both of the rails 1005a, 1005b are summated, and therefore, it is also possible to realize weight saving of an optical disk device main body weight.

Further, by such a fact that a major component, which configures a metal series material, is different, it becomes possible to apply a substantial change to bending amounts of the rails 1005a, 1005b, and it is possible to realize improvement of a loading property of an optical disk and weight saving of torsion stress which is applied at the time of loading an optical disk, drastically.

In consideration of the above-described content, it is desired to use at least one combination out of for example a combination of a stainless material for the rail 105a and aluminum alloy or aluminum for the rail 105b, a combination of titanium alloy for the rail 1005a and aluminum alloy or aluminum for the rail 1005b, a combination of a stainless material for the rail 105a and titanium alloy for the rail 1005b, a combination of aluminum alloy or aluminum for the rail 1005a and magnesium alloy or magnesium for the rail 1005b, and a combination of titanium alloy for the rail 1005a and magnesium alloy or magnesium for the rail 1005b, as a metal series material to be used. By doing this thing, it is possible to nearly uniform the bending amounts 1010a, 1010b of the both rails 1005a, 1005b against a load, and in addition, it is possible to realize weight saving of a rail weight.

If material selection is carried out from the viewpoint of strength of a material, a stainless material, strength of which is stronger than that of the rail 105b, is used as a material of the rail 1005a, and aluminum alloy or aluminum is used as a material of the rail 1005b.

In addition, if material selection is carried out from the viewpoint of relative density of a material, a stainless material is used as a material of the rail 105a, and aluminum, aluminum alloy or magnesium, magnesium alloy etc., relative density of which is smaller than that of the rail 1005a, is used as a material of the rail 1005b.

In this embodiment, in consideration of both of balance of rail strength of the right and left rails 105a, 105b and reduction of a rail weight, a combination of a stainless material and aluminum alloy is used. By doing this thing, it is possible to nearly uniform the bending amounts 1010a, 1010b of the both rails 1005a, 1005b against the load 1008, and in addition, at the same time, it is possible to realize weight saving of a rail weight. The stainless material, which is used here, is SUS304 or SUS430 in JIS part number, and aluminum alloy is A5182 or A5052 in JIS part number.

Further, by disposing a cutout, a hole, which is not devoted for fitting or movement stop, in at least one of the rail which is disposed on one holding portion or the rail which is disposed on the other holding portion shown in FIGS. 39-41 in the embodiment 4, it is possible to more finely control the bending amounts 1010a, 1010b of the rails against the external load 1008 with respect to each rail, as compared with only such a case that different metal series materials are used for a material forming one rail and a material forming the other rail, and therefore, it becomes possible to redress the balance of the bending amounts of the both rails, and it is possible to realize an optical disk device which is capable of realizing improvement of an optical disk loading property and reduction of torsion stress which is applied at the time of loading an optical disk and weight saving of an optical disk device main body weight.

Furthermore, a rail in which a cutout, a hole, which is not devoted for fitting or movement stop, is disposed, is used for the rail 1005b which has a higher height in a direction which is identical to an optical disk loading direction, and thereby, it is possible to realize improvement of an optical disk loading property and reduction of torsion stress which is applied at the time of loading an optical disk, over maintaining a shape of a conventional rail, and therefore, a sharing property of an equipment of a press work etc. for forming the rail 1005a is heightened, and it is possible to suppress a new expense, and in addition, it is possible to reduce such a weight that the both rails 1005a, 1005b are summated, and therefore, it is also possible to realize weight saving of an optical disk device main body weight.

Meanwhile, in this embodiment, a stainless material is used for the rail 1005a and aluminum alloy is used for the rail 1005b, and a stainless material to be used is SUS304 or SUS430 in JIS part number and aluminum alloy is A5182 or A5052 in JIS part number, but a material of the rail 105b is not determined in an unambiguous manner by a shape of a rail to be applied and a material which is used for the rail 1005a, and therefore, the above-described materials are not intended as a definition of the limits of the invention.

Hereinafter, its operation will be described.

In this embodiment shown in FIGS. 28-30, a stainless material, which has been generally used in the past, is used as a material of the rail 1005a, and aluminum alloy, which is a material relating to the invention, is used for the rail 1005b. Here, by using a stainless material for the right side rail 1005a, it is possible to maintain strength as usual, as to strength of a rail single body of the right side rail 1005a of FIG. 3.

Then, as to the left side rail 1005b, a stainless material, which is of an identical metal material, is used under ordinary circumstances, but in the invention, in case of focusing attention on strength of a material, aluminum, aluminum alloy etc. are used as a material of the rail 1005b, and in case of focusing attention on relative density, aluminum, aluminum alloy or magnesium, magnesium alloy or titanium alloy etc. are used.

By this means, strength of a single body of the rail 105b weakens relatively, as compared with such a case that a material, which is identical to that of the rail 105a, is used in the same manner as in the past, as a material of the rail 1005b.

In the meantime, as to a rail which is widely used in the case 1002 of an industry standard shape shown in FIG. 28, an overall height of the rail 1005b, i.e., a height in a direction which is identical to an optical disk loading direction is larger against the rail 105a, and therefore, the rail 1005b has stronger strength than that of the rail 1005a.

On that account, the rail 1005b has stronger strength than that of the rail 1005a from the viewpoint of a shape, and has weaker strength than that of the rail 105a from the viewpoint of a material.

By this means, in case that an identical material is used for conventional rails 1005a, 1005b as shown in FIG. 29, a difference of the bending amount 1010a which occurred due to the load 1008 at the time of loading an optical disk and arises from the rail 1005a and the bending amount 1010b which arises from the rail 1005b is reduced, and on the occasion of loading an optical disk as shown in FIGS. 29 and 30, such a matter that the right side rail 1005a of the tray 1003 tilts toward the lower side than the left side rail 1005b by the suchlike load 1008 is reduced or prevented and thereby, it is possible to realize improvement of a loading property at the time of loading an optical disk and reduction of torsion stress which is applied to the tray 1003 shown in FIG. 28 and components which are adjacent to the tray, i.e., the rail 105a, the rail 1005b, the rail attachment portion 1004, the rail attachment portion 1006, the optical pickup 1007 etc. at the time of loading an optical disk. On that account, it becomes possible to prevent a trouble of an opening and closing mechanism of the tray 1003 which arises from such a fact that the rails 1005a, 1005b are transformed due to long term repeating use, and a trouble of an information writing or information reading operation onto an optical disk, which arises from displacement of the optical pickup 1007.

In addition, in comparison with such a case that a resin material is used for both or one of conventional rails 1005a, 1005b (in this case, a state of bending amounts 109b>109a in FIGS. 32 and 34), composite strength of the rail 1005a and the rail 1005b is strengthened, and a difference of the bending amount 1010a which occurred due to the load 1008 at the time of loading an optical disk and arises from the rail 1005a and the bending amount 110b which arises from the rail 1005b is also reduced, and on the occasion of loading an optical disk as shown in FIG. 30, such a matter that the left side rail 1005b of the tray 1003 shown in FIG. 29 tilts toward the lower side than the left side rail 1005b by the suchlike load 1008 is reduced or prevented and thereby, it is possible to realize improvement of a loading property at the time of loading an optical disk and reduction of torsion stress which is applied to the tray 1003 shown in FIG. 28 and components which are adjacent to the tray, i.e., the rail 1005a, the rail 1005b, the rail attachment portion 1004, the rail attachment portion 1006, the optical pickup 1007 etc. at the time of loading an optical disk. On that account, it becomes possible to prevent a trouble of an opening and closing mechanism of the tray 1003 which arises from such a fact that the rails 1005a, 1005b are transformed due to long term repeating use, and a trouble of an information writing or information reading operation onto an optical disk, which arises from displacement of the optical pickup 1007.

In addition, in the rail 1005b, in case of a shape which is identical to conventional one, a weight also becomes small by its relative density effect. On that account, it becomes possible to carry out weight saving of an optical disk device main body weight at the same time.

Further, by disposing a cutout, a hole, which is not devoted for fitting or movement stop, in at least one of the rail which is disposed on one holding portion or the rail which is disposed on the other holding portion shown in FIGS. 39-41 in the embodiment 4, it is possible to much more finely control the bending amounts 1010a, 1010b of the rails against the external load 1008 with respect to each rail, as compared with only such a case that different metal series materials are used for a material forming one rail and a material forming the other rail, and therefore, it becomes possible to redress the balance of the bending amounts of the both rails, and it is possible to realize an optical disk device which is capable of realizing improvement of an optical disk loading property and reduction of torsion stress which is applied at the time of loading an optical disk and weight saving of an optical disk device main body weight.

Furthermore, a rail in which a thickness of a material forming the rail is thin is used for the rail 105b which has a higher height in a direction which is identical to an optical disk loading direction, and thereby, it is possible to realize improvement of an optical disk loading property and reduction of torsion stress which is applied at the time of loading an optical disk, over maintaining a shape of a conventional rail, and therefore, a sharing property of an equipment of a press work etc. for forming the rail 1005a is heightened, and it is possible to suppress a new expense, and in addition, it is possible to reduce such a weight that the both rails 1005a, 1005b are summated, and therefore, it is also possible to realize weight saving of an optical disk device main body weight.

By these things, it is possible to control the bending amounts 101a, 1010b of the rails 1005a, 1005b against the external load 1008 with respect to each rail, and therefore, it becomes possible to redress the balance of the bending amounts 1010a, 1010b of the both rails 1005a, 1005b, and it is possible to realize an optical disk device which can realize improvement of an loading property of an optical disk and reduction of torsion stress which is applied at the time of loading an optical disk, weight saving of an optical disk device main body weight.

Meanwhile, in this embodiment, a stainless material is used as a material of the rail 1005a and aluminum alloy is used as a material of the rail 1005b, but by using titanium alloy for the rail 1005a and aluminum alloy for the rail 1005b, it can be expected that much further weight saving of an optical disk device main body weight can be realized.

As above, by adopting at least one configuration of the embodiment 1, or, the embodiments 2~6, it is possible to realize an optical disk device which is capable of realizing improvement of a loading property of an optical disk and reduction of torsion stress which is applied at the time of loading an optical disk, and weight saving of an optical disk device main body weight.

In addition, by combining the configurations of the embodiment 1, or, the embodiments 2-6 to realize a configuration which satisfies them at the same time, it is possible to realize an optical disk device which is capable of realizing improvement of a loading property of an optical disk and reduction of torsion stress which is applied at the time of loading an optical disk, and weight saving of an optical disk device main body weight.

What is claimed is:

1. An optical disk device, comprising:
    a case;
    a tray, which is attached so as to be capable of protruding/withdrawing from/into the case; and
    a holding portion, which holds the housing and the tray movably, the holding portion having a first rail attachment portion disposed on the case, a second rail attachment portion disposed on the tray, and rails disposed movably on the first and second rail attachment portions;
    wherein a rail disposed on one holding portion, and a rail disposed on the other holding portion are formed by different materials; and
    the rail, which is disposed on one holding portion, has a thinner thickness of a material which forms the rail, than that of the rail which is disposed on the other holding portion.

2. The optical disk device according to claim 1, wherein the rail with a thinner thickness of a material which forms the rail is used as a rail with a higher height in a direction which is identical to an optical disk loading direction.

* * * * *